(12) United States Patent
Sumiyoshi

(10) Patent No.: US 8,827,402 B2
(45) Date of Patent: Sep. 9, 2014

(54) IMAGE FORMING APPARATUS AND IMAGE FORMING METHOD

(71) Applicant: Fujifilm Corporation, Tokyo (JP)

(72) Inventor: Yuta Sumiyoshi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 118 days.

(21) Appl. No.: 13/631,248

(22) Filed: Sep. 28, 2012

(65) Prior Publication Data

US 2013/0083110 A1   Apr. 4, 2013

(30) Foreign Application Priority Data

Sep. 30, 2011   (JP) ................... 2011-217889

(51) Int. Cl.
*B41J 29/38* (2006.01)
*B41J 2/14* (2006.01)

(52) U.S. Cl.
USPC .............. 347/14; 347/9; 347/12; 347/49

(58) Field of Classification Search
CPC ........ B41J 2/2146; B41J 29/393; B41J 2/155; B41J 2202/20; B41J 2202/21; B41J 11/008
USPC ................. 347/14, 37, 47, 9, 12, 49
See application file for complete search history.

(56) References Cited

U.S. PATENT DOCUMENTS

| | | | |
|---|---|---|---|
| 2008/0180470 A1 | 7/2008 | Oku | |
| 2010/0289852 A1 | 11/2010 | Woolfe et al. | |
| 2010/0302311 A1 * | 12/2010 | Blair et al. | 347/42 |

FOREIGN PATENT DOCUMENTS

| | | |
|---|---|---|
| JP | 2006-248112 A | 9/2006 |
| JP | 2008-183884 A | 8/2008 |
| JP | 2010-524739 A | 7/2010 |

OTHER PUBLICATIONS

Japanese Notification of Reasons for Rejection for Japanese Application No. 2012-200544, dated Nov. 6, 2013, along with a partial English translation thereof.

* cited by examiner

*Primary Examiner* — Jannelle M Lebron
(74) *Attorney, Agent, or Firm* — Birch, Stewart, Kolasch & Birch, LLP

(57) ABSTRACT

An image forming apparatus includes: a recording head including first and second head modules, each of the first and second head modules having recording elements arranged to perform a recording operation onto a recording medium, the first head module being arranged in a first orientation on the recording head, the second head module being arranged in a second orientation on the recording head, the second orientation being rotated from the first orientation; a signal processing device configured to select, from print data for one page, print data to be used in one recording operation respectively for the recording elements, and to arrange the selected print data in a prescribed recording element sequence for each of the first and second head modules regardless of the first and second orientations; and a data transfer device configured to transfer the arranged print data for each of the first and second head modules.

14 Claims, 28 Drawing Sheets

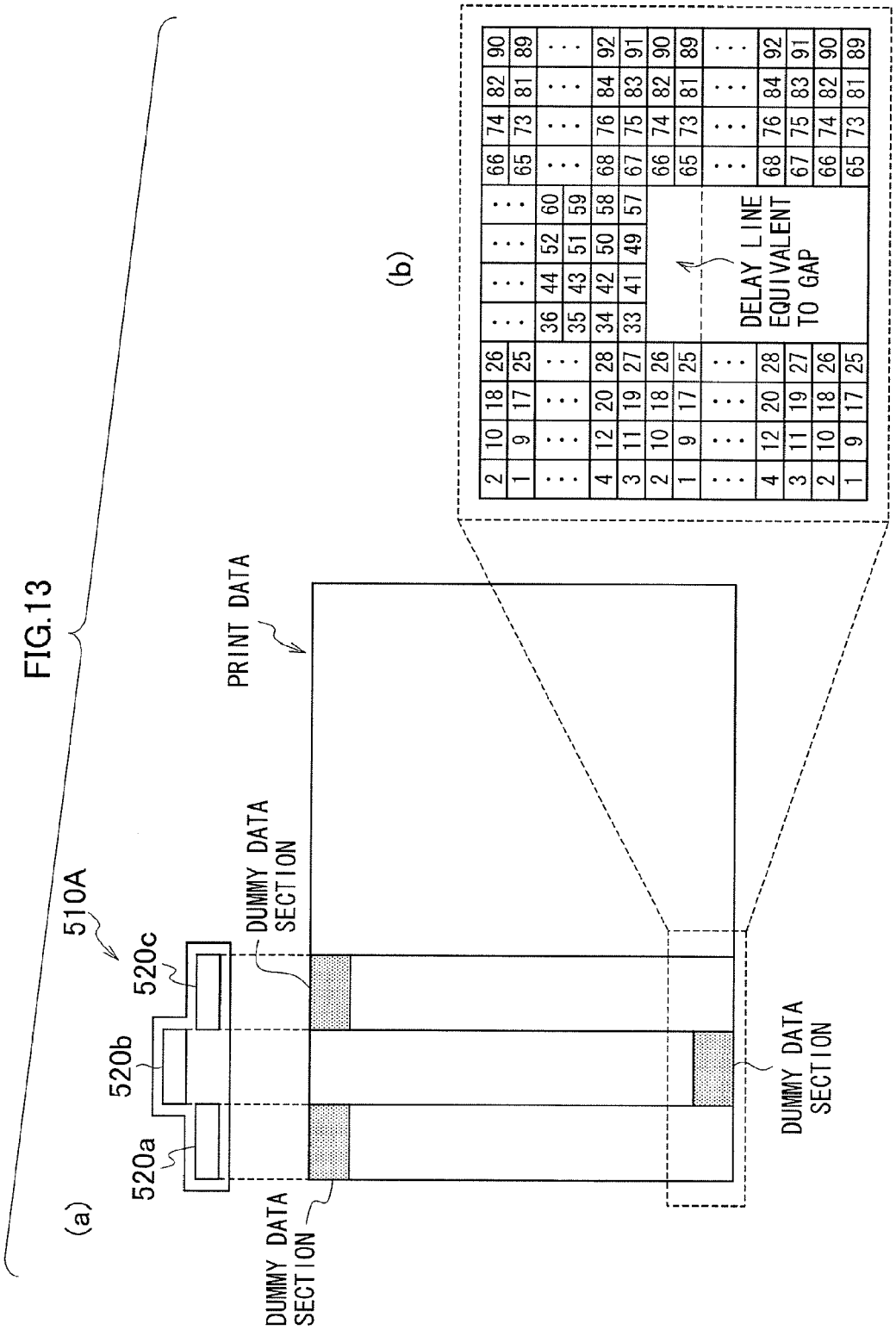

IMAGE FORMING APPARATUS AND IMAGE FORMING METHOD

This nonprovisional application claims the benefit to Patent Application No. 2011-217889 filed in Japan, on Sep. 30, 2011. The entire contents of all of the above applications is hereby incorporated by reference.

BACKGROUND OF THE INVENTION

1. Field of the Invention

The present invention relates to an image forming apparatus and an image forming method, and more particularly to an image forming apparatus such as an inkjet printer, based on a dot recording method, and technology for efficiently transferring print data used in such an image forming apparatus.

2. Description of the Related Art

In the technical field of inkjet printers, a so-called matrix type of inkjet head is known in which nozzles for ejecting ink droplets are arranged in a two-dimensional array. In the matrix type head, due to the arrangement of the pressure chambers and the ink flow channels, it is necessary for the pitch between the nozzles to be larger than the pitch between pixels, and therefore, the adjacency relationship of the nozzles which are adjacent in the head cannot be directly made correspondent to the adjacency relationship of the pixels of the printed dots which are adjacent on the recording medium (on the image recorded on the recording paper). Therefore, an oblique matrix arrangement structure is adopted in which the positions of the nozzles are arranged in a slightly staggered fashion (see FIG. 2).

When a prescribed image (for example, the bitmap image shown in FIG. 6) is formed using the matrix type head of this kind, print data generated previously in a memory is read out and transferred to the matrix type head, and the head is driven so as to eject ink droplets from the corresponding nozzles of the head. However, in this case, there are the following problems.

(1) The print data for nozzles which are adjacent on a straight lute in the main scanning direction of the head is arranged in discrete positions in the image memory (see FIG. 6).

(2) In particular, in an actual matrix type head, the nozzles are formed at distances of several ten pixels to owe hundred pixels apart, and the overall width of the head (the dimension in the paper conveyance direction) is no less than one thousand lines (one thousand pixels). Consequently, for each droplet ejection operation, print data for all of the nozzles of the head (data for one droplet ejection operation) must be gathered from the broad image region covered by the head (for instance, a range 170 defined with the dotted lines in FIG. 6). A large-capacity memory, such as an image page memory, is generally constituted of a dynamic RAM (DRAM), but a feature of a DRAM is that access to non-consecutive addresses of this kind is slow (a fraction of the speed of access to consecutive addresses).

(3) The image page memory is usually build on word units (8-bit, 16-bit, 32-bit, . . . ), which means that read-out is performed in word units. However, since the print data is 1 to 2 bits per nozzle (in many cases, the inkjet printer has around 1 to 3 droplet ejection modification levels) and the data for adjacent nozzles is not included in the same word as described above, then it is necessary to read out a whole word in order to read out 1 bit, and to discard the remaining data of the word. This means that the memory reading efficiency is poor.

(4) The facts that the memory read addresses are distributed discretely (random reading) and then the reading efficiency is poor are not major problems if the printer speed is slow (the head has a small number of nozzles and a low drive frequency). However in compositions which print at high speed, such as a full line-type of head having a full page width, where the apparatus is required to have high-speed performance, the speed of memory read-out and data transfer is a barrier to achieving this high-speed performance.

In response to these problems, Japanese Patent Application Publication No. 2008-183884 discloses technology including a line memory which stores data for one line from amongst print data for one page, a rearrangement device which changes an arrangement sequence of the data for one line stored in the line memory, and an image buffer memory which stores print data that has been rearranged by the rearrangement device, wherein the rearrangement device has a composition for rearranging data in such a manner that data for pixels corresponding to recording elements of the recording head that are adjacent in an alignment on a straight line following a direction perpendicular to a relative movement direction of the recording medium is arranged in the same word or in adjacent words, and the image buffer memory has a storage capacity for storing the rearranged print data for an image region which corresponds at least to a surface area occupied by a two-dimensional matrix arrangement of the recording elements in the recording head. According to this technology, it is possible to read out print data efficiently from consecutive addresses in an image buffer memory, and therefore high-speed read-out and high-speed transfer become possible. Furthermore, since the memory can be composed readily using an inexpensive DRAM, then it is possible to achieve reduced costs.

SUMMARY OF THE INVENTION

When a line head includes two or more head units aligned together, the head units can include a head unit arranged in a prescribed direction and a head unit arranged in a direction reversed by 180° with respect to the prescribed direction (for instance, a line head 200 shown in FIG. 2).

Another design policy is to improve replaceability by setting a head unit including one or more head modules as one constituent element. For instance, if the number of head modules in a constituent element is an odd number, such as 3 or 5, then the head modules are respectively arranged reversely by 180° in each constituent element (as in a line head 500 shown in FIG. 12, for example). In a case where the number of head modules in one constituent element is an even number, it is also possible that, in order to satisfy the design policy, the head modules are respectively arranged reversely and unreversely (as in the line head 200 shown in FIG. 2, for example).

In the head modules which are arranged reversely as described above, the alignment of the nozzles and the amount of displacement in a sub-scanning direction are also reversed. Therefore, if units each including one or more head modules are arranged reversely in this way, a problem occurs in that normal printing cannot be performed with the technology in described in Japanese Patent Application Publication No. 2008-183884.

The present invention has been contrived in view of these circumstances, an object thereof being to provide an image forming apparatus and an image forming method whereby printing can be carried out correctly, without changing specifications of an image data transfer interface and without increasing conditions relating to an image data control composition, even if a combination of an unreversed head unit and a reversed head unit is used.

In order to attain the aforementioned object, the present invention is directed to an image forming apparatus, comprising; a recording head including a first head module and a second head module, each of the first and second head modules having a plurality of recording elements arranged to perform a recording operation with respect to a recording medium, the first head module being arranged in a first orientation on the recording head, the second head module being arranged in a second orientation on the recording head, the second orientation being rotated from the first orientation; a scanning device configured to move the recording head and the recording medium relatively to each other to scan the recording medium with the recording head; a signal processing device configured to select from print data for one page, print data to be used in one recording operation respectively for the recording elements, and to arrange the selected print data in a prescribed recording element sequence for each of the first and second head modules regardless of the first and second orientations of the first and second head modules; a data transfer device configured to transfer the arranged print data for each of the first and second head modules; and a recording operation control device configured to control the recording operation of the recording elements in accordance with the transferred print data.

According to this aspect of the present invention, in the recording head constituted of the first head module arranged in the first orientation and the second head module arranged in the second orientation rotated from the first orientation, the print data in one recording operation for each of the recording elements is selected from the print data for one page, and the selected print data is transferred to the head modules in such a manner that the print data is arranged in the prescribed recording element sequence in each head module, regardless of the orientation of the arrangement of the head module, and therefore it is possible to perform printing correctly, without changing the specifications of the image data transfer interface and without increasing conditions relating to the image data control composition, even if using the combination of the unreversed head module and the reversed head module.

Preferably, the recording elements are arranged in a two-dimensional matrix arrangement on the recording head; the scanning device is configured to move the recording head and the recording medium relatively to each other to scan the recording medium with the recording head in a sub-scanning direction: the signal processing device includes: a first line memory configured to store, of the print data for the one page, the print data for one line along a main scanning direction perpendicular to the sub-scanning direction; a rearrangement device configured to change an alignment sequence of the print data for the one line stored in the first line memory to rearrange the print data in such a manner that the print data for pixels corresponding to the recording elements which are adjacently aligned on a straight line along the main scanning direction in the recording head are arranged in a same word or in words adjacent to each other; an image buffer memory configured to store the rearranged print data, the image buffer memory having a storage capacity for snoring at least the rearranged print data for an image region corresponding to a surface area occupied by the two-dimensional matrix arrangement of the recording elements in the recording head; and a second line memory configured to read out the print data to be used in the one recording operation respectively for the recording elements from the image buffer memory, and to store the read print data; and the data transfer device is configured to transfer the print data stored in the second line memory for each of the first and second head modules.

According to this aspect of the present invention, since the composition is adopted in which the data is rearranged in such a manner that the data corresponding to the adjacent recording elements are stored at the consecutive addresses in the image buffer memory, in accordance with the adjacency relationship of the recording element arrangement in the matrix type head, then it is possible to achieve high-speed read-out and transfer, and good memory read-out efficiency, when reading out the print data from the image buffer memory to the recording head.

Preferably, the rearrangement device is configured to rearrange, of the print data for the one page, the print data in a data region corresponding to the first head module into a first alignment sequence, and the print data in a data region corresponding to the second head module into a second alignment sequence reverse to the first alignment sequence.

According to this aspect of the present invention, it is possible to transfer the print data for each of the recording elements, to the respective head modules, in the sequence corresponding to the arrangement of the recording elements, regardless of the orientation of the arrangement of the head module.

It is also preferable that the second line memory is configured to read out, of the print data for the one page, the print data in a data region corresponding to the first head module from the image buffer memory in a first read-out direction, and the print data in a data region corresponding to the second head module from the image buffer memory in a second read-out direction reverse to the first read-out direction.

According to this aspect of the present invention, it is also possible to transfer the print data for each of the recording elements, to the respective head modules, in the sequence corresponding to the arrangement of the recording elements, regardless of the orientation of the arrangement of the head module.

Preferably, the image forming apparatus further comprises a post-processing calculation device configured to carry out correction processing on the rearranged print data stored in the image buffer memory. The correction processing can include mask processing to prohibit at least one of the recording elements from performing the recording operation. The at least one of the recording elements can include a defective one of the recording elements. The at least one of the recording elements can include one of overlapping two of the recording elements which are overlap with each other between the first and second head modules.

The first and second head modules can be arranged in a staggered arrangement on the recording head. The second orientation can be rotated from the first orientation by 180°. It is possible that the recording head includes a first head unit and a second head unit; each of the first and second head units is constituted of an odd number of head modules; the first head unit is arranged in the first orientation on the recording head; and the second head unit is arranged in the second orientation on the recording head. It is also possible that the recording head includes a plurality of head units; and each of the head units is constituted of the first and second head modules alternately arranged.

According to these aspects of the present invention, the recording heads having various arrangements of the head modules can be used.

In order to attain the aforementioned object, the present invention is also directed to an image forming method, comprising: a scanning step of moving a recording head and a recording medium relatively to each other to scan the recording medium with the recording head, the recording head including a first head module and a second head module, each of the first and second head modules having a plurality of recording elements arranged to perform a recording operation with respect to the recording medium, the first head module being arranged in a first orientation on the recording head, the second head module being arranged in a second orientation on the recording head, the second orientation being rotated from the first orientation; a signal processing step of selecting, from print data for one page, print data to be used in one recording operation respectively for the recording elements, and arranging the selected print data in a prescribed recording element sequence for each of the first and second head modules regardless of the first and second orientations of the first and second head modules; a data transfer step of transferring the arranged print data for each of the first and second head modules; and a recording operation control step of controlling the recording operation of the recording elements in accordance with the transferred print data.

Preferably, the recording elements are arranged in a two-dimensional matrix arrangement on the recording head; the scanning step is configured to move the recording head and the recording medium relatively to each other to scan the recording medium with the recording head in a sub-scanning direction; the signal processing step includes: a first storing step of storing, of the print data for the one page, the print data for one line along a main scanning direction perpendicular to the sub-scanning direction, in a first line memory; a rearrangement step of changing an alignment sequence of the print data for the one line stored in the first line memory to rearrange the print data in such a manner that the print data for pixels corresponding to the recording elements which are adjacently aligned on a straight line along the main scanning direction in the recording bead are arranged in a same word or in words adjacent to each other; an image buffering step of storing the rearranged print data in an image buffer memory having a storage capacity for storing at least the rearranged print data for an image region corresponding to a surface area occupied by the two-dimensional matrix arrangement of the recording elements in the recording head; and a second storing step of reading out the print data to be used in the one recording operation respectively for the recording elements from the image buffer memory, and storing the read print data in a second line memory; and the data transfer step is configured to transfer the print data stored in the second line memory for each of the first and second head modules.

Preferably, the rearrangement step is configured to rearrange, of the print data for the one page, the print data in a data region corresponding to the first head module into a first alignment sequence, and the print data in a data region corresponding to the second head module into a second alignment sequence reverse to the first alignment sequence.

Preferably, the second storing step is configured to read out, of the print data for the one page, the print data in a data region corresponding to the first head module from the image buffer memory in a first read-out direction, and the print data in a data region corresponding to the second head module from the image buffer memory in a second read-out direction reverse to the first read-out direction.

Preferably, the image forming method further comprises a post-processing calculation step of carrying out correction processing on the rearranged print data stored in the image buffer memory. The correction processing on include mask processing to prohibit at least one of the recording elements from performing the recording operation. The at least one of the recording elements can include a defective one of the recording elements. The at least one of the recording elements can include one of overlapping two of the recoding elements which are overlap with each other between the first and second head modules.

According to the present invention, even in a case where the unreversed head unit and the reversed head unit are combined, it is possible to perform printing correctly, without changing the specifications of the image data transfer interface and without raising the conditions relating to the image data control composition.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 13 is a schematic drawing showing a relationship between the arrangement of head modules in an unreversed head, unit and print data which is transferred to the head modules;

DETAILED DESCRIPTION OF THE PREFERRED EMBODIMENTS

First Embodiment

Figure 1:
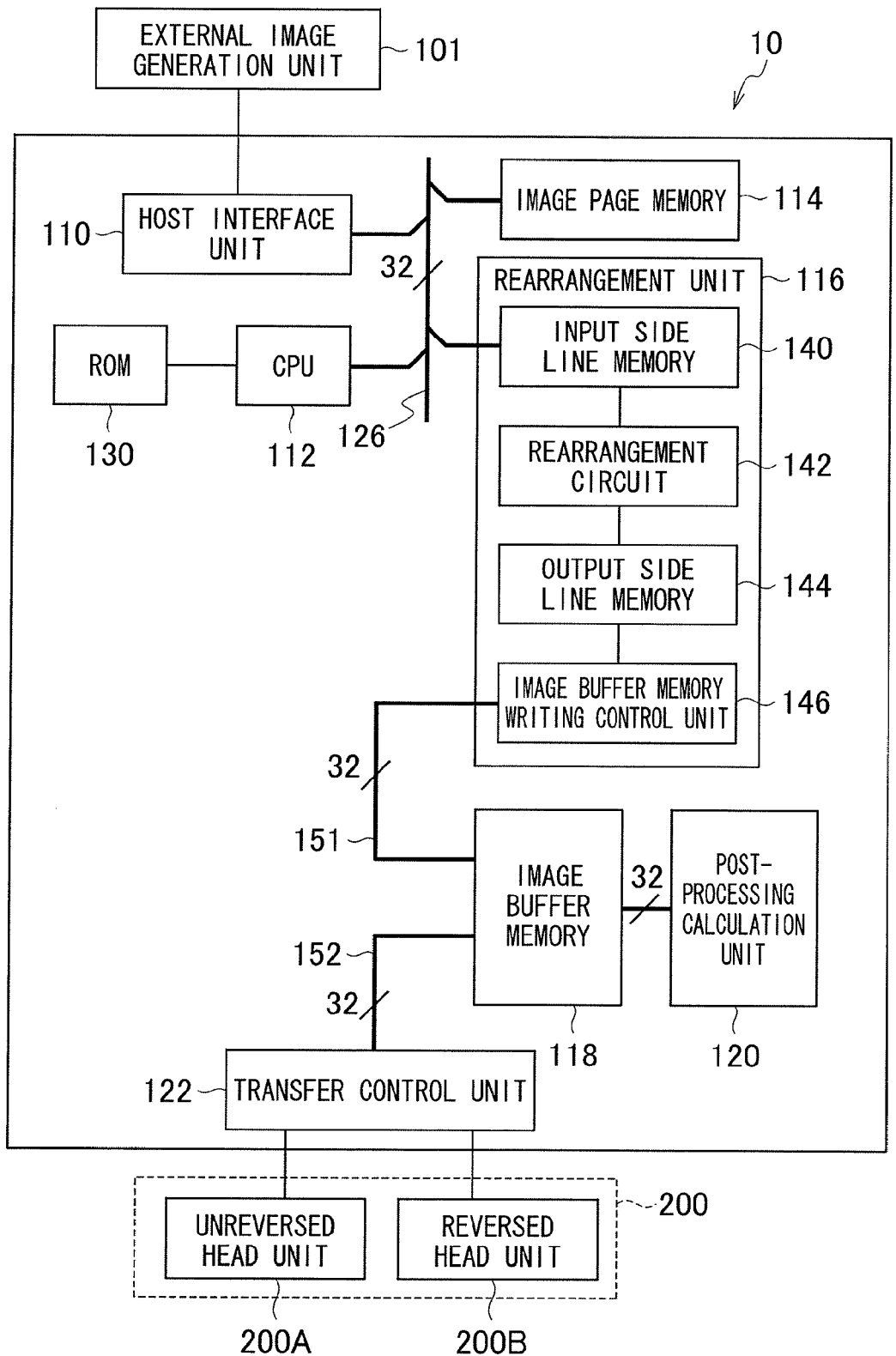
FIG. 1 is a block diagram showing a system composition of an inkjet recording apparatus according to a first embodiment of the present invention.

FIG. 1 is a block diagram showing the system composition of an inkjet recording apparatus 10 according to the first embodiment of the present invention. FIG. 1 principally shows portions relating to the processing of image data only. As shown in FIG. 1, the inkjet recording apparatus 10 according to the present embodiment includes: an interface unit (host interface unit) 110 configured to perform communications with an external image generation unit 101, such as a host computer: a central processing unit (CPU) 112; an image page memory 114; a rearrangement unit 116; an image buffer memory 118; a post-processing calculation unit 120; a transfer control unit 122 configured to transfer data to a line head 200, and the like.

Figure 2:
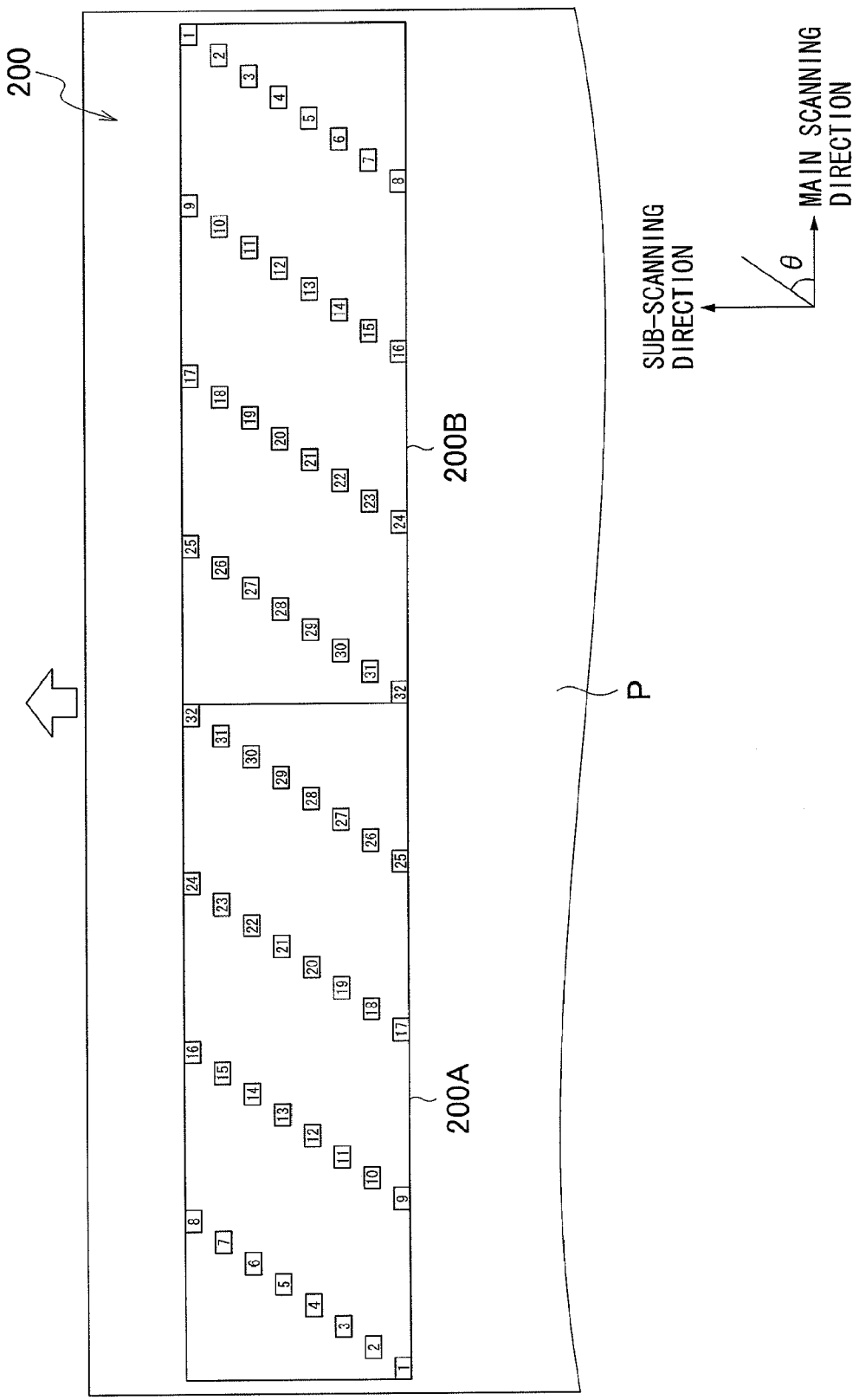
FIG. 2 is a diagram showing a composition of a line head.

The inkjet recording apparatus 10 is an apparatus which records an image on a recording medium or paper P by ejecting and depositing droplets of ink onto the paper P from the line head 200. As shown in FIG. 2, in the inkjet recording apparatus 10, the paper P is moved relatively in a sub-scanning direction with respect to the line head 200 by a conveyance device (not shown), and is caused to pass below the line head 200. The line head 200 forms an image on the paper P by ejecting and depositing droplets of ink from nozzles which are arranged in a lower surface (nozzle surface) of the line head 200. FIG. 2 shows an upper surface of the line head 200, and shows a transparent view of the nozzles which are arranged in the lower surface of the line head 200.

The line head 200 is constituted of two head units, which are an unreversed head unit 200A and a reversed head unit 200B. As shown in FIG. 2, in the unreversed head unit 200A, 32 nozzles are arranged in a matrix configuration according to a uniform arrangement pattern following an oblique column direction having a prescribed angle θ with respect to a main scanning direction perpendicular to the sub-scanning direction. In FIG. 2, the numerals assigned to the respective nozzle positions indicate the numbers of the nozzles (nozzle numbers). These nozzles are arranged in such a manner that the nozzles can be treated effectively as equivalent to the nozzles arranged linearly at a uniform pitch in the main scanning direction. More specifically, an ink droplet that is to be deposited on the paper P adjacently in the main scanning direction to an ink droplet deposited on the paper P by the nozzle number 1 can be ejected by the nozzle number 2, and an ink droplet that is to be deposited on the paper P adjacently in the main scanning direction to the ink droplet deposited on the paper P by the nozzle number 2 can be ejected by the nozzle number 3.

Furthermore, an ink droplet that is to be deposited on the paper P adjacently in the main scanning direction to the ink droplet deposited on the paper P by the nozzle number 8 can be ejected by the nozzle number 9, and the nozzle number 9 is arranged on a straight line along the main scanning direction from the nozzle number 1. The nozzles which are adjacent in the main scanning direction (for example, the nozzle numbers 1, 9, 17 and 25) can be handled as a group having the same amount of delay with respect to the conveyed paper P.

As shown in FIG. 2, the reversed head unit 200B has the same nozzle arrangement as the unreversed head unit 200A, but reversed (rotated) by 180°, while maintaining the same orientation of the nozzle surface (still facing the recording medium). Reference to "180°" here includes a prescribed range centered on 180°, and does not exclude angles other than 180°. For instance, there is no obstacle to the image recording described below provided that the angle is in the range of 180°±1%, and hence this range can be included in the present embodiment.

Consequently, in the reversed head unit 200B, the arrangement of nozzle number 1 to nozzle number 32 is reversed by 180° with respect to the unreversed head unit 200A. Furthermore, the unreversed head unit 200A and the reversed head unit 200B are arranged along a straight line in the main scanning direction, and the nozzles which are mutually adjacent in the main scanning direction of the unreversed head unit 200A and the reversed head unit 200B (for example, the nozzle numbers 1, 9, 17 and 25 in the unreversed head unit 200A and the nozzle numbers 32, 24, 16 and 8 in the reversed head unit 200B) are arranged on a straight line in the main scanning direction. More specifically, the nozzles of the unreversed head unit 200A and the reversed head unit 200B which are mutually adjacent in the main scanning direction can be treated as a group having the same amount of delay.

Referring again to FIG. 1, the host interface unit 110 is a communication interface unit (image input unit) which functions as an image input device that receives image data sent from the image generation unit 101, and is connected to the CPU 112 through a CPU bus 126. For the host interface unit 110, a serial interface, such as a universal serial bus (USB), IEEE 1394, an Ethernet, or a wireless network, or the like, or a parallel interface, such as a Centronics interface, or the like, can be used. It is also possible to install a buffer memory (not shown) for achieving high-speed communications.

The CPU 112 functions as a control device for controlling the whole of the inkjet recording apparatus 10 in accordance with prescribed programs, as well as functioning as a calculation device for performing respective calculations. More specifically, the CPU 112 controls communications with the image generation unit 101 through the host interface unit 110, and controls reading and writing to and from the image page memory 114 and the ROM 130, and the like.

Programs to be executed by the CPU 112 and various data required for control purposes (including test pattern data for determining nozzle characteristics), and the like, are stored in the ROM 130. The ROM 130 can be a non-rewriteable storage device, but if the data of various types is to be updated as necessary, then it is desirable to be a rewriteable storage device, such as an EEPROM.

The image page memory 114 is a storage device which stores an image inputted through the host interface unit 110, and has a storage capacity for storing image data for one page (for instance, several hundred MB to 1 GB). A dynamic random-access memory (DRAM) is used for the image page memory 114 in the present embodiment. The image page memory 114 is connected to the CPU bus 126 and data is written to and read from the image page memory 114 through the CPU 112. This image page memory 114 can be used as a temporary storage region for image data for printing, as well as being used as an area for developing a program executed by the CPU 112 and a calculation work area for the CPU 112. The image page memory 114 is composed in unite (words) each having a 32-bit width, for example, in order to achieve efficient access.

The rearrangement unit 116 is constituted of an input side line memory 140, a rearrangement circuit 142, an output side line memory 144 and an image buffer memory writing control unit 146.

The input side line memory 140 is connected to the image page memory 114 through the CPU bus 126. On the other hand, the output side line memory 144 is connected to the image buffer memory 118 through a first image output bus 151.

The details of the processing performed by the rearrangement unit 116 are described later, and in the rearrangement unit 116, the data sequence is rearranged in such a manner that the data for the adjacent nozzles in an alignment along the main scanning direction of the head is arranged in the same word or in adjacent words. The data for one line that has been rearranged is then transferred from the output side line memory 144 to the image buffer memory 118 through the image buffer memory writing control unit 146, and the data for one line is stored at consecutive addresses in the image buffer memory 118.

The image buffer memory 118 according to the present embodiment is constituted of a DRAM in which one word has a width of 32 bits, and has a capacity for storing data of an image region corresponding to at least the surface area occupied by the two-dimensional matrix arrangement of the nozzles in the line head 200 (corresponding to the range 170 defined with the dotted lines in FIG. 6, which is described hereinafter). The image buffer memory 118 accumulates print data for a plurality of lines corresponding to the surface area occupied by the two-dimensional matrix arrangement of the nozzles in the line head 200.

The post-processing calculation unit 120 is a calculation device which carries out processing such as abnormal nozzle mask processing (droplet ejection prohibition processing) or shading correction processing (processing for increasing or decreasing the droplet ejection rate for each nozzle), in the image buffer memory 118. The print data stored in the image buffer memory 118 is subjected to prescribed post-processing by the post-processing calculation unit 120, and the processed data is rewritten in the image buffer memory 118.

The image buffer memory 118 is connected to a transfer control unit 122 through a second image output bus 152. Print data for one droplet ejection operation (for all of the nozzles) is read out from the image buffer memory 118, and is transferred to the unreversed head unit 200A and the reversed head unit 200B through the transfer control unit 122. The transfer control unit 122 has a line memory 124 (not shown in FIG. 1) which stores print data for one droplet ejection operation, and carries out division processing and transfer format adjustment in order to send the print data to the unreversed head unit 200A and the reversed head unit 200B. Moreover, by serially converting the print data in the transfer control unit 122 and transferring the print data to the unreversed head unit 200A and the reversed head unit 200B, it is possible to reduce the number of signal wires leading to the unreversed head unit 200A and the reversed head unit 200B.

Thus, by adding the print data corresponding to the print contents to the unreversed head unit 200A and the reversed head unit 200B, the driving of the actuators corresponding to the nozzles of the unreversed head unit 200A and the reversed head unit 200B (piezoelectric elements 220 shown in FIG. 22) is controlled and ink is ejected from the corresponding nozzles. An image is formed on the paper P by controlling ink ejection from the unreversed head unit 200A and the reversed head unit 200B in synchronism with the conveyance of the paper P.

Figure 3:
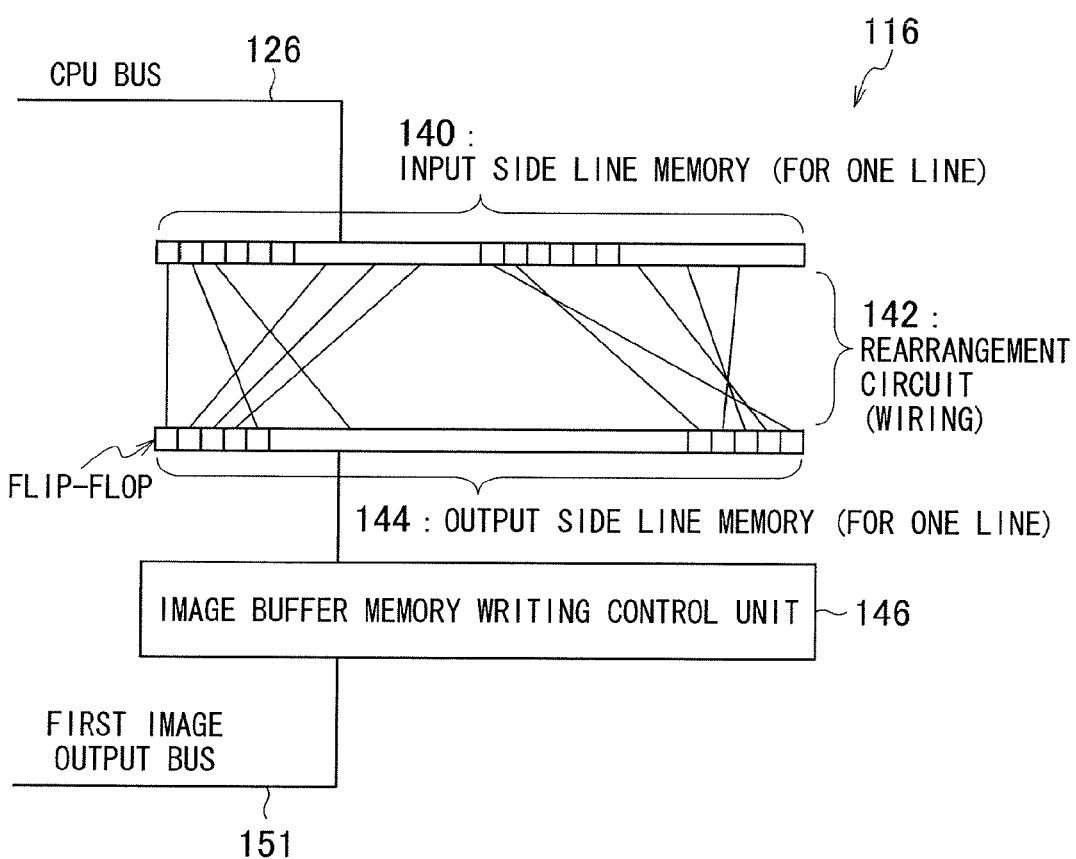
FIG. 3 is a diagram showing a structure of a rearrangement unit.

FIG. 3 shows the structure of the rearrangement unit 116 in an embodiment Each of the input side line memory 140 and the output side line memory 144 is composed of so-called registers (flip-flops). Moreover, the rearrangement circuit 142 is, for example, constituted of a circuit which specifies connections (wiring connections) between the output terminals of the flip-flops in the input side line memory 140 and the input terminals of the flip-flops in the output side line memory 144. The output terminals of the output side line memory 144 are connected to the first image output bus 151 through the image buffer memory writing control unit 146, which carries out the selection/masking process. By suitably changing the wiring mode of the rearrangement circuit 142, it is possible to achieve a desired rearrangement.

Figure 4:
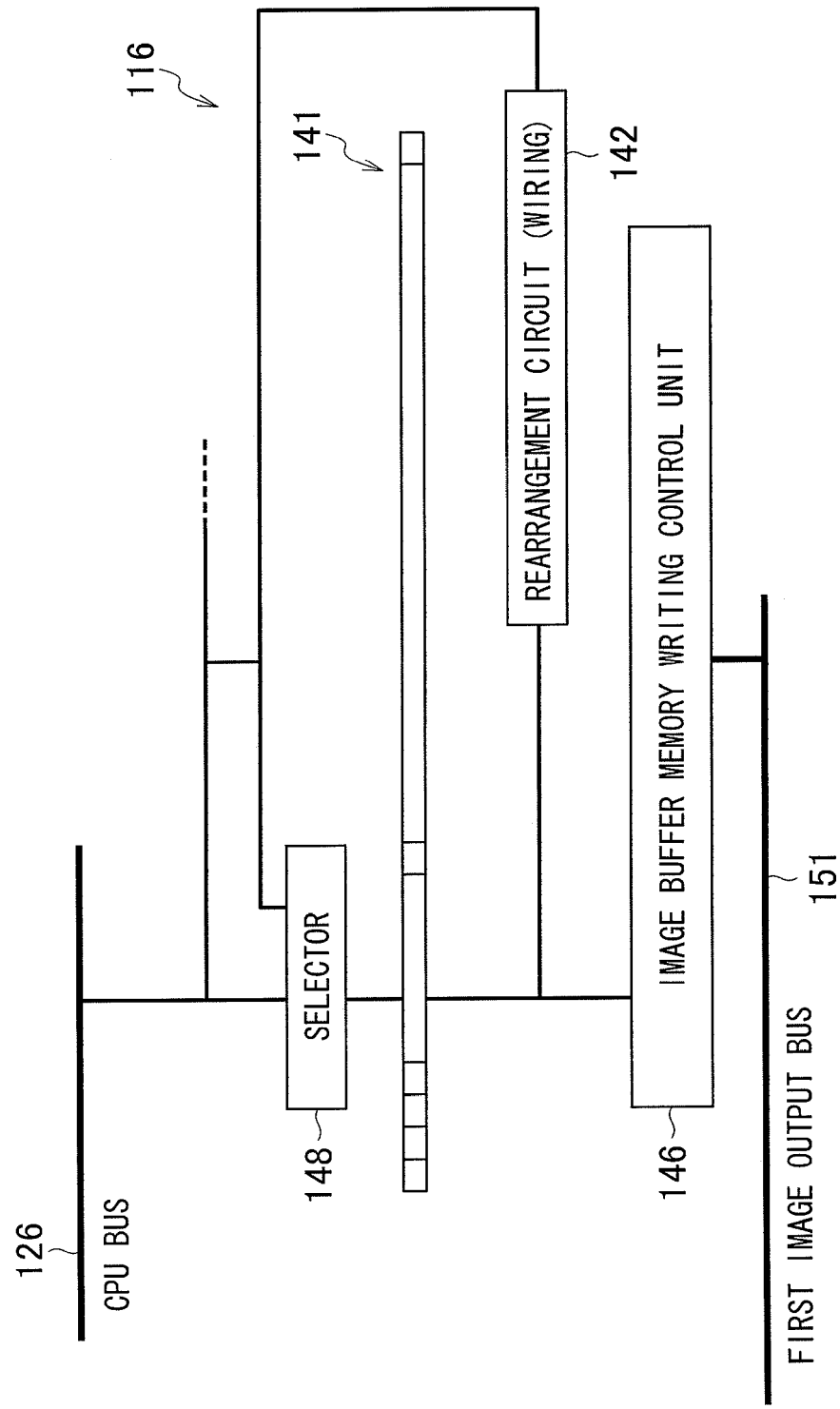
FIG. 4 is a diagram showing a structure of another rearrangement unit.

FIG. 4 shows the structure of the rearrangement unit 116 in another embodiment. In FIG. 4, the elements which are the same as or similar to those in the composition in FIG. 3 are denoted with the same reference numerals and further explanation thereof is omitted here.

In the embodiment in FIG. 3, the composition having the two line memories (140 and 144), on the input side and the output side, is described, but provided that a register enabling high-speed access is used, it is also possible to employ a single line memory by switching the input to the register and connecting (wiring) the output and input sides.

FIG. 4 shows the composition where the rearrangement unit 116 is constituted of the single line memory. A selector 148 shown here is a device that switches the input to the line memory 141. By means of the selector 148, the connection mode for inputting data to the line memory 141 from the CPU bus 126 and the connection mode for inputting the output from the rearrangement circuit 142, to the line memory 141, can be switched selectively.

When data for one line has been written to the line memory 141 through the CPU bus 126, the output from the line memory 141 is rearranged by the rearrangement circuit 142 (wiring). The rearranged data is inputted to the line memory 141 through the selector 148 and stored in the line memory 141.

The thus obtained rearranged data for one line (the data re-stored in the line memory 141) is transferred to the image buffer memory 118 through the image buffer memory writing control unit 146 and the first image output bus 151 (see FIG. 1).

Figure 5:
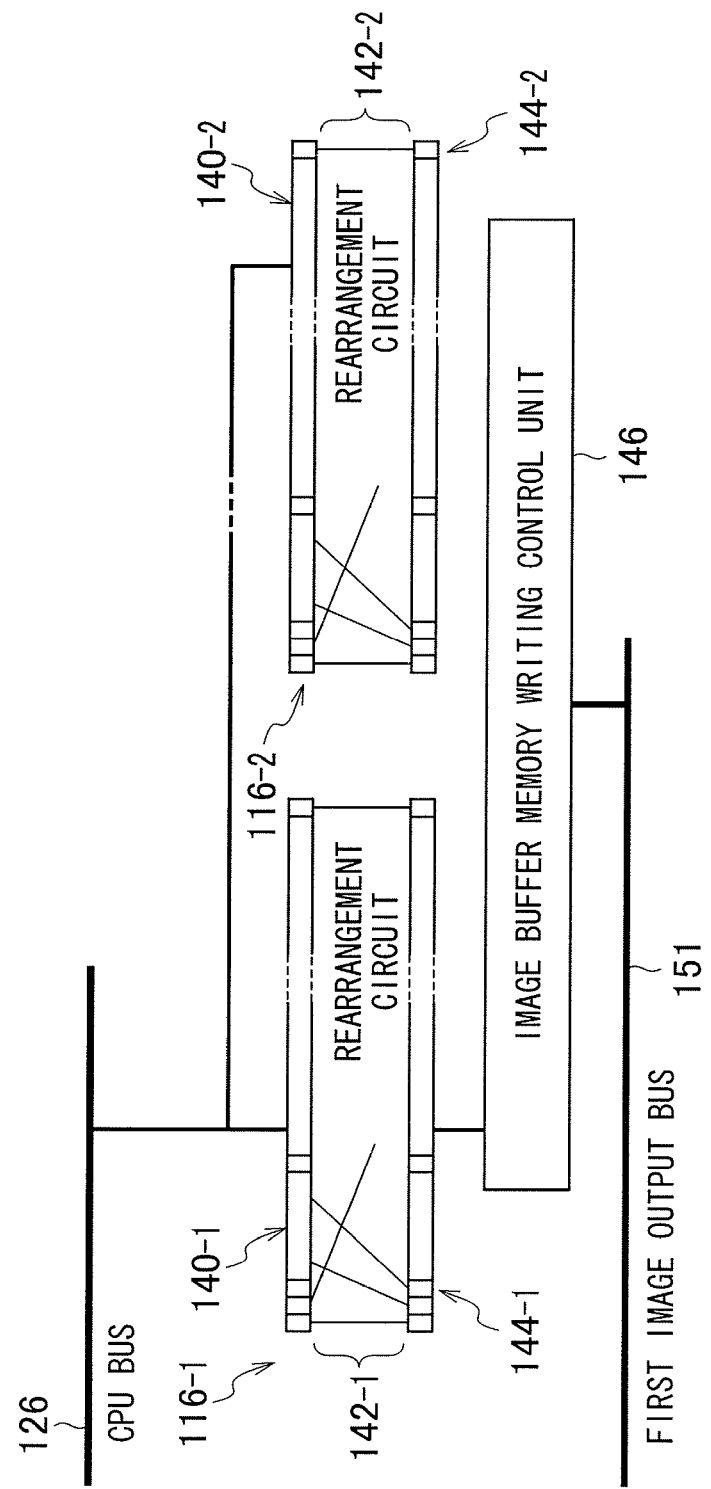
FIG. 5 is a diagram showing a structure of yet another rearrangement unit.

FIG. 5 shows the structure of the rearrangement unit 116 in yet another embodiment. The mode shown in FIG. 5 is a composition using four line memories (in two sets), in which two sets of the rearrangement processing units are provided, each having two line memories, on an input side and an output side, as shown in FIG. 3. In FIG. 5, the elements which are the same as or similar to those in the composition in FIG. 3 are denoted with the same reference numerals and further explanation thereof is omitted here.

In FIG. 5, the composition includes: a first rearrangement unit 116-1, which is constituted of an input side line memory 140-1, a rearrangement circuit 142-1, and an output side line memory 144-1; and a second rearrangement unit 116-2, which is constituted of an input side line memory 140-2, a rearrangement circuit 142-2, and an output side line memory 144-2. Rearrangement processing of one line at a time can be performed at high speed by alternately using the two sets of rearrangement units 116-1 and 116-2.

Furthermore, by adopting the composition such as that in FIG. 5, it is possible to use relatively slow registers, rather than the mode employing high-speed registers shown in FIG. 4. Of course, it is also possible to adopt a composition including a plurality of sets (three or more sets) of rearrangement units, by further expanding the composition using the four line memories (in the two sets) shown in FIG. 5, and in this case, even faster speeds can be achieved.

Next, the processing in the rearrangement unit 116 and the writing and reading of data to and from the image buffer memory 118 will be described in more concrete terms. Here, for the purpose of the description, the transfer of image data (print data) shown in FIG. 6 is explained, assuming that one word is a unit of 4 bits.

Figure 6:
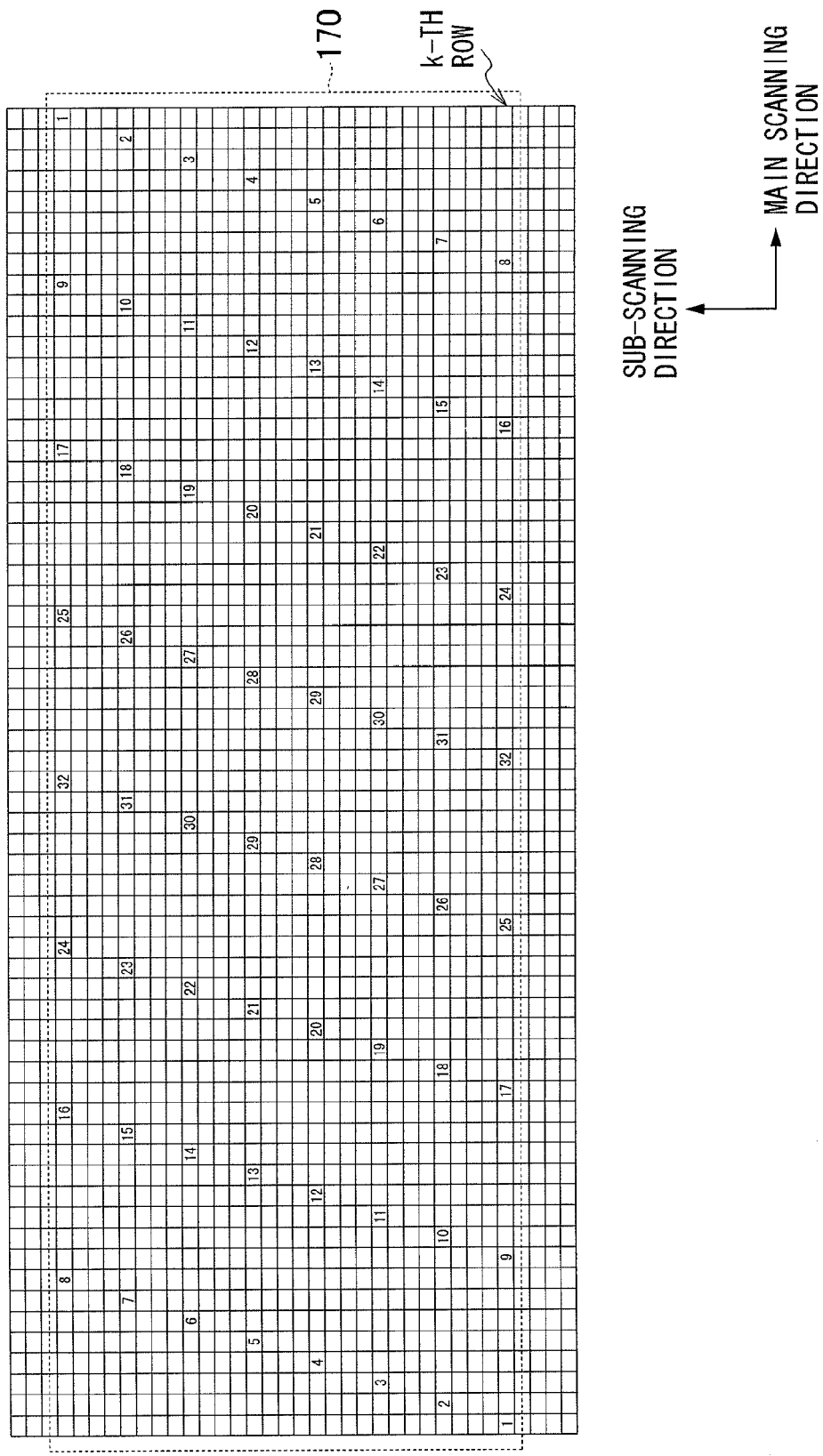
FIG. 6 is a diagram showing print data for one page.

FIG. 6 shows print data for one page, the range 170 defined with the dotted lines in FIG. 6 represents the surface area occupied by the line head 200. The positions of the cells represented by numbers 1 to 32 in the left-hand side half of FIG. 6 correspond respectively to the nozzle numbers 1 to 32 in the unreversed head unit 200A, and the positions of the cells represented by numbers 1 to 32 in the right-hand side half of FIG. 6 correspond respectively to the nozzle numbers 1 to 32 in the reversed head unit 200B. More specifically, the left-hand side half of the print data is printed by the unreversed head unit 200A, and the right-hand side half of the print data is printed by the reversed head unit 200B. The "print data for one page" referred to here indicates one collection of data which is to be recorded by the line head 200, and does not specify one page after printing and binding.

The print data for one page in the image to be printed (FIG. 6) is stored in the image page memory 114 shown in FIG. 1 and the data is read out one line at a time in lines of a sequence of pixels arranged in the main scanning direction (the lateral direction in FIG. 6), from the image page memory 114. The data for one line is transferred to the input side line memory 140 of the rearrangement unit 116.

Figure 7A:
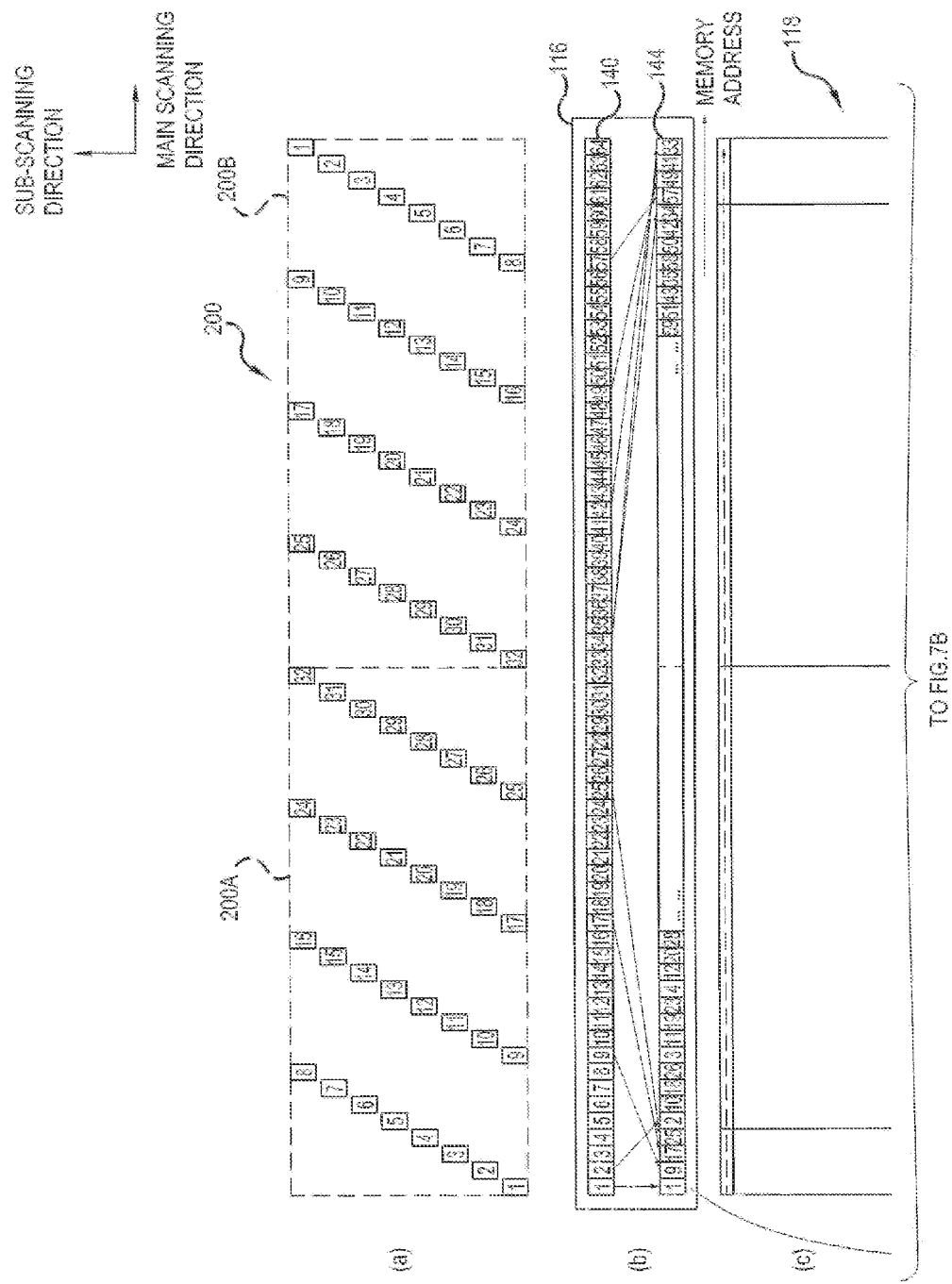
FIGS. 7A & 7B are illustrative diagrams showing a method for writing and reading printing data to and from the image buffer memory in the first embodiment.
Figure 7B:
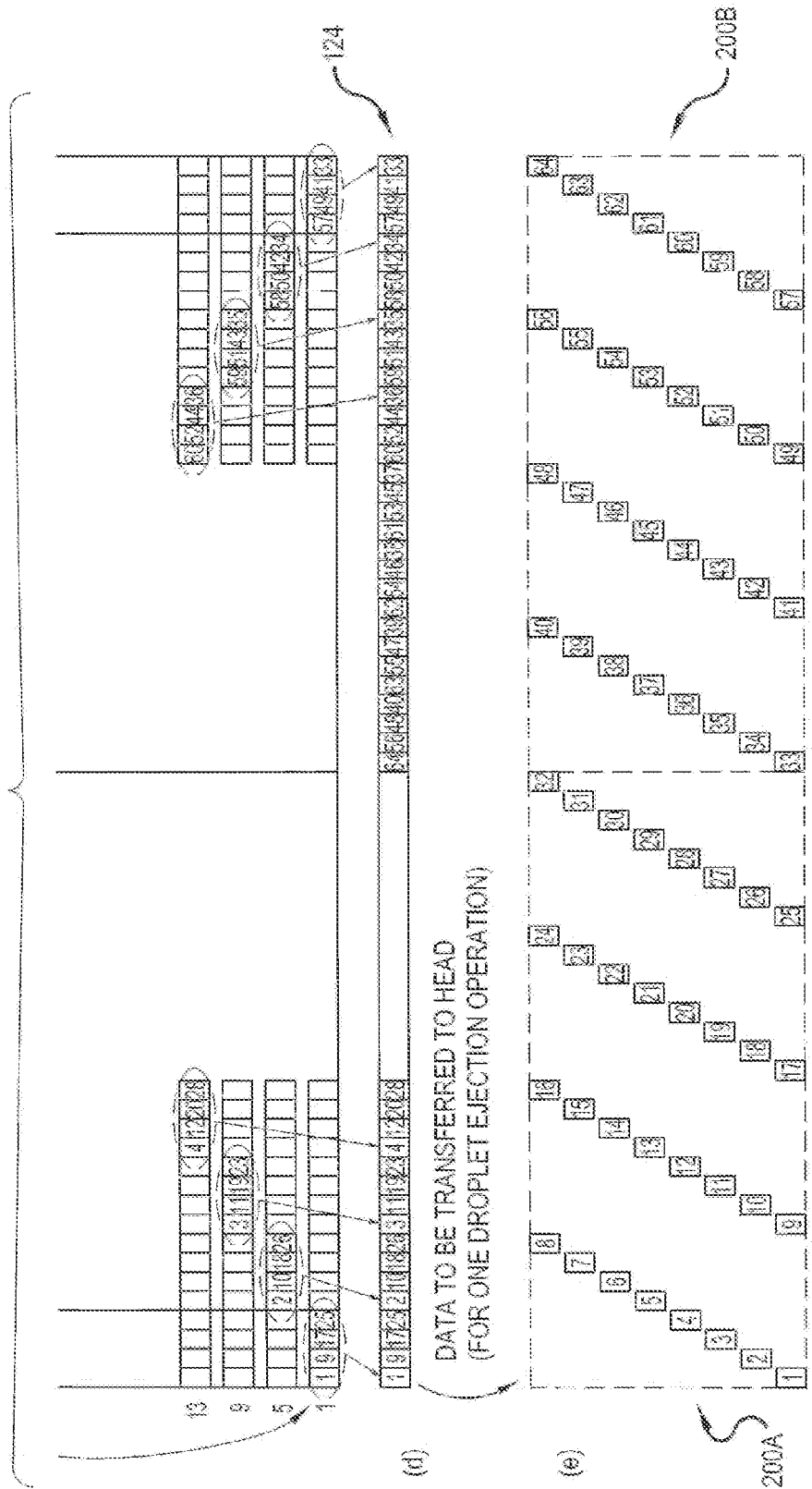

FIGS. 7A & 7B show, in the portion (a), the positions of nobles of the respective nozzle numbers in the unreversed head unit 200A and the reversed head unit 200B, and in the portion (b), a state where the data for one line in a k-th row in FIG. 6 is stored in the input side line memory 140. If the addresses of the input side line memory 140 are taken to be 1 to 64 from left to right, then the data at the addresses 1 to 32 are printed by the unreversed head unit 200A and the data at the addresses 33 to 64 are primed by the reversed head unit 200B.

As shown in the portions (a) and (b) in FIGS. 7A & 7B, of the data for one line, the data corresponding to the nozzle number 1, the nozzle number 9, the nozzle number 17 and the nozzle number 25, which are adjacent in the main scanning direction of the unreversed head unit 200A, are stored at the addresses 1, 9, 17 and 25 in the input side line memory 140. In this way, the data corresponding to the adjacent nozzles have been located at the discrete positions on one line, and the data are rearranged by the rearrangement unit 116 so as to be arranged in the same word (here, one word is a unit of 4 bits).

Moreover, the data corresponding to the nozzle number 32, the nozzle number 24, the nozzle number 16 and the nozzle number 8, which are adjacent in the main scanning direction in the reversed head unit 200B, are stored at the addresses 33, 41, 49 and 57 of the input side line memory 140. Similarly to the case of the unreversed head unit 200A, these data are rearranged by the rearrangement unit 116 so as to be arranged in the same word. Furthermore, because the reversed head unit 200B has the nozzle arrangement that is reversed by 180° with respect to the unreversed head unit 200A, the rearrangement process takes this fact into account.

Firstly, taking the addresses of the output side line memory 144 to be 1 to 64 from left to right, the portion corresponding to the unreversed head unit 200A in the rearrangement circuit 142 is wired in such a manner that the data stored at the addresses 1, 9, 17 and 25 of the input side line memory 140 are stored at the addresses 1, 2, 3 and 4 of the output side line memory 144. It is also wired in such a manner that the data stored at the addresses 2, 10, 18 and 26 of the input side line memory 140 are stored at the addresses 5, 6, 7 and 8 of the output side line memory 144.

Thus, if the data sequence at the addresses 1 to 32 in the input side line memory 140 is taken as {a1, a2, a3, . . . , a32}, then the data rearrangement is carried out to obtain a data sequence in the order of {a1, a9, a17, a25, a2, a10, a18, a26, a3, a11, a19, a27, . . . }, and the data sequence after the rearrangement is stored at the addresses 1 to 32 of the output side line memory 144.

In this way, the data for the adjacent nozzles 1, 9, 17 and 25, which are adjacent in the main scanning direction of the unreversed head unit 200A, are rearranged into the data which are consecutive in the same word. Furthermore, the data sequences {a1, a9, a17, a25}, {a2, a10, a18, a26}, . . . , obtained by dividing the addresses 1 to 32 of the output side line memory 144 into units of 4 bits (1 word) correspond to the adjacent nozzles which are aligned in the main scanning direction of the unreversed head unit 200A.

Moreover, the portion corresponding to the reversed head unit 200B in the rearrangement circuit 142 is wired in such a manner that the data stored at the addresses 33, 41, 49 and 57 of the input side line memory 140 are stored at the addresses 64, 63, 62 and 61 of the output side line memory 144. It is also wired in such a manner that the data stored at the addresses 34, 42, 50 and 58 of the input side line memory 140 are stored at the addresses 60, 59, 58 and 57 of the output side line memory 144.

Thus, if the data sequence at the addresses 33 to 64 in the input side hue memory 140 is taken as {a33, a34, a35, . . . , a64}, then the data rearrangement is carried out to obtain a data sequence in the order of {a33, a41, a49, a57, a34, a42, a50, a58, a35, a43, a51, a59, . . . }, and the data sequence after the rearrangement is stored reversely at the addresses 64 to 33 of the output side line memory 144.

In this way, the data for the adjacent nozzles 32, 24, 16 and 8, which are adjacent in the main scanning direction of the reversed head unit 200B, are rearranged into the data which are consecutive in the same word. Furthermore, the data sequences {a33, a41, a49, a57}, {a34, a42, a50, a58}, . . . , obtained by dividing the addresses from 64 to 33 of the output side line memory 144 into units of 4 bits (1 word) correspond to the adjacent nozzles which are aligned in the main scanning direction in the reversed head unit 200B.

In order to simplify the illustration, here, the number of nozzles aligned in the main scanning direction in the unreversed head unit 200A and the reversed head unit 200B is taken to be four nozzles each (for example, nozzle numbers 1, 7, 13 and 19), and therefore the data corresponding to these nozzles are arranged in the same word. However, in an actual apparatus composition which has a larger number of nozzles, the data corresponding to the respective nozzles are stored at consecutive addresses which span a plurality of words, and therefore the dais corresponding to the adjacent nozzles aligned on a line in the main scanning direction are arranged either in the same word or in the adjacent words.

The data sequences for other row numbers in the print data shown in FIG. 6 are also subjected to the rearrangement processing, one line at a time, in a similar way to that described above. As shown in the portion (c) in FIGS. 7A & 7B, the print data after the rearrangement for the plurality of lines (corresponding to the head surface area) is stored in the image buffer memory 118.

Subsequently, the transfer control unit 122 reads out the data corresponding to the print data for one droplet ejection operation of the unreversed head unit 200A and the reversed head unit 200B from the image buffer memory 118, and transfers the read data to the line memory 124, as shown in the portions (c) and (d) in FIGS. 7A & 7B.

In the case of FIGS. 7A & 7B, taking the addresses of the line memory 124 as 1 to 64 from left to right, the droplet ejection data for the first ejection operation of the unreversed head unit 200A are collected respectively from the 1st row (the bottommost row in the portion (c)), the 5th row, the 9th row, the 13th row, the 17th row, the 21st row, the 25th row and the 29th row of the image buffer memory 118, and are stored in the forward direction from the address 1 of the line memory 124, in word (4-bit) units, as shown in the portions (c) and (d) in FIGS. 7A & 7B. In this way, when the data are read out from the image buffer memory 118 in word units, since the data for the adjacent nozzles which are adjacent in the main scanning direction of the unreversed head unit 200A (nozzles having the same amount of delay) are stored consecutively in the same work, then it is possible to transfer the droplet ejection data for one ejection operation, at high speed.

Furthermore, the droplet ejection data for the first ejection operation of the reversed head unit 200B are collected respectively from the 1st row, the 5th row, the 9th row, the 13th row, the 17th row, the 21st row, the 25th row and the 29th row of the image buffer memory 118 and are stored in the reverse direction from the address 64 of the line memory 124, in word (4-bit) units, as shown in the portions (c) and (d) in FIGS. 7A & 7B. In this way, since the arrangement of the nozzles is reversed by 180° in the reversed head unit 200B, then the data for the adjacent nozzles which are adjacent in the main scanning direction of the reversed head unit 200B (the nozzles having the same amount of delay) are arranged consecutively in the same word in the reverse address direction.

The droplet ejection data for the second ejection operation are respectively collected in work units from the 2nd row, the 6th row, the 10th row, the 14th row, the 18th row, the 22nd row, the 26th row and the 30th row of the image buffer memory 118. Thereupon, the data for one droplet ejection operation is read out similarly from the image buffer memory 118.

The droplet ejection data for one operation which has been read out from the line memory 124 in this way is transferred to the unreversed head unit 200A and the reversed head unit 200B by the transfer control unit 122, and the ejection driving of the respective nozzles is thereby controlled. FIGS. 7A & 7B show, in the portion (e), the data for the droplet ejections performed by the respective nozzles in the unreversed head unit 200A and the reversed head unit 200B.

More specifically, the data sequences {a1, a9, a17, a25}, {a2, a10, a18, a26}, . . . , at the addresses 1 to 32 of the line memory 124 are transferred through the transfer control unit 122 to the unreversed head unit 200A. These data are allocated respectively to the nozzles having the nozzle numbers 1, 9, 17, 25, 2, 10, 18, 26, . . . , of the unreversed head unit 200A.

After the data transfer to the unreversed head unit 200A has been completed, the data sequences {a64, a56, a48, a40}, {a63, a55, a47, a39}, . . . , at the addresses 33 to 64 in the line memory 124 are transferred through the transfer control unit 122 to the reversed head unit 200B. These data are allocated respectively to the nozzles having the nozzle numbers 1, 9, 17, 25, 2, 10, 18, 26, . . . of the reversed head unit 200B.

In this way, with respect to the reversed head unit 200B, the data to be transferred are reversely arranged so as to correspond to the Fact the arrangement of the nozzles is reversed by 180°. Thus, in the line head 200, it is possible to allocate the data transferred from the transfer control unit 122 to the respective nozzles in each head unit, in the nozzle number sequence 1, 9, 17, 25, 2, 10, 18, 26, . . . , regardless of whether the head unit is the unreversed head unit 200A or the reversed head unit 200B. In other words, it is possible to employ the common specifications for the interlace between the transfer control unit 122 and each head unit in the line head 200, regardless of whether or not the reversed head unit 200B is present.

Similar rearrangement of the data is performed by the rearrangement unit 116 in respect of both the unreversed head unit 200A and the reversed head unit 200B, and by reversing the data corresponding to the reversed head unit 200B in the read-out process from the output side line memory 144 to the image buffer memory 118, it is possible to employ the common specifications for the interface between the transfer control unit 122 and each head unit of the line head 200, similarly to the description given above.

In the present embodiment, it is not an essential condition that the data must be rearranged in such a manner that the data for pixels corresponding to adjacent recording elements aligned on a straight line in the main scanning direction are arranged in the same word or in adjacent words. In other words, even in the case of specifications where the print data corresponding to respective nozzles are read out directly from the image page memory 114 into the line memory 124 of the transfer control unit 122, it is possible to adopt the common specifications for the interface between the transfer control unit 122 and each head units of the line head 200, by reading out the data relating to the region corresponding to the reversed head unit 200B, to the line memory 124, in reverse data sequence with respect to the region corresponding to the unreversed head unit 200A.

Figure 8:
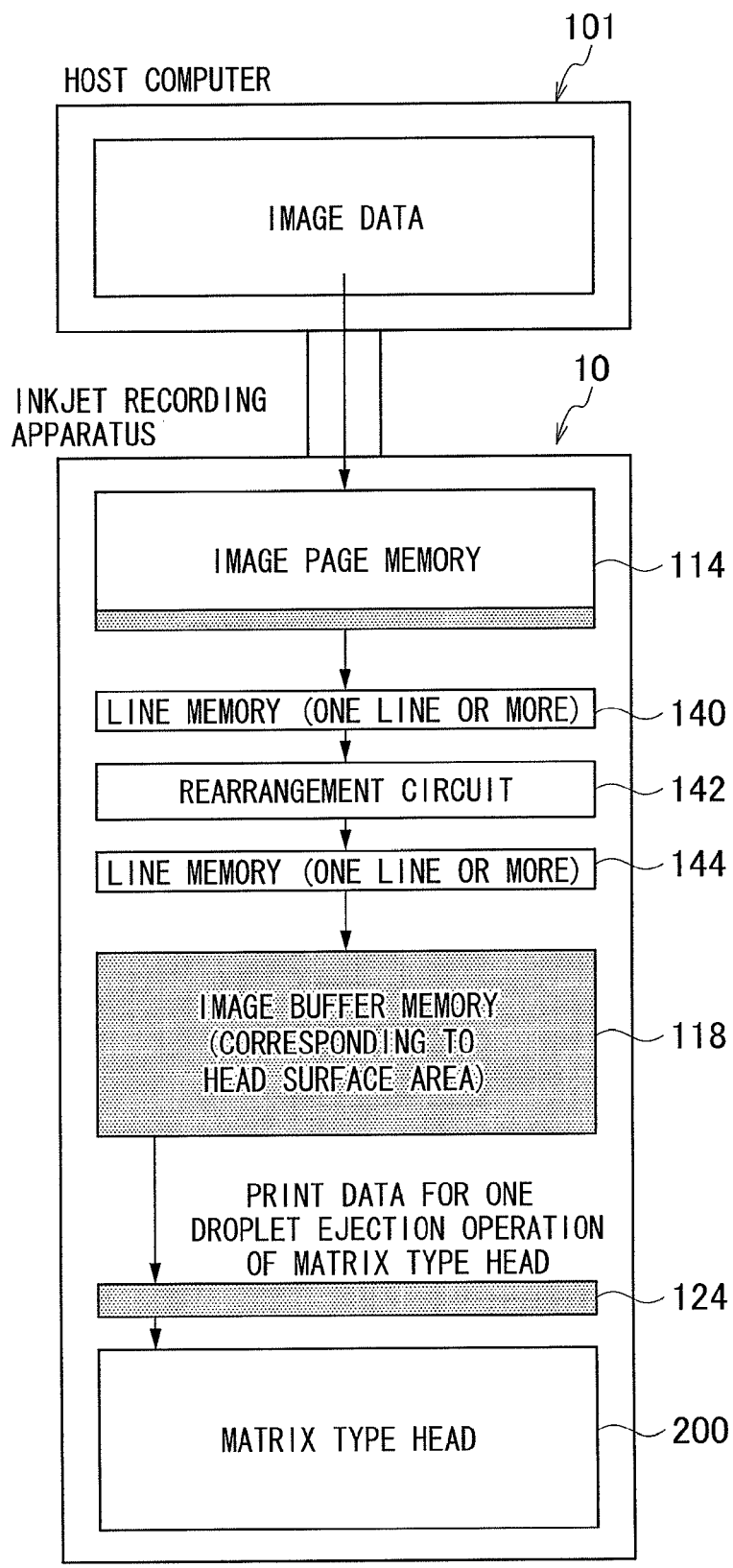
FIG. 8 is a schematic drawing showing a flow of the image data.

Next, the operation of the inkjet recording apparatus 10 in the present embodiment which is composed as described above will be described following the data flow during printing. FIG. 8 is a schematic drawing showing the flow of image data.

Here, the composition which includes the image page memory 114 in the inkjet recording apparatus 10 is adopted, and the image data for one page is transferred to the inkjet recording apparatus 10 from the image generation unit 101 through the prescribed communication interface. Furthermore, the composition which is shown in FIG. 3 is employed in the rearrangement processing unit 116.

<Step 1> Firstly, the image data for one page which is to be printed is stored in the image page memory 114. In this case, if the input image has multiple tones, then a so-called binarization process, such as error diffusion processing or a blue-noise mask processing, or the like, is carried out and the data is converted into 1 bit to 2 bit data per pixel, and stored in the image page memory 114. This conversion processing is carried out generally in the image generation unit 101, but can be carried out by the CPU 112 in the inkjet recording apparatus 10.

<Step 2> Thereupon, the print data stored in the image page memory 114 is transferred to the input side line memory 140 of the rearrangement unit 116, one line in the main scanning direction at a time. The transfer of data in this case is carried out in word units from the image page memory 114 (in the present embodiment, each word unit having a width of 32 bits).

<Step 3> The data stored in the input side line memory 140 is rearranged in the rearrangement circuit 142 and written to the output side line memory 144. This rearrangement process is carried out in such a manner that the data for the adjacent nozzles in the matrix type line head (the nozzles aligned in the main scanning direction) are arranged in the same word or in the adjacent words. Furthermore, in respect of the reversed head unit, it is taken into account that the nozzle arrangement differs by 180° from the unreversed head unit.

<Step 4> The data stored in the output side line memory 144 is transferred to the image buffer memory 118. In this case, the data for one line having been transferred from the output side line memory 144 are stored at the consecutive addresses in the image buffer memory 118.

<Step 5> The print data for one droplet ejection operation is read out from the image buffer memory 118 to the line memory 124, and is transferred to the unreversed head unit 200A and the reversed head unit 200B through the transfer control unit 122. Although the data are read from the incompletely consecutive addresses in the image buffer memory 118 in contrast to the writing of the data, since the data to be read have been gathered in the word units in the image buffer memory 118, it is then possible to carry out the consecutive access in word units. Furthermore, rather than requiring a special memory composition for the image buffer memory 118, it is possible to compose the image buffer memory 118 readily using a general DRAM based in 32-bit units.

It is also possible to process the print data on the image buffer memory 118 by the post-processing calculation unit 120 (see FIG. 1), or the like, between the storage of the data in the image buffer memory 118 and the transfer of the data to the unreversed head unit 200A and the reversed head unit 200B. As stated previously, since the data for a plurality of printing operations is stored in the image buffer memory 118 and the nozzle positions in the unreversed head unit 200A and the reversed head unit 200B correspond to the addresses in the image buffer memory 118, then a merit is obtained in that, for instance, post-processing can be achieved readily (at high speed) for the print data corresponding to the nozzles, which appear to be complicated to process in the image data.

Figure 9:
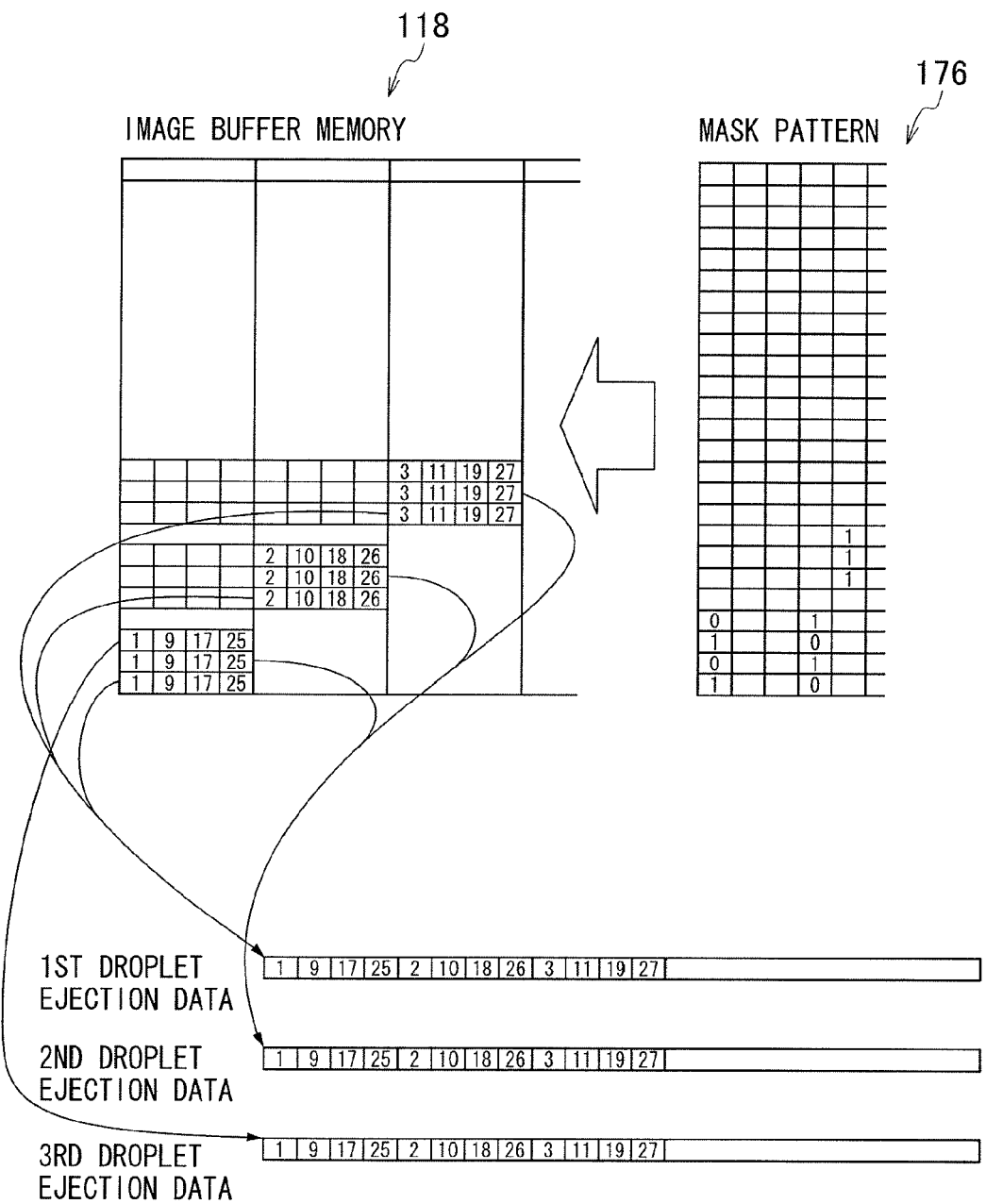
FIG. 9 is a diagram showing a mask processing the image buffer memory.

FIG. 9 shows an example of the mask processing on the image buffer memory 118, as one example of processing in the post-processing calculation unit 120. FIG. 9 is an illustrative diagram showing one example of the post-processing calculation unit 120.

In the image buffer memory 118, the print data for the plurality of droplet ejection operations is stored in a format in which the nozzle positions in the head units and the memory addresses correspond to each other. Consequently, it is possible to control the data for a particular nozzle by applying an AND operation of the mask pattern 176 to the data stored in the image buffer memory 118, as shown in the example in FIG. 9.

In this example, a mask pattern in which values of "1 (ON)" and "0 (OFF)" are allocated alternately to the positions corresponding to the nozzle numbers "1" and "25" is used as the mask pattern 176, and ejection is switched off forcibly in each droplet ejection operation in respect of the nozzle numbers "1" and "25".

By applying the mask processing described above to defective ejection nozzles, for example, it is possible to prohibit the operation of the defective ejection nozzles.

A further example of the processing in the post-processing calculation unit 120 is shading correction for increasing or decreasing the droplet ejection rate in respect of each nozzle.

Second Embodiment

The unreversed head unit 200A in the first embodiment has the arrangement of nozzles having point symmetry with respect to the center of the unreversed head unit 200A, and therefore the unreversed head unit 200A and the reversed head unit 200B have mutually equivalent nozzle arrangements. The second embodiment is described with respect to a case of using head units each of which has an arrangement of nozzles that is asymmetrical with respect to the center of the head unit. The system composition of the inkjet recording apparatus 10 according to the present embodiment is similar to the block diagram shown in FIG. 1, and detailed description thereof is omitted here.

Figure 10A:
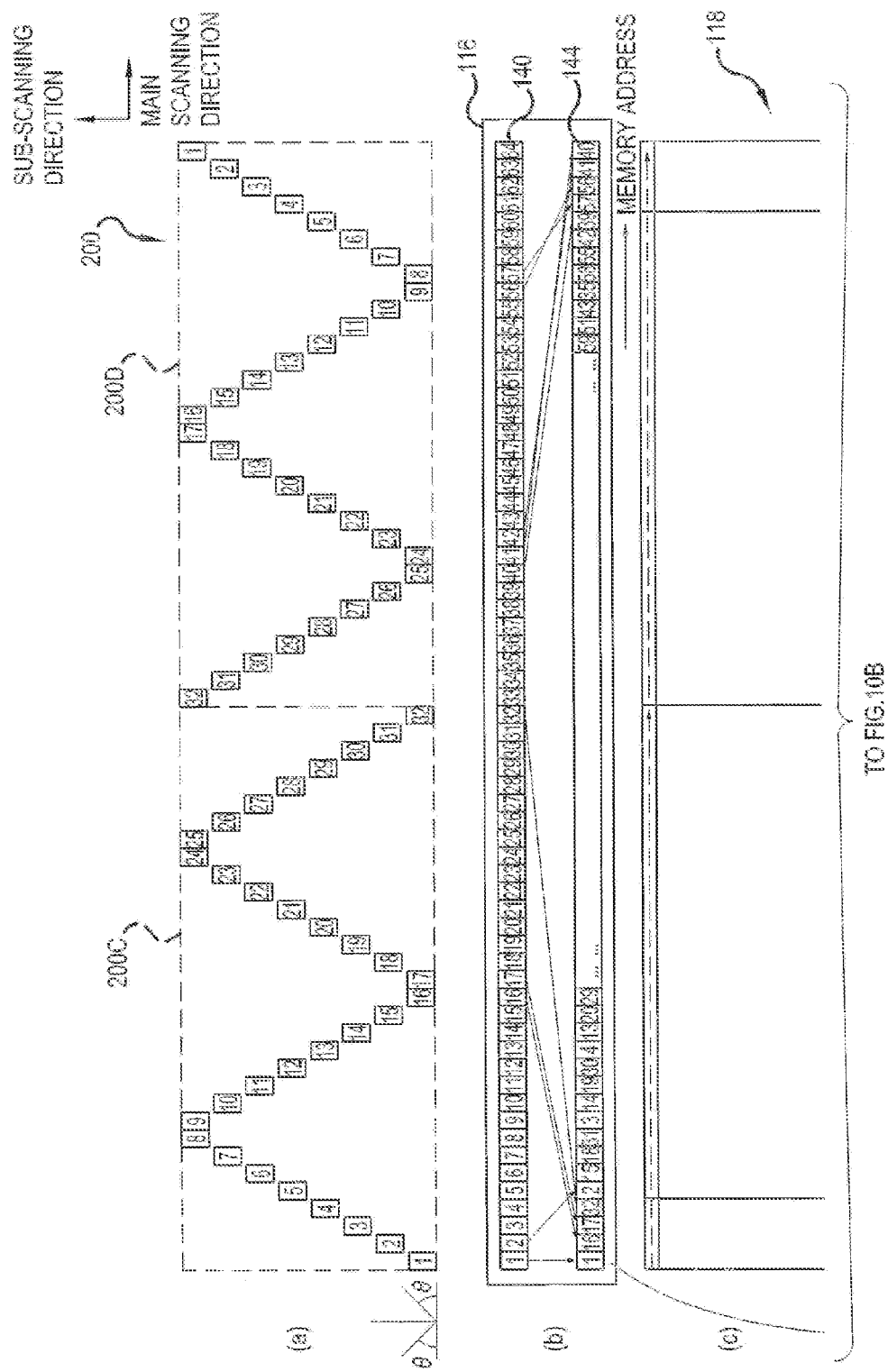
FIGS. 10A & 10B are illustrative diagrams showing a method for writing and reading printing data to and from the image buffer memory in a second embodiment of the present invention.
Figure 10B:
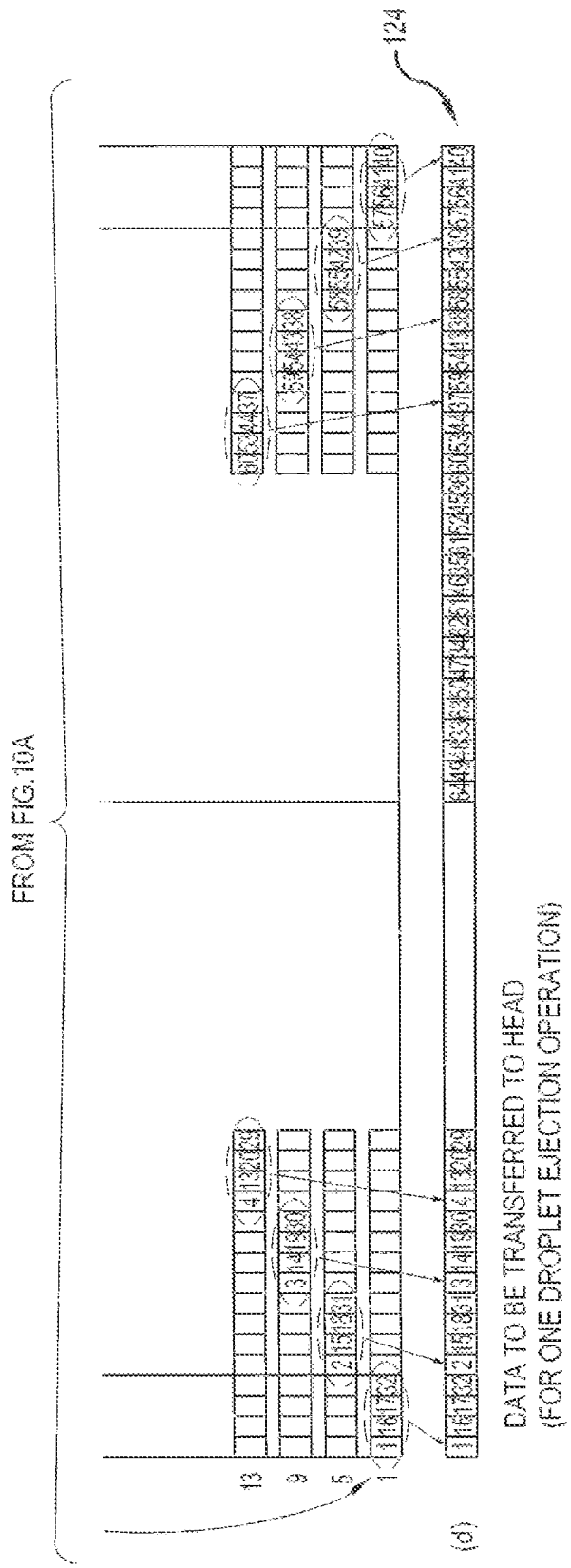

FIGS. 10A & 10B show, in the portion (a), the unreversed head unit 200C according to the present embodiment, in which 32 nozzles are arranged along oblique column directions respectively having an angle of θ and an angle of 180° minus θ, with respect to the main scanning direction. These nozzles are arranged in such a manner that the nozzles can be treated effectively as equivalent to the nozzles arranged linearly at a uniform pitch in the main scanning direction.

The adjacent nozzles which are adjacent in the main scanning direction (for example, the nozzle numbers 1, 16, 17 and 32) are arranged on a straight line in the main scanning direction, and have the same amount of delay with respect to the conveyed recording medium.

FIGS. 10A & 10B also show, in the portion (a), the reversed head unit 200D having the same nozzle arrangement as the unreversed head unit 200C, but reversed (rotated) by 180°, while maintaining the same orientation of the nozzle surface (still facing the recording medium). Since the arrangement of the nozzles in each head unit is asymmetrical with respect to the center of the head unit, then the arrangements of the nozzles are different in the unreversed head unit 200C and the reversed head unit 200D.

The unreversed head unit 200C and the reversed head unit 200D are arranged along the straight line in the main scanning direction, and the nozzles which are mutually adjacent in the main scanning direction of the unreversed head unit 200C and the reversed head unit 200D (for example, the nozzle numbers 1, 16, 17 and 25 in the unreversed head unit 200C and the nozzle numbers 25, 24, 9 and 8 in the reversed head unit 200D) are arranged on a straight line in the main scanning direction. More specifically, the nozzles of the unreversed head unit 200C and the reversed head unit 200D which are mutually adjacent in the main scanning direction have the same amount of delay.

FIGS. 10A & 10B show, in the portion (b), a state where the data for one line is stored in the input side line memory 140. The data at the addresses 1 to 32 in the input side line memory 140 are printed by the unreversed head unit 200C, and the data at the addresses 33 to 64 are printed by the reversed head unit 200D.

As shown in the portions (a) and (b) in FIGS. 10A & 10B, of the data for one line, the data corresponding to the nozzle numbers 1, 16, 17 and 32, which are adjacent in the main scanning direction of the unreversed head unit 200C, have been stored at the addresses 1, 16, 17 and 32 in the input side line memory 140. The rearrangement unit 116 carries out the data rearrangement in such a manner that these data are arranged in the same word (here, a 4-bit unit).

The data corresponding to the nozzle numbers 25, 24, 9 and 8, which are adjacent in the main scanning direction in the reversed head unit 200D, have been stored at the addresses 40, 41, 56 and 57 of the input side line memory 140. Similarly to the case of the unreversed head unit 200C the rearrangement unit 116 rearranges the data in such a manner that these data are arranged in the same word. Because the reversed head unit 200D has the nozzle arrangement that is reversed by 180° with respect to the unreversed head unit 200C, the rearrangement process takes this fact into account.

Firstly, the portion corresponding to the unreversed head unit 200C in the rearrangement circuit 142 is wired in such a manner that the data stored at the addresses 1, 16, 17 and 32 of the input side line memory 140 are stored at the addresses 1, 2, 3 and 4 of the output side line memory 144. It is also wired in such a manner that the data stored at the addresses 2, 15, 18 and 31 of the input side line memory 140 are stored at the addresses 5, 6, 7 and 8 of the output side line memory 144.

Thus, if the data sequence at the addresses 1 to 32 in the input side line memory 140 is taken as {a1, a2, a3, ..., a32}, then the data rearrangement is earned out to obtain a data sequence in the order of {a1, a16, a17, a32, a2, a15, a18, a31, a3, a14, a19, a30, ... }, and the data sequence after the rearrangement is stored at the addresses 1 to 32 of the output side line memory 144.

In this way, the data for the adjacent nozzles 1, 16, 17 and 32, which are adjacent in the main scanning direction of the unreversed head unit 200C, are rearranged into the data which are consecutive in the same word. Furthermore, the data sequences {a1, a16, a17, a32}, {a2, a15, a18, a31}, ..., obtained by dividing the addresses 1 to 32 of the output side line memory 144 into units of 4 bits (1 word) correspond to the adjacent nozzles which are aligned in the main scantling direction of the unreversed head unit 200C.

Moreover, the portion corresponding to the reversed head unit 200D in the rearrangement circuit 142 is wired in such a manner that the data stored at the addresses 40, 41, 56 and 57 of the input side line memory 140 are stored at the addresses 64, 63, 62 and 61 of the output side line memory 144. It is also wired in such a manner that the data stored at the addresses 39, 42, 55 and 58 of the input side line memory 140 are stored at the addresses 60, 59, 58 and 57 of the output side line memory 144.

Thus, if the data sequence at the address 33 to 64 in the input side line memory 140 is taken as {a33, a34, a35, ..., a64}, then the data rearrangement is carried out to obtain a data sequence in the order of {a40, a41, a56, a57, a39, a42, a55, a38, a43, a54, a59, ... }, and the data sequence after the rearrangement is stored reversely at the addresses 64 to 33 of the output side line memory 144.

In this way, the data for the adjacent nozzles 25, 24, 9 and 8, which are adjacent in the main scanning direction of the reversed head unit 200D, are rearranged into the data which are consecutive in the same word. Furthermore, the data sequences {a40, a41, a56, a57}, {a39, a42, a55, a58}, ..., obtained by dividing the addresses from 64 to 33 of the output side line memory 144 into units of 4 bits (1 word) correspond to the adjacent nozzles which re aligned in the main scanning direction in the reversed head unit 200D.

Similarly to the first embodiment, the data sequences for other row numbers in the print data are also subjected to the rearrangement processing, one line at a time. As shown in the portion (c) in FIGS. 10A & 10B, the print data after the rearrangement for the plurality of lines (corresponding to the head surface area) is stored in the image buffer memory 118.

Subsequently, the transfer control unit 122 reads out the data corresponding to the print data for one droplet ejection operation of the unreversed head unit 200C and the reversed head unit 200D from the image buffer memory 118, and transfers the read data to the line memory 124, as shown in the portions (c) and (d) in FIGS. 10A & 10B.

In the case of FIGS. 10A & 10B, the droplet ejection data for the first ejection operation of the unreversed head unit 200C are collected respectively from the 1st row (the bottommost row in the portion (c)), the 5th row, the 9th row, the 13th row, the 17th row, the 21st row, the 25th row and the 29th row of the image buffer memory 118, and are stored in the forward direction from the address 1 of the line memory 124, in word (4-bit) units, as shown in the portions (c) and (d) in FIGS. 10A & 10B.

Furthermore, the droplet ejection data for the first ejection operation of the reversed head unit 200D are collected respectively from the 1st row, the 5th row, the 9th row, the 13th row, the 17th row, the 21st row, the 25th row and the 29th row of the image buffer memory 118 and are stored in the reverse direction from the address 64 of the line memory 124, in word (4-bit) units, as shown in the portions (c) and (d) in FIGS. 10A & 10B. In this way, since the arrangement of the nozzles is reversed by 180° in the reversed head unit 200D, then the data for the adjacent nozzles which are adjacent in the main scanning direction of the reversed head unit 200D are arranged consecutively in the same word in the reverse address direction.

The droplet ejection data for the second ejection operation are respectively collected in word units from the 2nd row, the 6th row, the 10th row, the 14th row, the 18th row, the 22nd row, the 26th row and the 30th row of the image buffer memory 118. Thereupon, the data for one droplet ejection operation is read out similarly from the image buffer memory 118.

The droplet ejection data for one operation which has been read out from the line memory 124 in this way is transferred to the unreversed head unit 200C and the reversed head unit 200D by the transfer control unit 122, and the ejection driving of the respective nozzles is thereby controlled.

More specifically, the data sequences {a1, a16, a17, a32}, {a2, a15, a18, a31}, ..., at the addresses 1 to 32 of the line memory 124 are transferred through the transfer control unit 122 to the unreversed head unit 200C. These data are allocated respectively to the nozzles having the nozzle numbers 1, 16, 17, 32, 2, 15, 18, 31, ..., of the unreversed head unit 200C.

After the data transfer to the unreversed head unit 200C has been completed, the data sequences {a64, a49, a48, a33}, {a63, a50, a47, a34}, ..., at the addresses 33 to 64 in the line memory 124 are transferred through the transfer control unit 122 to the reversed head unit 200D. These data are allocated respectively to the nozzles having the nozzle numbers 1, 16, 17, 32, 2, 15, 18, 31, ..., of the reversed head unit 200B.

Thus, in the line head 200, it is possible to allocate the data transferred from the transfer control unit 122 to the respective nozzles in each head unit, in the nozzle number sequence 1, 16, 17, 32, 2, 15, 18, 31, ..., regardless of whether the head unit is the unreversed head unit 200C or the reversed head unit 200D. In other words, it is possible to employ common specifications for the interface between the transfer control unit 122 and each head unit in the line head 200, regardless of whether or not the reversed head unit 200D is present.

Third Embodiment

Figure 11:
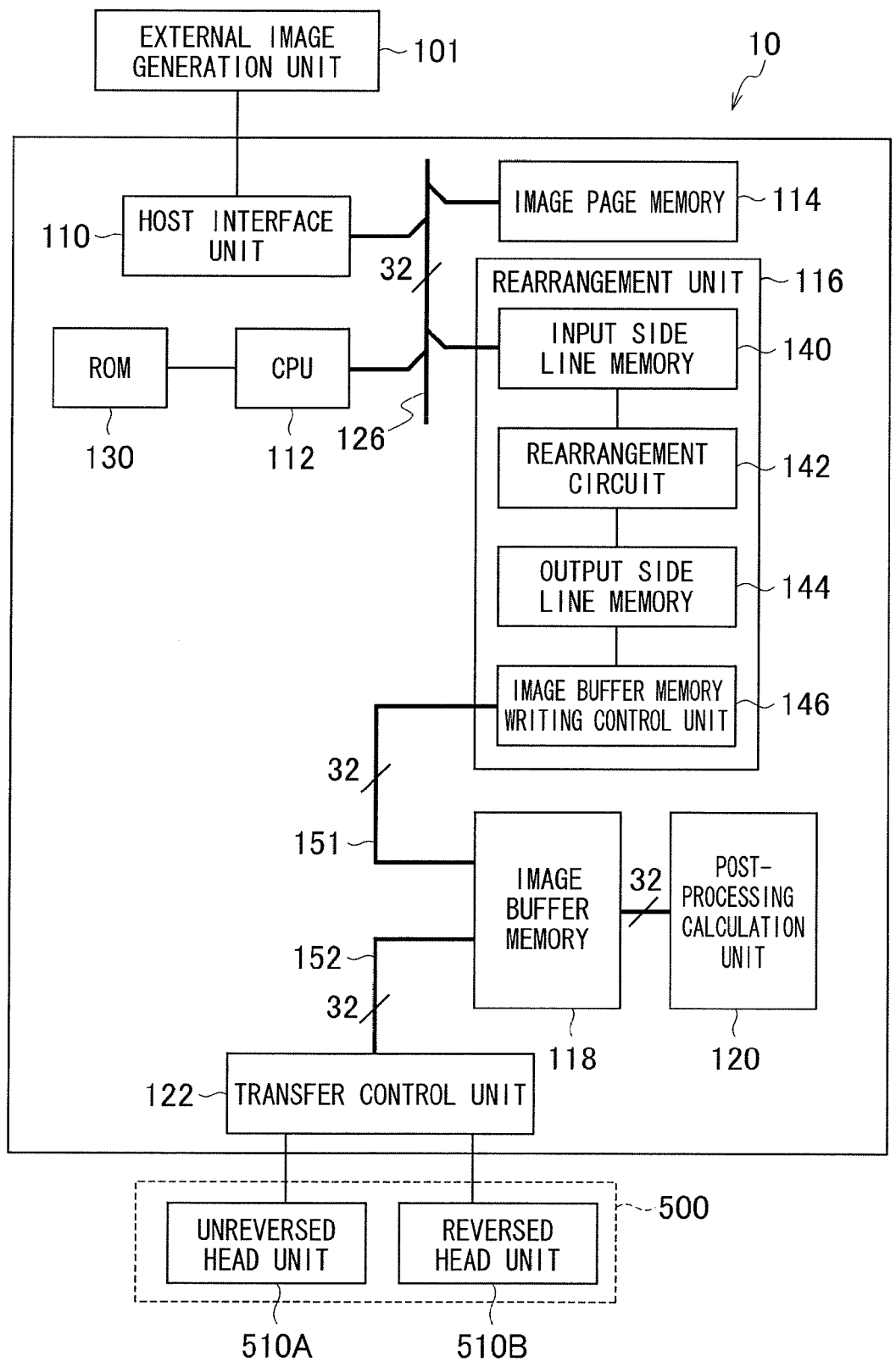
FIG. 11 is a block diagram showing a system composition of an inkjet recording apparatus according to a third embodiment of the present invention.

FIG. 11 is a block diagram showing the system composition of the inkjet recording apparatus 10 according to the third embodiment of the present invention. Parts which are the same as or similar to those in the block diagram shown in FIG.

1 are denoted with the same reference numerals and detailed explanation thereof is omitted here. As shown in FIG. 11, the line head 500 in the present embodiment is constituted of two types of head units, which are unreversed head units 510A and reversed head units 510B. The transfer control unit 122 transfers the print data to the unreversed head units 510A and the reversed head units 510B. In the present embodiment, the print data is rearranged in such a manner that the common specifications can be adopted for the interface for the data transfer to the unreversed head units 510A and the data transfer to the reversed head units 510B.

Figure 12:
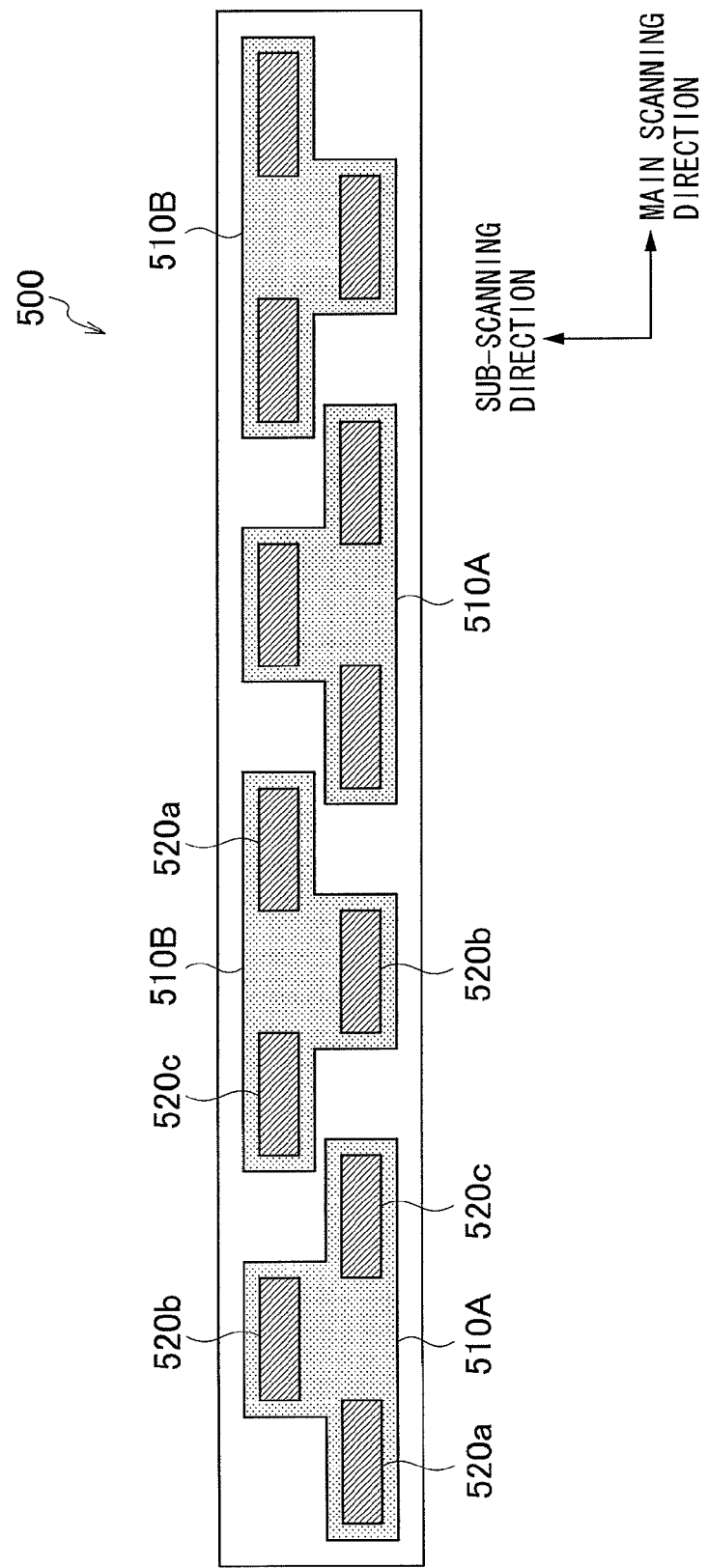
FIG. 12 is a schematic drawing showing a line head in the third embodiment.

FIG. 12 is a schematic drawing showing the line head 500 in the present embodiment. As shown in FIG. 12, in the line head 500, the unreversed head units 510A and the reversed head units 510B are arranged alternately.

Each of the unreversed head units 510A includes three head modules 520a, 520b and 520c, which are arranged in a staggered configuration. Each of the head modules 520a, 520b and 520c has the similar nozzle arrangement to the unreversed head unit 200A shown in FIG. 2.

The reversed head unit 510B has the same nozzle arrangement as the unreversed head unit 510A, but reversed (rotated) by 180°, while maintaining the same orientation of the nozzle surface (still facing the recording medium). Then, each of the reversed head units 510B includes the three head modules 520a, 520b and 520c arranged in a staggered configuration, and each of the head modules 520a, 520b and 520c has the similar nozzle arrangement to the reversed head unit 200B shown in FIG. 2.

Moreover, the unreversed head unit 510A has the head modules arranged in the sequence 520a, 520b and 520c from the left-hand side in FIG. 12, whereas the reversed head unit 510B has the head modules arranged in the sequence 520c, 520b and 520a from the left-hand side in FIG. 12.

Next, the processing of the print data transferred to the unreversed head unit 510A will be described with reference to FIGS. 13 and 14.

FIG. 13 shows, in the portion (a), a relationship between the arrangement of the head modules 520a, 520b and 520c in the unreversed head unit 510A and the print data, transferred to the head modules 520a, 520b and 520c. As shown in FIG. 13, the print data is transferred by taking account of the amount of delay of each head, and hence there are dummy data sections.

FIG. 13 shows, in the portion (b), an enlarged diagram of the portion enclosed by dashed lines in the portion (a), and the assigned numerals indicate the nozzle numbers of the unreversed head unit 510A. More specifically, the nozzle numbers are assigned as follows overall; the nozzle numbers 1 to 32 of the head module 520a are set as 1 to 32, the nozzle numbers 1 to 32 of the head module 520b are set as 33 to 64, and the nozzle numbers 1 to 32 of the head modules 520c are set as 65 to 96. As shown in FIG. 13, in the present embodiment, the size of the dummy data sections in the sub-scanning direction is the sum of the width of each head module in the sub-scanning direction (equivalent to 8 nozzles) and the width of the gap in the sub-scanning direction (equivalent to 2 nozzles).

Figure 14A:
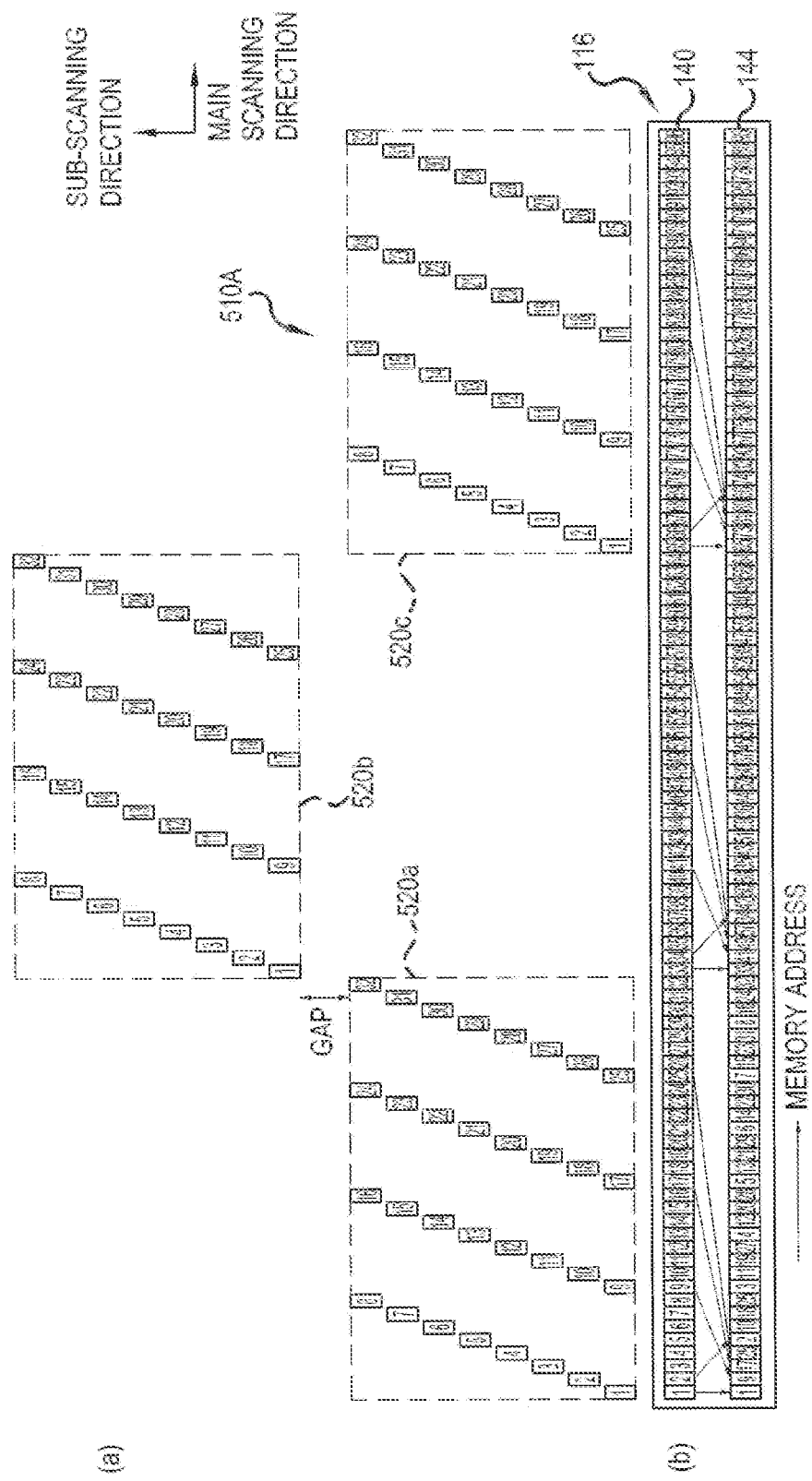
FIGS. 14A & 14B are illustrative diagrams showing a method for writing and reading printing data to and from the image buffer memory, corresponding to the unreversed head unit in the third embodiment.
Figure 14B:
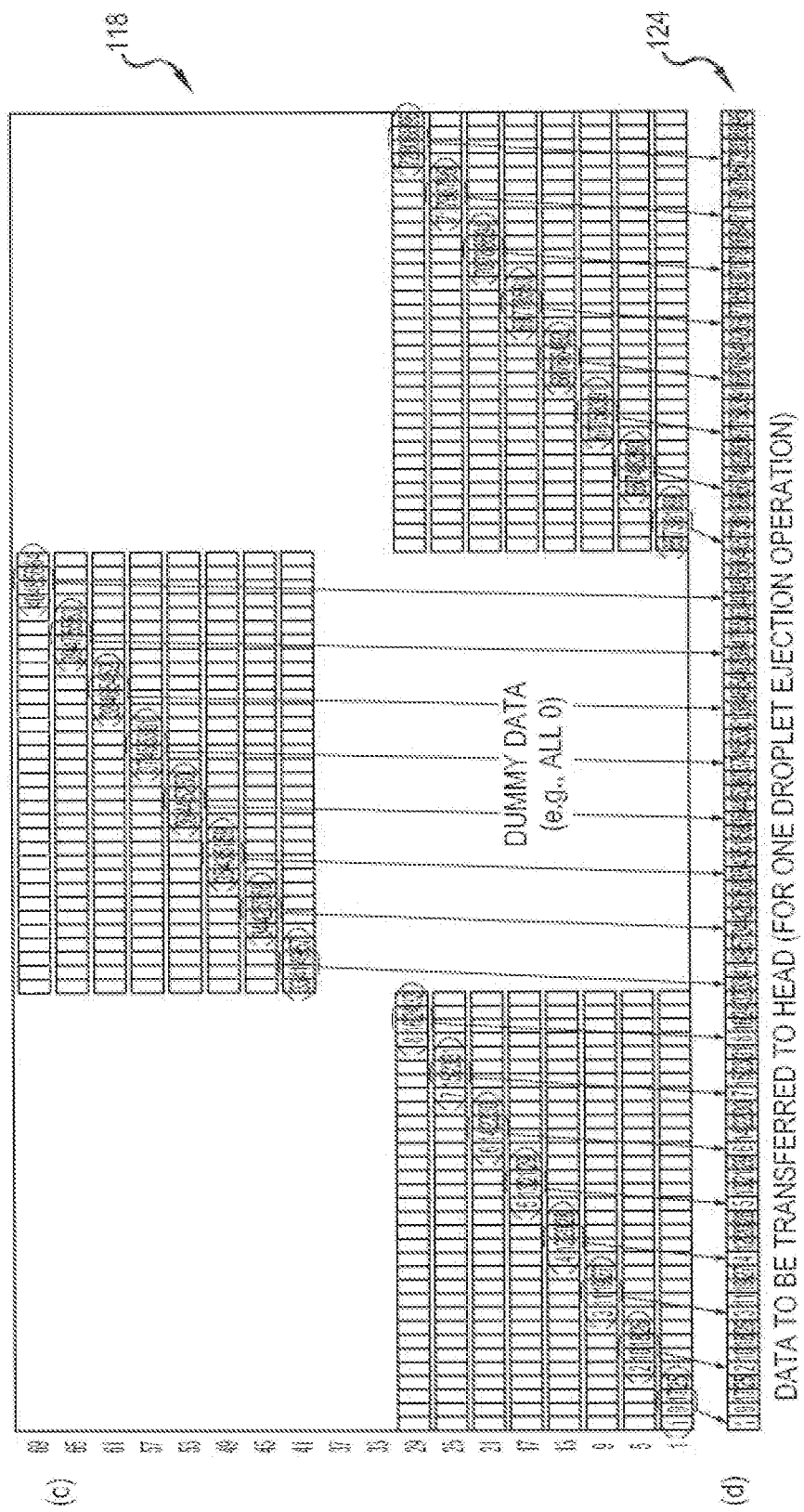

FIGS. 14A & 14B show, in the portion (a), the arrangement of the head modules 520a, 520b and 520c in the unreversed head unit 510A, and the positions of the nozzles of the respective nozzle numbers. The nozzles of the three head modules 520a, 520b and 520c are arranged in such a manner that the nozzles can be treated effectively as equivalent to the nozzles arranged linearly at a uniform pitch in the main scanning direction.

The head modules 520a and 520c are arranged on a straight line in the main scanning direction. Consequently, the nozzles which are mutually adjacent in the main scanning direction in the head modules 520a and 520c (for example, the nozzle numbers 1, 9, 17 and 25 of the head module 520a and the nozzle numbers 1, 9, 17 and 25 of the head module 520c) are arranged on a straight line in the main scanning direction. More specifically, the nozzles of the head modules 520a and 520c which are mutually adjacent in the main scanning direction have the same amount of delay.

In the head module 520b also, the nozzles which are adjacent in the main scanning direction are arranged on a straight hue in the main scanning direction. Moreover, the head module 520b is arranged to the downstream side of the head modules 520a and 520c in the conveyance direction, of the recording medium, so as to have a prescribed amount of delay in the sub-scanning direction. Here, the nozzle numbers 8, 16, 24 and 32, which are mutually adjacent in the main scanning direction of the head module 520a and the nozzle numbers 1, 9, 17 and 25 which are mutually adjacent in the main scanning direction of the head module 520b have a gap (amount of delay) equivalent to two nozzles.

FIGS. 14A & 14B show, in the portion (b), a state where the data for one line is stored in the input side line memory 140. If the addresses of the input side line memory 140 are taken to be 1 to 96 from left to right, then the data at the addresses 1 to 32 are printed by the head module 520a, the data at the addresses 33 to 64 are printed by the head module 520b, and the data at the addresses 65 to 96 are printed by the head module 520c.

These data for one line are rearranged by the rearrangement unit 116. The head modules 520a, 520b and 520c are ail unreversed, and therefore the data rearrangement can be carried out similarly to the unreversed head, unit 200A described in the first embodiment.

Firstly, taking the addresses of the output side line memory 144 to be 1 to 96 from left to right, the portion corresponding to the head module 520a in the rearrangement circuit 142 is wired in such a manner that the data stored at the addresses 1, 9, 17 and 25 of the input side line memory 140 are stored at the addresses 1, 2, 3 and 4 of the output side line memory 144. It is also wired in such a manner that the data stored at the address 2, 10, 18 and 26 of the input side line memory 140 are stored at the addresses 5, 6, 7 and 8 of the output side line memory 144.

Thus, if the data sequence at the addresses 1 to 32 in the input side line memory 140 is taken as {a1, a2, a3, ... , a32}, then the data rearrangement is carried out to obtain a data sequence in the order of {a1, a9, a17: a25, a2, a10, a18, a26, a3, a11, a19, a27, ... }, and the data sequence after the rearrangement is stored at the addresses 1 to 32 of the output side line memory 144.

The similar data rearrangement is also carried out in respect of the portions corresponding to the modules 520b and 520c in the rearrangement circuit 142.

Thus, if the data sequence at the addresses 33 to 64 in the input side line memory 140 is taken as {a33, a34, a35, ... , a64}, then the data rearrangement is carried out to obtain a data sequence in the order of {a33, a41, a49, a57, a34, a42, a50, a58, a35, a43, a51, a59, ... }, and the data sequence after the rearrangement Is stored at the addresses 33 to 64 of the output side line memory 144. Moreover, if the data sequence at the addresses 65 to 96 in the input side line memory 140 is taken as {a65, a66, a67, ... , a96}, then the data rearrangement is carried out to obtain a data sequence in the order of {a65, a73, a81, a89, a66, a74, a82, a90, a67, a75, a83, a91, ... }, and the data sequence after the rearrangement is stored at the addresses 65 to 96 of the output side line memory 144.

By rearranging the data in this way, the data sequences {a1, a9, a17, a25}, {a2, a10, a18, a26}, ..., obtained by dividing the addresses 1 to 96 of the output side line memory 144 into units of 4 bits (1 word) correspond to the adjacent nozzles which are aligned in the main scanning direction of the head modules 520*a*, 520*b* and 520*c*.

The data sequences for other row numbers in the print data are also subjected to the rearrangement processing, one line at a time. As shown in the portion (c) in FIGS. 14A & 14B, the print data which has been rearranged is stored in the image buffer memory 118, while taking account of the arrangement of the head modules 520*a*, 520*b* and 520*c* (the amount of delay of each head module). In the image buffer memory 118, dummy data (for example, all zero) are stored in the portions which correspond to positions where none of the head modules 520*a*, 520*b* and 520*c* is arranged.

Subsequently, the transfer control unit 122 reads out the data corresponding to the print data for one droplet ejection operation of the head modules 520*a*, 520*b* and 520*c* from the image buffer memory 118, and transfers the read data to the line memory 124, as shown in the portions (c) and (d) in FIGS. 14A & 14B.

The droplet ejection data for one operation which has been read out as described above is transferred to the head modules 520*a*, 520*b* and 520*c* by the transfer control unit 122, and the ejection driving of the respective nozzles is thereby controlled.

More specifically, the data sequences {a1, a9, a17, a25}, {a2, a10, a18, a26}, ..., at the addresses 1 to 32 of the line memory 124 are transferred through the transfer control unit 122 to the head module 520*a*. These data are allocated respectively to the nozzles having the nozzle numbers 1, 9, 17, 25, 2, 10, 18, 16, ..., of the head module 520*a*.

After the data transfer to the head module 520*a* has been completed, the data sequences {a33, a41, a49, a57}, {a34, a42, a50, a58}, ..., at the addresses 33 to 64 in the line memory 124 are transferred through the transfer control unit 122 to the head module 520*b*. These data are allocated respectively to the nozzles having the nozzle numbers 1, 9, 17, 25, 2, 10, 18, 16, ..., of the head module 520*b*.

Finally, after the data transfer to the head module 520*b* has been completed, the data sequences {a65, a73, a81, a89}, {a66, a74, a8, a90}, ..., at the addresses 65 to 96 in the line memory 124 are transferred through the transfer control unit 122 to the head module 520*c*. These data are allocated respectively to the nozzles having the nozzle numbers 1, 9, 17, 25, 2, 10, 18, 16, ..., of the head module 520*c*.

In this way, the print data is transferred to the unreversed head unit 510A and ejection from the nozzles is controlled accordingly.

Next the processing of the print data transferred to the reversed head unit 510B will be described with reference to FIGS. 15 and 16.

Figure 15:
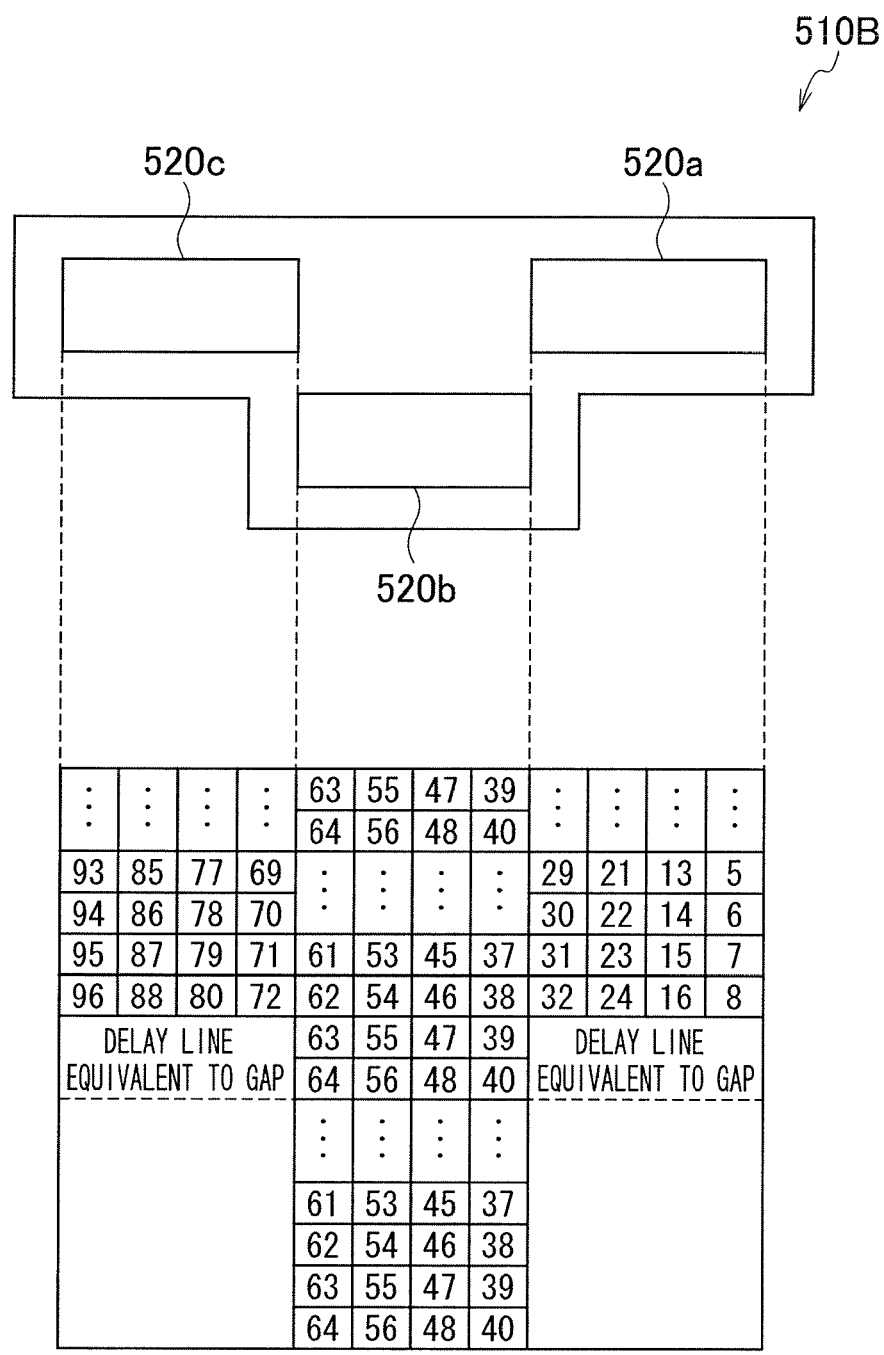
FIG. 15 is a schematic drawing showing a relationship between the arrangement of respective head modules in a reversed head unit and print data which is transferred to the head modules.

FIG. 15 shows a relationship between the arrangement of the head modules 520*a*, 520*b* and 520*c* in the reversed head unit 510B and the print data transferred to the head modules 520*a*, 520*b* and 520*c*. The assigned numerals indicate the nozzle numbers of the reversed head unit 510B.

Figure 16A:
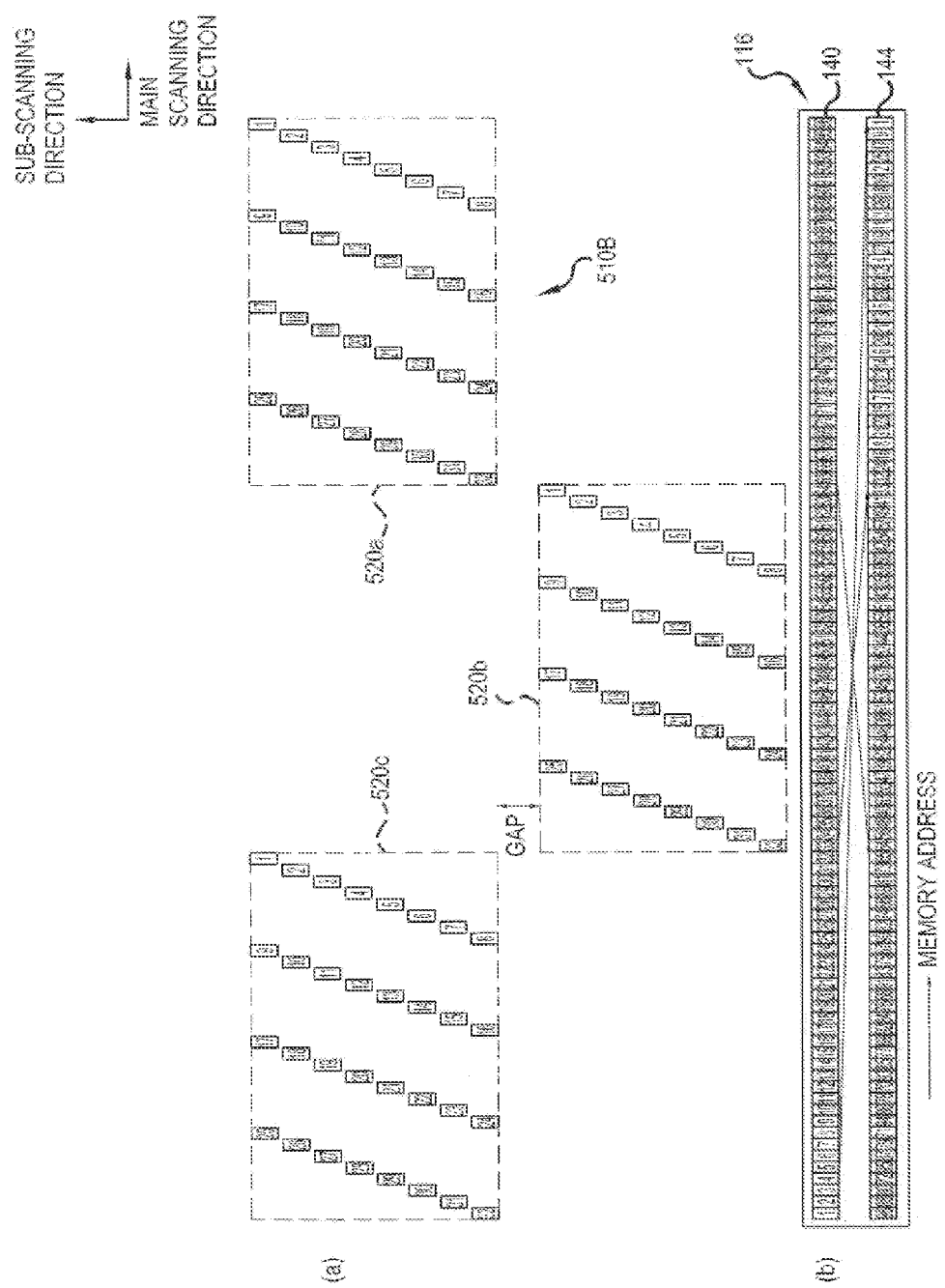
FIGS. 16A & 16B are illustrative diagrams showing a method for writing and reading printing data to and from the image buffer memory, corresponding to the reversed head unit in the third embodiment.
Figure 16B:
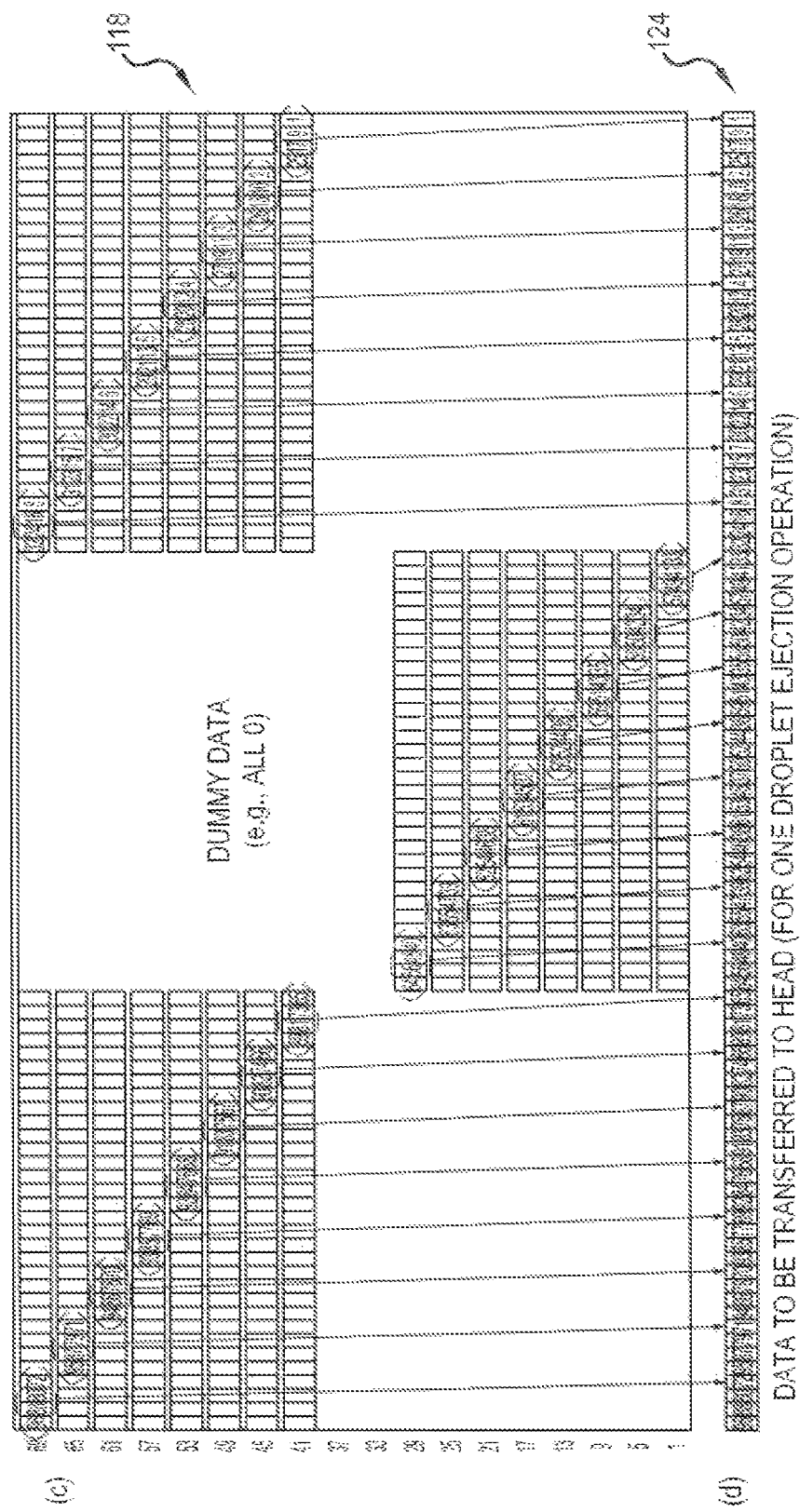

FIGS. 16A & 16B show, in the portion (a), the arrangement of the head modules 520*a*, 520*b* and 520*c* in the reversed head unit 510B, and the positions of the nozzles of the respective nozzle numbers. As stated previously, the reversed head unit 510B has the same nozzle arrangement as the unreversed head unit 510A, but reversed (rotated) by 180°, while maintaining the same orientation of the nozzle surface. Consequently, the head modules 520*a*, 520*b* and 520*c* are reversed by 180°, and the lateral relationship between the head module 520*a* and the head module 520*c* is reversed. Moreover, the head modules 520*a* and 520*c* are arranged to the downstream side of the head module 520*b* in the conveyance direction of the recording medium, so as to have a prescribed amount of delay in the sub-scanning direction.

The nozzles of the three head modules 520*a*, 520*b* and 520*c* are arranged in such a manner that the nozzles can be treated effectively as equivalent to the nozzles arranged linearly at a uniform pitch in the main scanning direction. The nozzles which are mutually adjacent in the main scanning direction are arranged on a straight line in the main scanning direction.

FIGS. 16A & 16B show, in the portion (b), a state where the data for one line is stored in the input side line memory 140. In the case of the reversed head unit 510B, the data at the addresses 1 to 32 are printed by the head module 520*c*, the data at the addresses 33 to 64 are printed by the head module 520*b*, and the data at the addresses 65 to 96 are printed by the head module 520*a*.

These data for one line are rearranged by the rearrangement unit 116. For the reversed head unit 510B, the data rearrangement is carried out by taking account of the fact that the nozzle positions of the head modules 520*a*, 520*b* and 520*c* are reversed by 180° with respect to the unreversed head unit 510A, and the lateral positions of the head module 520*a* and the head module 520*c* are reversed.

More specifically, of the data at the addresses 1 to 96 in the input side line memory 140, the data at the addresses 1 to 32, the data at the addresses 33 to 64 and the data at the addresses 65 to 96 are rearranged respectively by taking account of the reversed configuration. Moreover, the data storage is switched in such a manner that the data at the addresses 1 to 32 of the input side line memory 140 are stored at the addresses 65 to 96 of the output side line memory 144, and the data at the addresses 65 to 96 of the input side line memory 140 are stored at the addresses 1 to 32 of the output side line memory 144.

For example, the portion corresponding to the head module 520*c* in the rearrangement circuit 142 is wired in such a manner that the data stored at the addresses 1, 9, 17 and 25 of the input side line memory 140 are stored at the addresses 96, 95, 94 and 93 of the output side line memory 144. Moreover, the portion corresponding to the head module 520*b* is wired in such a manner that the data stored at the addresses 33, 41, 49 and 57 of the input side line memory 140 are stored at the addresses 64, 63, 62 and 61 of the output side line memory 144. Furthermore, the portion corresponding to the head module 520*a* is wired in such a manner that the data stored at the addresses 65, 73, 81 and 89 of the input side line memory 140 are stored at the addresses 32, 31, 30 and 29 of the output side line memory 144.

Thus, if the data sequence at the addresses 1 to 32 in the input side line memory 140 is taken as {a1, a2, a3, ..., a32}, then the data rearrangement is carried out to obtain a data sequence in the order of {a1, a9, a17, a25, a2, a10, a18, a26, a3, a11, a19, a27, ... }, and the data sequence after the rearrangement is stored reversely at the addresses 96 to 65 of the output side line memory 144.

Moreover, if the data sequence at the addresses 33 to 64 in the input side line memory 140 is taken as {a33, a34, a35, ..., a64}, then the data rearrangement is carried out to obtain a data sequence in the order of {a33, a41, a49, a57, a34, a42, a50, a58, a35, a43, a51, a59, ... }, and the data sequence after the rearrangement is stored reversely at the addresses 64 to 33 of the output side line memory 144.

Furthermore, if the data sequence at the addresses 65 to 96 in the input side line memory 140 is taken as {a65, a66, a67, . . . , a96}, then the data rearrangement is carried out to obtain a data sequence in the order of {a65, a73, a81, a89, a66, a74, a82, a90, a67, a75, a83, a91, . . . }, and the data sequence after the rearrangement is stored reversely at the addresses 32 to 1 of the output side line memory 144.

By rearranging the data in this way, the data sequences {a1, a9, a17, a25}, {a2, a10, a18, a26}, . . . , obtained by dividing the addresses 1 to 96 of the output side line memory 144 into units of 4 bite (1 word) correspond to the adjacent nozzles which are aligned in the main scanning direction of the bead modules 520*c*, 520*b* and 520*a*.

The data sequences for other row numbers in the print data are also subjected to the rearrangement processing, one line at a time. As shown in the portion (c) in FIGS. 16A & 16B, the print data which has been rearranged is stored in the image buffer memory 118, while taking account of the arrangement of the head modules 520*c*, 520*b* and 520*a* (the amount of delay of each head module). In the image buffer memory 118, dummy data (for example, all zero) are stored in the portions which correspond to positions where none of the head modules 520*c*, 520*b* and 520*a* is arranged.

Subsequently, the transfer control unit 122 reads out the data corresponding to the print data for one droplet ejection operation of the head modules 520*c*, 520*b* and 520*a* from the image buffer memory 118, and transfers the read data to the line memory 124, as shown in the portions (c) and (d) in FIGS. 16A & 16B.

In the case of FIGS. 16A & 16B, the droplet ejection data for the first ejection operation of the head module 520*a* are collected respectively from the 41st row, the 45th row, the 49th row, the 53rd row, the 57th row, the 61st row, the 65th row and the 69th row of the image buffer memory 118 and are stored in the reverse direction from the address 96 of the line memory 124, in word (4-bit) units, as shown in the portions (c) and (d) in FIGS. 16A & 16B.

Moreover, the droplet ejection data for the first ejection operation of the head module 520*b* are collected respectively from the 1st row, the 5th row, the 9th row, the 13th row, the 17th row, the 21st row, the 25th row and the 29th row of the image buffer memory 118 and are stored in the reverse direction from the address 64 of the line memory 124, in word (4-bit) units, as shown in the portions (c) and (d) in FIGS. 16A & 16B.

Furthermore, the droplet ejection data for the first ejection operation of the head module 520*c* are collected respectively from the 41st row, the 45th row, the 49th row, the 53rd row, the 57th row, the 61st row, the 65th row and the 69th row of the image buffer memory 118 and are stored in the reverse direction from the address 32 of the line memory 124, in word (4-bit) units, as shown in the portions (c) and (d) in FIGS. 16A & 16B.

In this way, although the data are read out from the image buffer memory 118 in word units, since the data for the adjacent nozzles which are adjacent in the main scanning direction of the head modules are stored consecutively in the same word, then it is possible to transfer the droplet ejection data for one ejection operation, at high speed.

The droplet ejection data for one operation which has been read out by the transfer control unit 122 as described above is transferred to the head modules 520*a*, 520*b* and 520*c*, and the ejection driving of the respective nozzles is thereby controlled.

More specifically, the data sequences {a96, a88, a80, a72}, {a95, a87, a79, a71}, . . . , at the addresses 1 to 32 of the line memory 124 are transferred through the transfer control unit 122 to the head module 520*a*. These data are allocated respectively to the nozzles having the nozzle numbers 1, 9, 17, 25, 2, 10, 18, 16, . . . , of the head module 520*a*.

After the data transfer to the head module 520*a* has been completed, the data sequences {a64, a56, a48, a40}, {a63, a55, a47, a39}, . . . , at the addresses 33 to 64 in the line memory 124 are transferred through the transfer control unit 122 to the head module 520*b*. These data are allocated respectively to the nozzles having the nozzle numbers 1, 9, 17, 25, 2, 10, 18, 16, . . . , of the head module 520*b*.

Finally, after the data transfer to the head module 520*b* has been completed, the data sequences {a32, a24, a16, a8}, {a31, a23, a15, a7}, . . . , at the addresses 65 to 96 in the line memory 124 are transferred through the transfer control unit 122 to the head module 520*c*. These data are allocated respectively to the nozzles having the nozzle numbers 1, 9, 17, 25, 2, 10, 18, 16, . . . , of the head module 520*c*.

In this way, the print data is transferred to the reversed head unit 510B and ejection from the nozzles is controlled accordingly. In respect of the reversed head unit 510B, the data is reversed so as to correspond to the fact that the nozzle positions of the head modules 520*a*, 520*b* and 520*c* are reversed by 180° and the lateral positions of the head module 520*a* and the head module 520*c* are reversed, with respect to the unreversed head unit 510A. Accordingly, in the line head 500, in both the unreversed head unit 510A and the reversed head unit 510B irrespectively, the data transferred from the transfer control unit 122 can be allocated to the nozzles in the sequence of the nozzle numbers 1, 9, 17, 25, 2, 10, 18, 16, . . . , of the head module 520*a*, the nozzle numbers 1, 9, 17, 25, 2, 10, 18, 16, . . . , of the head module 520*b*, and the nozzle numbers 1, 9, 17, 25, 2, 10, 18, 16, . . . , of the head module 520*c*. Consequently, it is possible to employ the common specifications for the interface between the transfer control unit 122 and each of the unreversed head units 510A and the reversed head units 510B in the line head 500.

In the line head 500 shown in FIG. 12, it is possible that there is an overlap between the nozzles of the adjacent head unite, due to installation error of the head units, and the like. For instance, if the unreversed head unit 510A on the left-hand side and the adjacent reversed head unit 510B to the right-hand side in FIG. 12 are installed at a distance apart that is smaller than the design value, then the nozzle number 32 of the head module 520*c* in the unreversed head unit 510A and the nozzle number 32 of the head module 520*c* in the reversed head unit 510B can be overlapping and not have a uniform pitch in the main scanning direction.

In cases of this kind, it is possible to use the masking process which has been described with reference to FIG. 9. More specifically, by masking either one of the overlapping nozzles, it is possible to prevent increase in the droplet ejection volume in the overlapping portion.

Fourth Embodiment

In the third embodiment, the data groups in the print data for the reversed head unit 510B are switched by the rearrangement unit 116 in accordance with the reversed lateral positions of the head module 520*a* and the head module 520*c*.

In the fourth embodiment, the switching of data groups is performed in the transfer control unit 122 as follows.

Figure 17A:
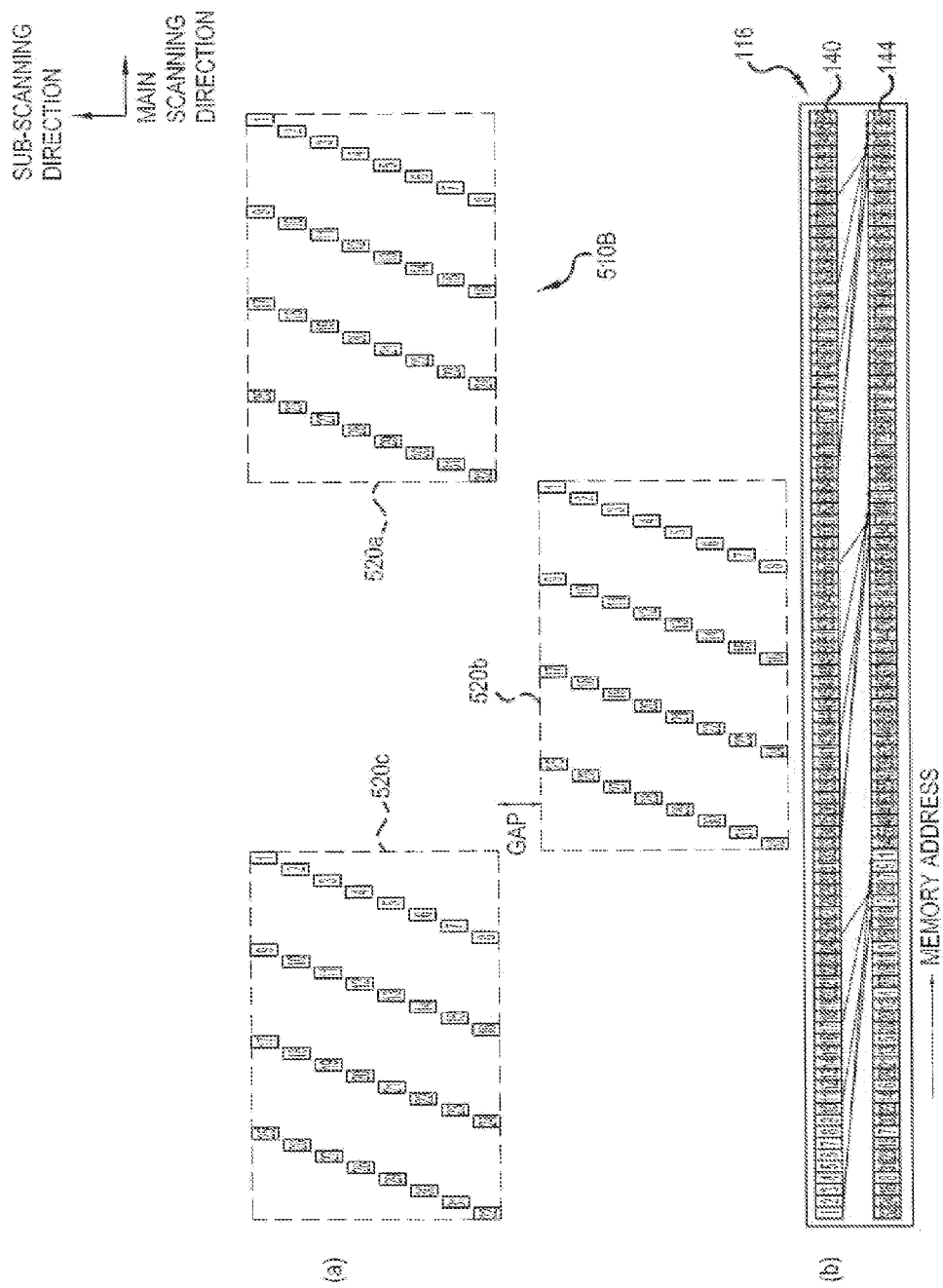
FIGS. 17A & 17B are illustrative diagrams showing a method for writing and reading printing data to and from the image buffer memory, corresponding to the reversed head unit in a fourth embodiment of the present invention.
Figure 17B:
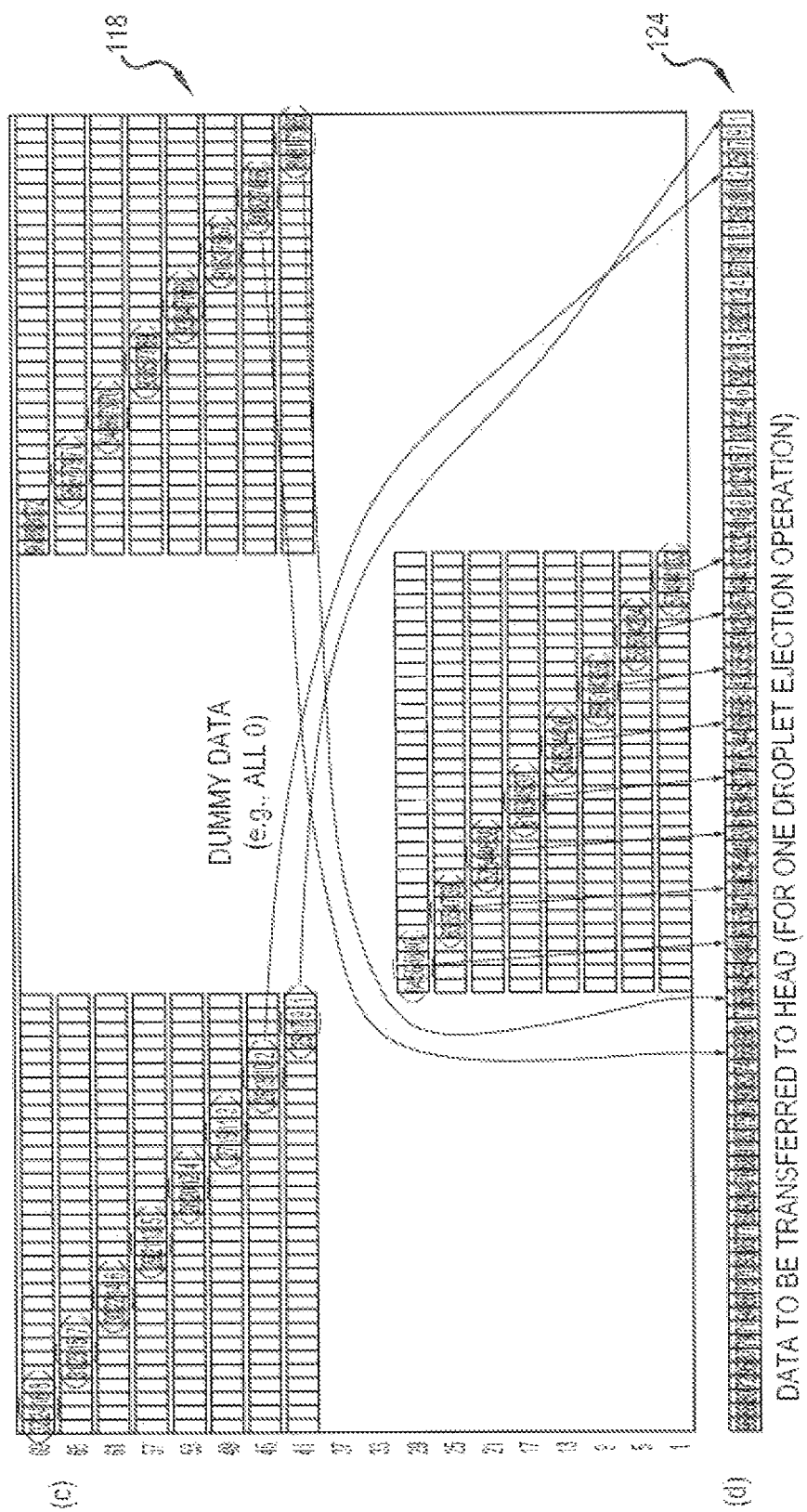

FIGS. 17A & 17B show, in the portion (a), the arrangement of the head modules 520a, 520b and 520c in the reversed head unit 510B, and the positions of the nozzles of the respective nozzle numbers.

FIGS. 17A & 17B also show, in the portion (b), a state where the date for one line is stored in the input side line memory 140. The data for one line is rearranged by the rearrangement unit 116. Here, the data rearrangement is carried out by taking account of the fact that the nozzle positions of the head modules 520a, 520b and 520c are reversed by 180°.

Firstly, the portion corresponding to the head module 520c in the rearrangement circuit 142 is wired in such a manner that the data stored at the addresses 1, 9, 17 and 25 of the input side line memory 140 are stored at the addresses 32, 31, 30 and 29 of the output side line memory 144. Moreover, the portion corresponding to the head module 520b is wired in such a manner that the data stored at the addresses 33, 41, 49 and 57 of the input side line memory 140 are stored at the addresses 64, 63, 62 and 61 of the output side line memory 144. Furthermore, the portion corresponding to the head module 520a is wired in such a manner that the data at the addresses 65, 73, 81 and 89 of the input side line memory 140 are stored at the addresses 96, 95, 94 and 93 of the output side line memory 144.

Thus, if the data sequence at the addresses 1 to 32 in the input side line memory 140 is taken as {a1, a2, a3, ..., a32}, then the data rearrangement is carried out to obtain a data sequence in the order of {a1, a9, a17, a25, a2, a10, a18, a26, a3, a11, a19, a27, ... }, and the data sequence after the rearrangement is stored reversely at the addresses 32 to 1 of the output side line memory 144.

Moreover, if the data sequence at the addresses 33 to 64 in the input side line memory 140 is taken as {a33, a34, a35, ..., a64}, then the data rearrangement is carried out to obtain a data sequence in the order of {a33, a41, a49, a57, a34, a42, a50, a58, a35, a43, a51, a59, ... }, and the data sequence after the rearrangement is stored reversely at the addresses 64 to 33 of the output side line memory 144.

Furthermore, if the data sequence at the addresses 65 to 96 in the input side line memory 140 is taken as {a65, a66, a67, ..., a96}, then the data rearrangement is carried out to obtain a data sequence in the order of {a65, a73, a81, a89, a66, a74, a82, a90, a67, a75, a83, a91, ... }, and the data sequence after the rearrangement is stored reversely at the addresses 96 to 65 of the output side line memory 144.

By rearranging the data in this way, the data sequences {a1, a9, a17, a25}, {a2, a10, a18, a26}, ..., obtained by dividing the addresses 1 to 96 of the output side line memory 144 into units of 4 bits (1 word) correspond to the adjacent nozzles which are aligned in the main scanning direction of the head modules 520c, 520b and 520a.

The data sequences for other row numbers in the print data are also subjected to the rearrangement processing, one line at a time. As shown in the portion (c) in FIGS. 17A & 17B, the print data which has been rearranged is stored in the image buffer memory 118, while taking account of the arrangement of the head modules 520c, 520b and 520a (the amount of delay of each head module). In the image buffer memory 118, dummy data (for example, all zero) are stored in the portions which correspond to positions where none of the head modules 520c, 520b and 520a is arranged.

Figure 18:
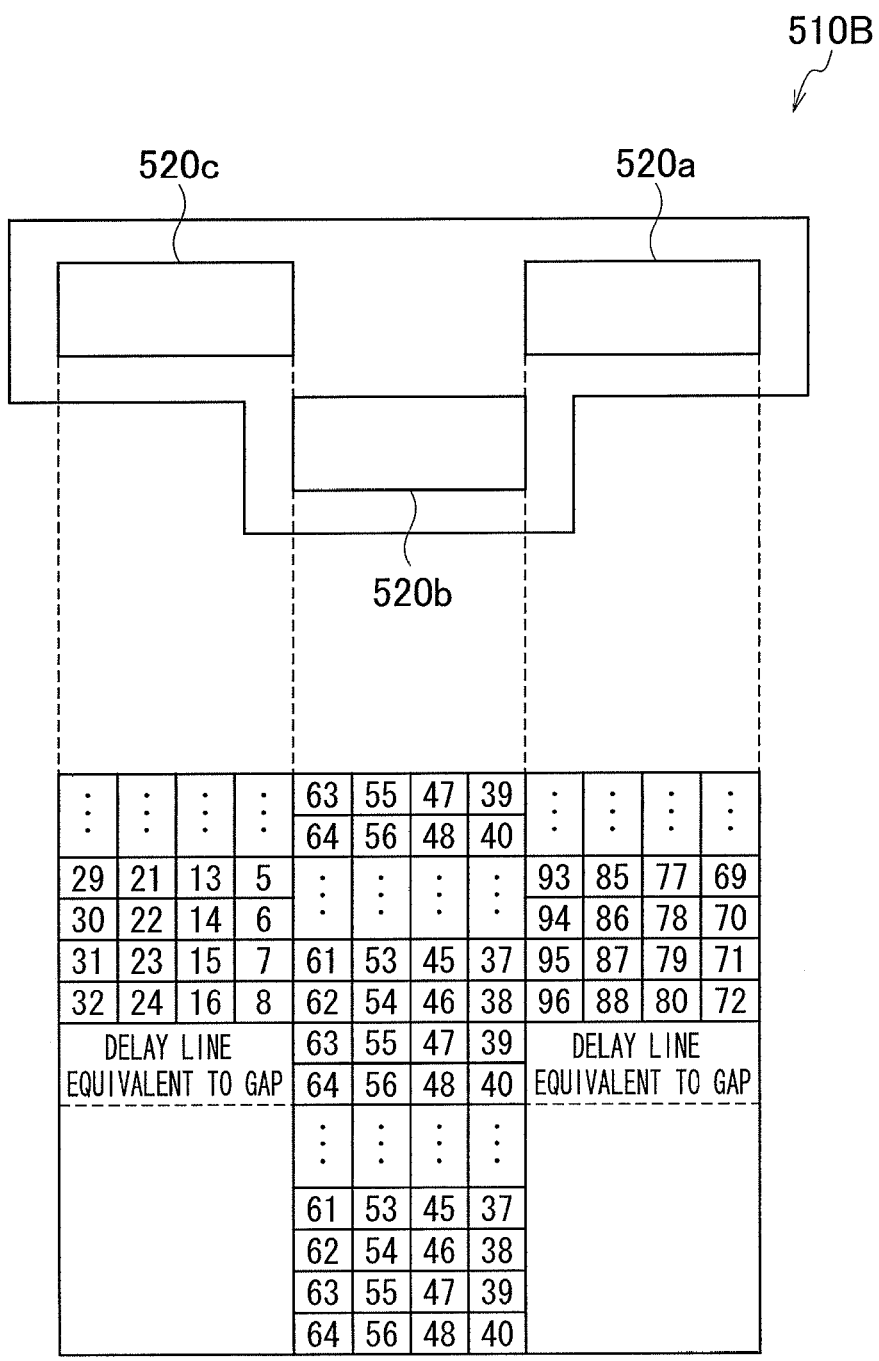
FIG. 18 is a schematic drawing showing a relationship between the arrangement of respective modules in the reversed head unit and print data which is transferred to the modules.

However, as shown in FIG. 18, in the data arrangement in the image buffer memory 118, the print data corresponding to the head module 520a and the print data corresponding to the head module 520c are reversed. Consequently, in the present embodiment, switching of the print data corresponding to the head module 520a and the print data corresponding to the head module 520c is performed by the transfer control unit 122.

More specifically, the transfer control unit 122 reads out the data corresponding to the print data for one droplet ejection operation of the head modules 520c, 520b and 520a from the image buffer memory 118, and transfers the read data to the line memory 124, as shown in the portions (c) and (d) in FIGS. 17A & 17B.

Firstly, the droplet ejection data for the first ejection operation of the head module 520a are collected respectively from the 41st row, the 45th row, the 49th row, the 53rd row, the 57th row, the 61st row, the 65th row and the 69th row of the image buffer memory 118 and are stored in the reverse direction from the address 96 of the line memory 124, in word (4-bit) units as shown in the portions (c) and (d) in FIGS. 17A & 17B.

Moreover, the droplet ejection data for the first ejection operation of the head module 520b are collected respectively from the 1st row, the 5th row, the 9th row, the 13th row, the 17th row, the 21st row, the 25th row and the 29th row of the image buffer memory 118 and are stored in the reverse direction from the address 64 of the line memory 124, in word (4-bit) units, as shown in the portions (c) and (d) in FIGS. 17A & 17B.

Furthermore, the droplet ejection data for the first ejection operation of the head module 520c are collected respectively from the 41st row, the 45th row, the 49th row, the 53rd row, the 57th row, the 61st row, the 65th row and the 69th row of the image buffer memory 118 and are stored in the reverse direction from the address 32 of the line memory 124, in word (4-bit) units, as shown in the portions (c) and (d) in FIGS. 17A & 17B.

By carrying out the switching of the data groups in the transfer control unit 122 in this way, the print data shown in the portion (d) in FIGS. 17A & 17B to be transferred to the head modules becomes the same as the print data shown in the portion (d) in FIGS. 16A & 16B.

The droplet ejection data for one operation which has been read out by the transfer control unit 122 as described above is transferred to the head modules 520a, 520b and 520c, and the ejection driving of the respective nozzles is thereby controlled.

Fifth Embodiment

Figure 19:
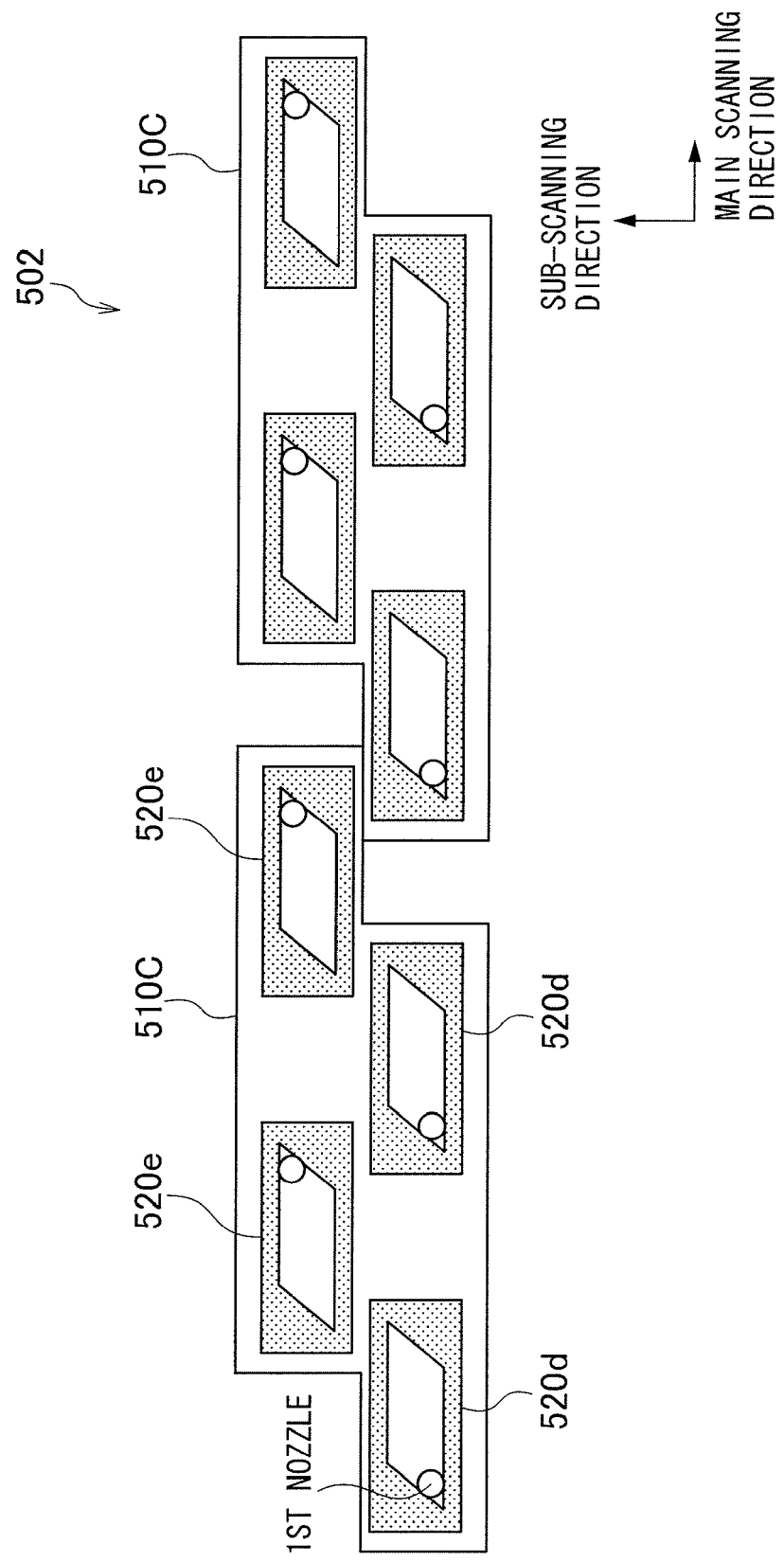
FIG. 19 is a schematic drawing showing a line head according to a fifth embodiment of the present invention.

FIG. 19 is a schematic drawing showing a line head 502 according to the fifth embodiment of the present invention. As shown in FIG. 19, in the line head 502, a plurality of head units 510C are arranged in the main scanning direction.

Each of the head units 510C is constituted of head modules of two types, namely, an unreversed head module 520d and a reversed head module 520e, and includes a staggered configuration of two unreversed head modules 520d and two reversed head modules 520e.

Each of the unreversed head modules 520d has a nozzle arrangement similar to the unreversed head unit 200A shown in FIG. 2. Each of the reversed head modules 520e has the same nozzle arrangement as the unreversed head module 520d, but reversed by 180°, while maintaining the same orientation of the nozzle surface, and consequently has the nozzle arrangement similar to the reversed head unit 200B shown in FIG. 2.

The nozzles of the four head modules 520d, 520e, 520d and 520e are arranged in such a manner that the nozzles can be treated effectively as equivalent to the nozzles arranged linearly at a uniform pitch in the main scanning direction. The nozzles which are mutually adjacent in the main scanning direction are arranged on a straight line in the main scanning direction.

The head modules 520e are arranged to the downstream side of the head modules 529d in the conveyance direction of the recording medium, so as to have a prescribed amount of delay in the sub-scanning direction.

The print data transferred to the line head 502 is processed similarly to that described thus far.

More specifically, the rearrangement unit 116 carries out the data rearrangement in respect of the unreversed head modules 520d, and carries out data the rearrangement in respect of the reversed head modules 520e so as to reverse the data compared to the unreversed head modules 520d.

The rearranged print data is stored in the image buffer memory 118 by taking account of the arrangement of the head modules 520d and 520e (the amount of delay thereof). In the image buffer memory 118, dummy data (for example, all zero) are stored in the portions which correspond to positions where none of the head modules 520d and 520e is arranged.

Finally, the transfer control unit 122 reads out the data corresponding to the print data for one droplet ejection of the head modules 520d and 520e from the image buffer memory 118, transfers the read data to the line memory 124, and transfers the data to the line head 502.

By processing the data in this way, it is possible to adopt the common specifications for the interface between the transfer control unit and the head unit, even in a case where the head unit includes the combination of the unreversed head modules and the reversed head modules.

General Composition of Inkjet Recording Apparatus

Figure 20:
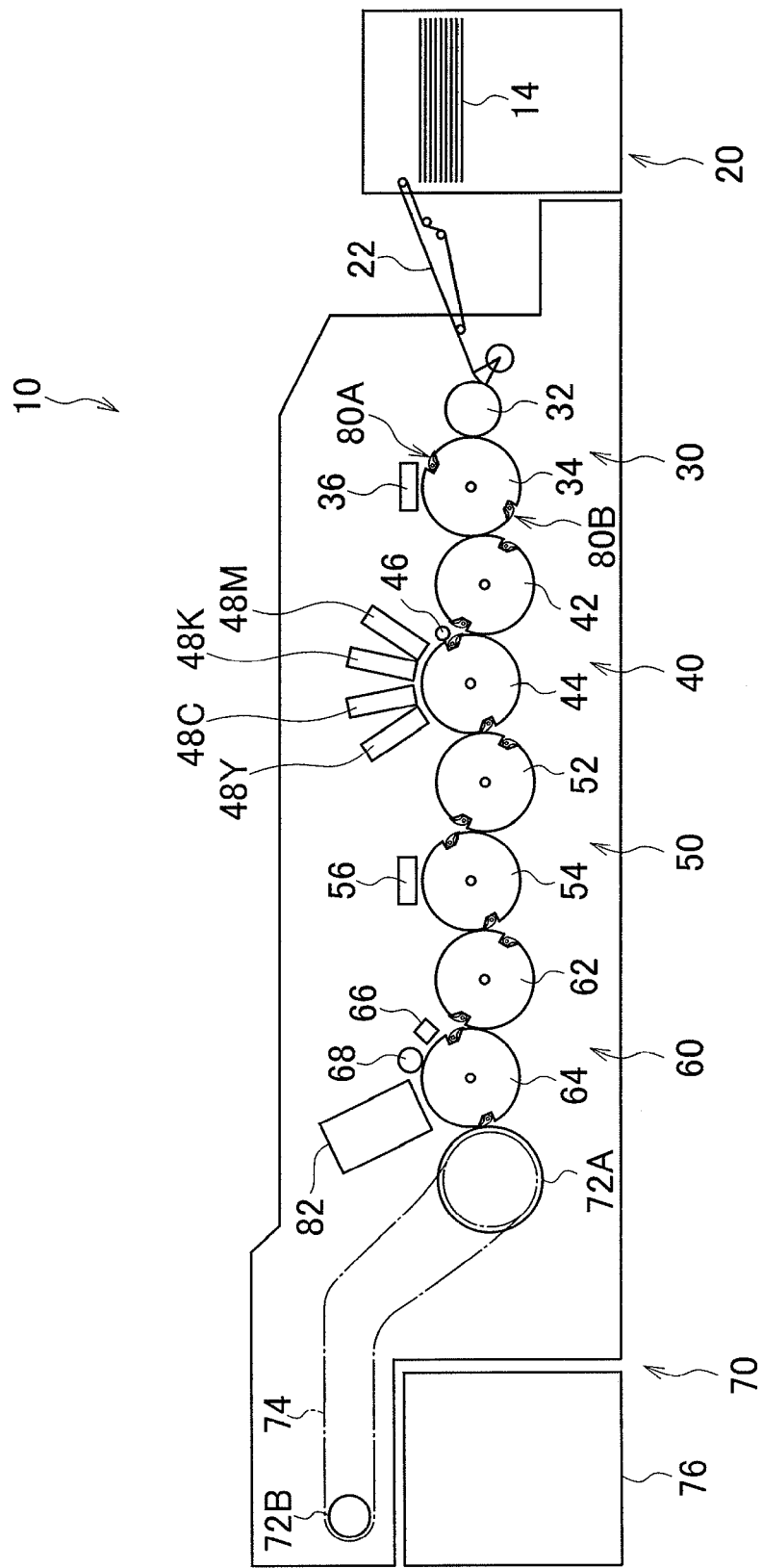
FIG. 20 is a schematic drawing showing the general composition of an Inkjet recording apparatus according to the respective embodiments.

FIG. 20 is a schematic drawing showing the general composition of an inkjet recording apparatus according to the respective embodiments of the present invention. The inkjet recording apparatus 10 shown in FIG. 20 is a recording apparatus based on a two-liquid aggregation system which forms an image on a recording surface of a recording medium 14 (corresponding to the paper P) in accordance with prescribed image data, by using ink containing coloring material and an aggregating treatment liquid having a function of aggregating the coloring material in the ink.

The inkjet recording apparatus 10 includes a paper feed unit 20, a treatment liquid application unit 30, an image formation unit 40, a drying process unit 50, a fixing process unit 60 and an output unit 70. Transfer drums 32, 42, 52 and 62 are arranged as devices which receive and transfer the recording medium 14 conveyed respectively from the stage prior to the treatment liquid application unit 30, the image formation unit 40, the drying process unit 50 and the fixing process unit 60. Pressure drums 34, 44, 54 and 64 are arranged as devices which hold and convey the recording medium 14 respectively in the treatment liquid application unit 30, the image formation unit 40, the drying process unit 50 and the fixing process unit 60.

Grippers 80A and 80B, which grip and hold a leading end portion of the recording medium 14, are arranged on the transfer drums 32, 42, 52 and 62 and the pressure drums 34, 44, 54 and 64. A common structure is adopted for gripping and holding the leading end portion of the recording medium 14 in the grippers 80A and 80B and for transferring the recording medium 14 between the grippers arranged in the other pressure drums or transfer drums; furthermore, the grippers 80A and the gripper 80B are disposed in symmetrical positions separated by 180° in the direction of rotation of the pressure drum 34 on the outer circumferential surface of the pressure drum 34.

When each of the transfer drums 32 to 62 and the pressure drums 34, 44, 54, 64, which has gripped the leading end portion of the recording medium 14 by means of the gripper 80A or 80B, rotates in a prescribed rotation, the recording medium 14 is rotated and conveyed following the outer circumferential surface of the drum.

In FIG. 20, only the reference numerals of the grippers 80A and 80B arranged on the pressure drum 34 are indicated, and the reference numerals of the grippers on the other pressure drums and transfer drums are not shown.

When the recording medium 14 (e.g., a cut sheet of paper) accommodated in the paper feed unit 20 is supplied to the treatment liquid application unit 30, the aggregating treatment liquid (hereinafter also referred to simply as the "treatment liquid") is applied to the recording surface of the recording medium 14 held on the outer circumferential surface of the pressure drum 34. The "recording surface of the recording medium 14" is the outer surface when the recording medium 14 is held by the pressure drums 34, 44, 54 and 64, and is reverse to the surface to come in contact with the pressure drums 34, 44, 54 and 64.

Thereupon, the recording medium 14 on which the aggregating treatment liquid has been applied is outputted to the image formation unit 40 and colored inks are deposited by the image formation unit 40 onto the area of the recording surface where the aggregating treatment liquid has been applied, thereby forming a desired image.

The recording medium 14 on which the image has been formed by the colored inks is sent to the drying process unit 50, and a drying process is carried out by the drying process unit 50, and the recording medium 14 after the drying process is then conveyed to the fixing process unit 60 and a fixing process is carried out. By carrying out the drying process and the fixing process, the image formed on the recording medium 14 is made durable. Thus, the desired image is formed on the recording surface of the recording medium 14 and after fixing the image on the recording surface of the recording medium 14, the recording medium 14 is conveyed to the exterior of the inkjet recording apparatus 10 through the output unit 70.

The respective units of the Inkjet recording apparatus 10 (paper feed unit 20, treatment liquid application unit 30, image formation unit 40, drying process unit 50, fixing process unit 60 and output unit 70) are described in detail below.

<Paper Feed Unit>

The paper feed unit 20 includes a paper feed tray 22 and a paying out mechanism (not shown) and is composed so as to pay out the recording medium 14 one sheet at a time from the paper feed tray 22. The recording medium 14 paid out from the paper feed tray 22 is registered in position by a guide member (not shown) and halted temporarily in such a manner that the leading end portion of the recording medium 14 is disposed at the position of the gripper (not shown) on the transfer drum (paper feed drum) 32.

<Treatment Liquid Application Unit>

The treatment liquid application unit 30 includes: the pressure drum (treatment liquid drum) 34, which holds, on the outer circumferential surface thereof, the recording medium 14 transferred from the paper feed drum 32 and conveys the recording medium 14 in the prescribed conveyance direction; and a treatment liquid application device 36, which applies the treatment liquid to the recording surface of the recording medium 14 held on the outer circumferential surface of the treatment liquid drum 34. When the treatment liquid drum 34 is rotated in the counter-clockwise direction in FIG. 20, the recording medium 14 is conveyed so as to rotate in the counter-clockwise direction following the outer circumferential surface of the treatment liquid drum 34.

The treatment liquid application device 36 shown in FIG. 20 is arranged at a position facing the outer circumferential surface (recording medium holding surface) of the treatment liquid drum 34. One example of the composition of the treatment liquid application device 36 is a mode which includes: a treatment liquid vessel, which stores the treatment liquid; an uptake roller, which is partially immersed in the treatment liquid in the treatment liquid vessel and takes up the treatment liquid in the treatment liquid vessel; and an application roller, which transfers the treatment liquid taken up by the uptake roller to the recording medium 14.

It is desirable that the treatment liquid application unit 30 is provided with an application roller movement mechanism, which moves the application roller in an upward and downward direction (a normal direction with respect to the outer circumferential surface of the treatment liquid drum 34), so as to be able to avoid collisions between the application roller and the grippers 80A and 80B.

The treatment liquid applied on the recording medium 14 by the treatment liquid application device 36 contains the coloring material aggregating agent which aggregates the coloring material (pigment) in the inks deposited by the image formation unit 40 and when the treatment liquid and the inks come into contact with each other on the recording medium 14, separation of the coloring material and the solvent in the inks is thereby promoted.

It is desirable that the treatment liquid application unit 30 doses the amount of the treatment liquid applied to the recording medium 14 while applying the treatment liquid, and more desirably, the thickness of the film of treatment liquid on the recording medium 14 is sufficiently smaller than the diameter of the ink droplets which are ejected and deposited in the image formation unit 40.

<Image Formation Unit>

The image formation unit 40 includes: the pressure drum (image formation drum) 44, which holds and conveys the recording medium 14; a paper pressing roller 46 for causing the recording medium 14 to adhere tightly to the image formation drum 44; and inkjet heads 48M, 48K, 48C and 48Y (corresponding to the line heads 200 and 500), which eject and deposit droplets of the inks onto the recording medium 14. The basic structure of the image formation drum 44 is the same as that of the above-described treatment liquid drum 34, and the description thereof is omitted here.

The paper pressing roller 46 is a guide member for causing the recording medium 14 to make tight contact with the outer circumferential surface of the image formation drum 44, and is disposed facing the outer circumferential surface of the image formation drum 44, to the downstream side, in terms of the conveyance direction of the recording medium 14, of the transfer position of the recording medium 14 between the transfer drum 42 and the image formation drum 44 and to the upstream side, in terms of the conveyance direction of the recording medium 14, of the inkjet heads 48M, 48K, 48C and 48Y.

When the recording medium 14 which has been transferred from the transfer drum 42 to the image formation drum 44 is conveyed to rotate in a state where the leading end of the recording medium 14 is held by the gripper (reference numeral not indicated), the recording medium 14 is pressed by the paper pressing roller 46 and is caused to wale tight contact with the outer circumferential surface of the image formation drum 44. After the recording medium 14 has been caused to make tight contact with the outer circumferential surface of the image formation drum 44 in this way, the recording medium 14 is passed to a printing region directly below the inkjet heads 48M, 48K, 48C and 48Y, without any floating up of the recording medium 14 from the outer circumferential surface of the image formation drum 44.

The inkjet heads 48M, 48K, 48C and 48Y respectively correspond to the inks of the four colors of magenta (M), black (K), cyan (C) and yellow (Y). The inkjet heads 48M, 48K, 48C and 48Y are disposed in this order from the upstream side in terms of the direction of rotation of the image formation drum 44 (the counter-clockwise direction in FIG. 20), and the ink ejection surfaces of the inkjet heads 48M, 48K, 48C and 48Y (the nozzle surfaces, namely, the surfaces of the nozzle plates which are denoted with reference numeral 224 in FIG. 22) are arranged so as to face the recording surface of the recording medium 14 which is held on the image formation drum 44. Here, the "ink ejection surface (nozzle surface)" is the surface of each of the inkjet heads 48M, 48K, 48C and 48Y that faces the recording surface of the recording medium 14, and is the surface where the nozzles which eject the ink as described below are formed (these nozzles are not shown in FIG. 20 and are denoted with reference numeral 202 in FIG. 22).

Furthermore, the inkjet heads 48M, 48K, 48C and 48Y shown in FIG. 20 are inclined with respect to the horizontal plane, in such a manner that the nozzle surfaces of the inkjet heads 48M, 48K, 48C and 48Y are substantially parallel to the recording surface of the recording medium 14 which is held on the outer circumferential surface of the image formation drum 44.

Each of the inkjet heads 48M, 48K, 48C and 48Y is the full line head having a length corresponding to the maximum width of the image forming region on the recording medium 14 (the dimension of the recording medium 14 in the direction perpendicular to the conveyance direction), and is fixed so as to extend in the direction perpendicular to the conveyance direction of the recording medium 14. The nozzles for ejecting the ink are arranged in a matrix configuration throughout the whole width of the image forming region of the recording medium 14 on the nozzle surface (liquid ejection surface) of each of the inkjet heads 48M, 48K, 48C and 48Y.

When the recording medium 14 is conveyed to the printing region directly below the inkjet heads 48M, 48K, 48C and 48Y, the inkjet heads 48M, 48K, 48C and 48Y eject and deposit droplets of the inks of the respective colors in accordance with the image data onto the region of the recording medium 14 where the aggregating treatment liquid has been applied.

When the droplets of the corresponding colored inks are deposited from the inkjet heads 48M, 48K, 48C and 48Y on the recording surface of the recording medium 14 held on the outer circumferential surface of the image formation drum 44, the inks make contact with the treatment liquid on the recording medium 14, and an aggregating reaction occurs with the coloring material that is dispersed in the ink (pigment-based coloring material) or the coloring material that can be insolubilized (dye-based coloring material), thereby forming an aggregate of the coloring material. By this means, movement of the coloring material in the image formed on the recording medium 14 (namely, positional displacement of the dots, color non-uniformities of the dots) is prevented.

Furthermore, the image formation drum 44 of the image formation unit 40 is structurally separated from the treatment liquid drum 34 of the treatment liquid application unit 30, and therefore the treatment liquid is never attached to the inkjet heads 48M, 48K, 48C and 48Y, and it is possible to reduce the causes of ink ejection abnormalities.

Although a configuration with the four standard colors of C, M, Y and K is described in the present embodiment, the combinations of the ink colors and the number of colors are not limited to these. Light and/or dark inks, and special color inks can be added as required. For example, a configuration is possible in which inkjet heads for ejecting light-colored inks, such as light cyan and light magenta, are added, and there is no particular restriction on the arrangement sequence of the heads of the respective colors.

<Drying Process Unit>

The drying process unit 50 includes: the pressure drum (drying drum) 54, which holds and conveys the recording medium 14 after the image formation; and a drying process device 56, which carries out a drying process for evaporating off the water content (liquid component) on the recording medium 14. The basic structure of the drying drum 54 is common with the treatment liquid drum 34 and the image formation drum 44 described previously, and therefore further description thereof is omitted here.

The drying process device 56 is disposed in a position facing the outer circumferential surface of the drying drum 54, and evaporates off the water content present on the recording medium 14. When the inks are deposited on the recording medium 14 by the image formation unit 40, the liquid component of the inks (solvent component) and the liquid component of the treatment liquid (solvent component), which have been separated by the aggregating reaction between the treatment liquid and the inks, remain on the recording medium 14, and therefore it is necessary to remove this liquid component.

The drying process device 56 is a processing unit which carries out the drying process by evaporating off the liquid component present on the recording medium 14, through heating by a heater, or air blowing by a fan, or a combination of these, in order to remove the liquid component on the recording medium 14. The amount of heating and the air flow volume applied to the recording medium 14 are set appropriately in accordance with parameters, such as the amount of water remaining on the recording medium 14, the type of recording medium 14, the conveyance speed of the recording medium 14 (interference processing time), and the like.

When the drying process is carried out by the drying process device 56, since the drying drum 54 of the drying process unit 50 is structurally separated from the image formation drum 44 of the image formation unit 40, then it is possible to reduce the causes of ink ejection abnormalities due to drying of the head meniscus portions in the inkjet heads 48M, 48K, 48C and 48Y as a result of the applied heat or air flow.

In order to display an effect in correcting cockling of the recording medium 14, the curvature of the drying drum 54 can be not less than 0.002 (1/mm). Furthermore, in order to prevent curving (curling) of the recording medium 14 after the drying process, the curvature of the drying drum 54 can be not more than 0.0033 (1/mm).

Moreover, a device for adjusting the surface temperature of the drying drum 54 (for example, an internal heater) can be arranged to adjust the surface temperature to be not lower than 50° C. Drying is promoted by carrying out the heating process from the rear surface of the recording medium 14, thereby preventing destruction of the image in the subsequent fixing process. According to this mode, more beneficial effects are obtained if a device for causing the recording medium 14 to adhere tightly to the outer circumferential surface of the drying drum 54 is arranged. Possible examples of the device for causing tight adherence of the recording medium 14 are a vacuum suction device or electrostatic attraction device, or the like.

There are no particular restrictions on the upper limit of the surface temperature of the drying drum 54, but from the viewpoint of the maintenance operations such as cleaning the ink adhering to the surface of the drying drum 54, it is desirable that the surface temperature of the drying drum 54 is not higher than 75° C. (and more desirably, not higher than 60° C.).

By holding the recording medium 14 in such a manner that the recording surface thereof is facing outward on the outer circumferential surface of the drying drum 54 having this composition (in other words, in a state where the recording surface of the recording medium 14 is curved in a convex shape), and carrying oat the drying process while conveying the recording medium 14 in rotation, it is possible reliably to prevent drying non-uniformities caused by wrinkling or floating up of the recording medium 14.

<Fixing Process Unit>

The fixing process unit 60 includes: the pressure drum (fixing drum) 64, which holds and conveys the recording medium 14; a heater 66, which carries out a heating process on the recording medium 14 on which the image has been formed and from which the liquid has been removed; and a fixing roller 68, which presses the recording medium 14 from the recording surface side. The basic structure of the fixing drum 64 is common to that of the treatment liquid drum 34, the image formation drum 44 and the drying drum 54, and description thereof is omitted here. The heater 66 and the fixing roller 68 are disposed in positions facing the outer circumferential surface of the fixing drum 64, and are situated in this order from the upstream side in terms of the direction of rotation of the fixing drum 64 (the counter-clockwise direction in FIG. 20).

In the fixing process unit 60, the preliminary heating process by means of the heater 66 is carried out on the recording surface of the recording medium 14, and the fixing process by means of the fixing roller 68 is then carried out. The beating temperature of the heater 66 is set appropriately in accordance with the type of the recording medium 14, the type of inks (the type of polymer micro-particles contained in the inks), and the like. For example, a possible mode is one where the heating temperature is set to the glass transition temperature or the minimum film forming temperature of the polymer micro-particles contained in the inks.

The fixing roller 68 is a roller member for melting self-dispersing polymer micro-particles contained in the inks and thereby causing the inks to form a film, by applying heat and pressure to the dried inks, and is composed so as to apply heat and pressure to the recording medium 14. More specifically, the fixing roller 68 is disposed so as to press against the fixing drum 64, in such a manner that a nip mechanism is created between the fixing roller 64 and the fixing drum 64. By this means, the recording medium 14 is pressed between the fixing roller 68 and the fixing drum 64 and is nipped with a prescribed nip pressure, whereby the fixing process is carried out.

An example of the composition of the fixing roller 68 is a mode where the roller is constituted of a heating roller, which incorporates a halogen lamp inside a metal pipe made of aluminum, or the like, having good heat conductivity. If heat energy at or above the glass transition temperature of the polymer micro-particles contained in the inks is applied by heating the recording medium 14 by means of the heating roller, then the polymer micro-particles melt and a transparent film is formed on the surface of the image.

By applying the pressure to the recording surface of the recording medium 14 in this state, the polymer micro-particles which have melted are pressed and fixed into the undulations in the recording medium 14, and the undulations in the image surface are thereby leveled out, thus making it possible to obtain a desirable luster. A desirable composition is one where a plurality of fixing rollers 68 are arranged in a plurality of stages, in accordance with the thickness of the image layer and the glass transition temperature characteristics of the polymer micro-particles.

Furthermore, desirably, the surface hardness of the fixing roller 68 is not more man 71°. By softening the surface of the fixing roller 68, it is possible to expect effects in following the undulations of the recording medium 14 which are produced by cockling, and therefore fixing non-uniformities caused by the undulations of the recording medium 14 are prevented more effectively.

The inkjet recording apparatus 10 shown in FIG. 20 includes an in-line sensor 82 (corresponding to an imaging device), which is arranged at a stage after the processing region of the fixing process unit 60 pan the downstream side in terms of the direction of conveyance of the recording medium 14). The in-line sensor 82 is a sensor for reading out the image formed on the surface of the recording medium 14 (or a check pattern formed in a margin of the recording medium 14).

It is suitable to use a CCD (charge-coupled device) line sensor for the in-line sensor 82, and the sensor having a resolution of 125 dpi, for example, can be employed. In this case, the pixel pitch is approximately 0.2 mm, and when the conveyance speed of the recording medium 14 is 500 mm/s, then the read-out time is 0.4 ms.

In the inkjet recording apparatus 10 in the present embodiment the presence and absence of ejection abnormalities in the inkjet heads 48M, 48K, 48C and 48Y is judged in accordance with the reading results of the in-line sensor 82. Furthermore, the in-line sensor 82 can include a measurement device for measuring the water content, surface temperature, luster, and the like. According to this mode, parameters such as the processing temperature of the drying process unit 50 and the heating temperature and applied pressure of the fixing process unit 60 can be adjusted appropriately in accordance with the read results for the water content, surface temperature and luster, and also can be adjusted appropriately in accordance with change in temperature inside the inkjet recording apparatus 10 and change in temperature of each of the units in the inkjet recording apparatus 10.

<Output Unit>

As shown in FIG. 20, the output unit 70 is arranged subsequently to the fixing process unit 60. The output unit 70 includes an endless conveyance belt 74 wrapped about tensioning rollers 72A and 72B, and an output tray 76, in which the recording medium 14 after the image formation is accommodated.

The recording medium 14 which has undergone the fixing process and which is outputted from the fixing process unit 60 is conveyed by the conveyance belt 74 and outputted to the output tray 76.

<Structure of Inkjet Head>

Next the structure of the inkjet heads 48M, 48K, 48C and 48Y arranged in the image formation unit 40 will be described. The inkjet heads 48M, 48K, 48C and 48Y corresponding to the respective colors have a common structure, and therefore these inkjet heads are represented by an inkjet head (hereinafter, simply called "head") denoted with the reference numeral 48 below.

In the head 48, the nozzles are arranged in the nozzle surface as shown in FIG. 2, for example.

Figure 21:
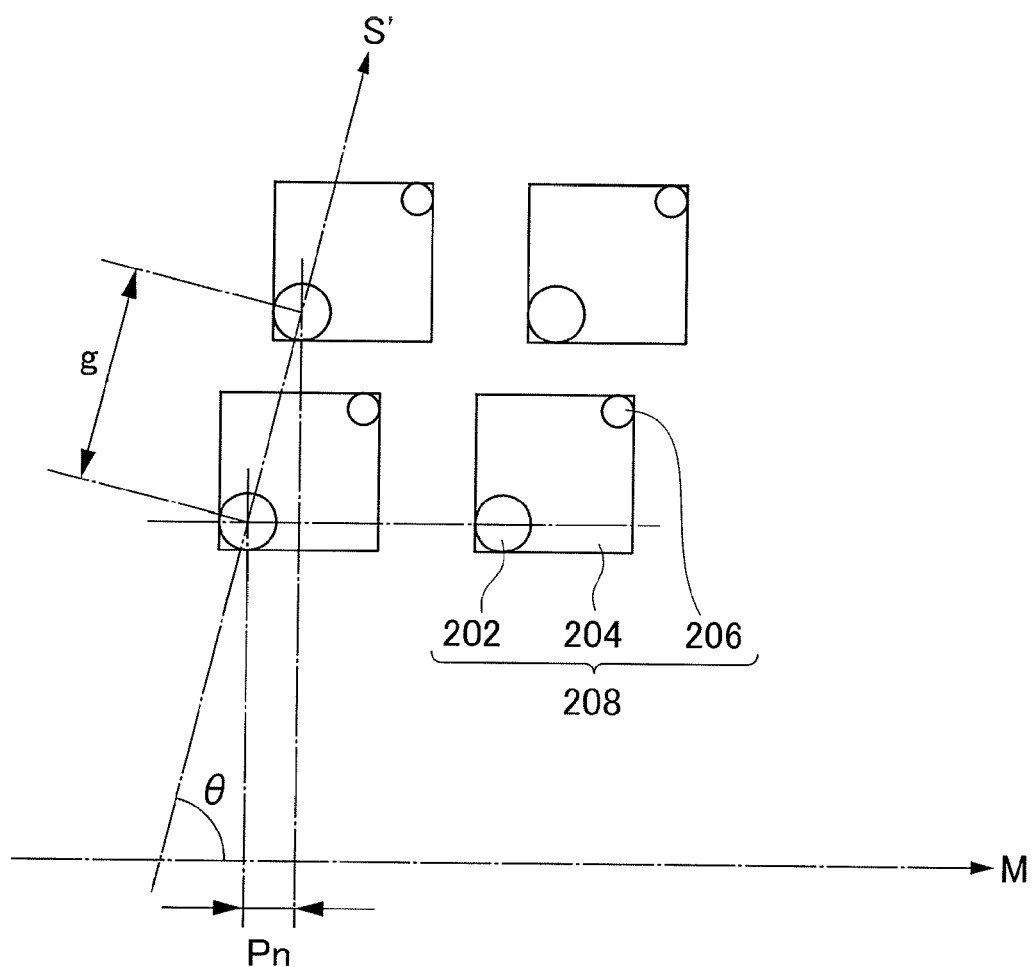
FIG. 21 is a diagram showing a composition of a recording head.

In order to reduce the pitch of the dots formed on the surface of the recording medium 14, it is necessary to reduce the pitch of the nozzles in the head 48. As shown in FIG. 21, the head 48 according to the present embodiment has a structure in which a plurality of ink chamber units (liquid droplet ejection elements forming recording element units) 208 are arranged in a matrix configuration, each ink chamber unit 208 including a nozzle 202 functioning as an ink ejection port, a pressure chamber 204 connected to the nozzle 202 and a supply port 206 connecting the pressure chamber 204 to a common flow channel (not shown), whereby the projected nozzle pitch Pn is made small in the effective nozzle row arranged in the main scanning direction M, which is parallel to the lengthwise direction of the head 48.

The pressure chamber 204 connected to the nozzle 202 has an approximately square planar shape, in which the nozzle 202 is arranged in one of two corners on a diagonal line and the supply port 206 is arranged in the other corner. The shape of the pressure chamber 204 is not limited to that of the present embodiment and various modes are possible in which the planar shape is a quadrilateral shape (rhombic shape, rectangular shape, or the like), a pentagonal shape, a hexagonal shape, or other polygonal shape, or a circular shape, elliptical shape, or the like.

As shown in FIG. 21, the high-density nozzle head of the present embodiment is achieved by arranging the ink chamber units 208 including the nozzles 202, the pressure chambers 204, and the like, in the matrix configuration according to a prescribed arrangement pattern following the row direction aligned in the main scanning direction M and the oblique column direction S' having a prescribed angle $\theta(0°<\theta<90°)$ with respect to the main scanning direction.

More specifically, by adopting the structure in which the ink chamber units 108 are arranged at a uniform pitch g in the oblique column direction S' forming the angle of $\theta$ with respect to the main scanning direction M, the projected nozzle pitch Pn of the nozzles 202 projected to an alignment in the main scanning direction M is $g \times \cos \theta$, and hence it is possible to treat the nozzles 202 as if they were arranged linearly at the uniform pitch of Pn in the main scanning direction M. By means of this composition, it is possible to achieve the high-density arrangement, in which the nozzle density in the nozzle row projected to an alignment in the main scanning direction M reaches 1200 nozzles per inch.

Figure 22:
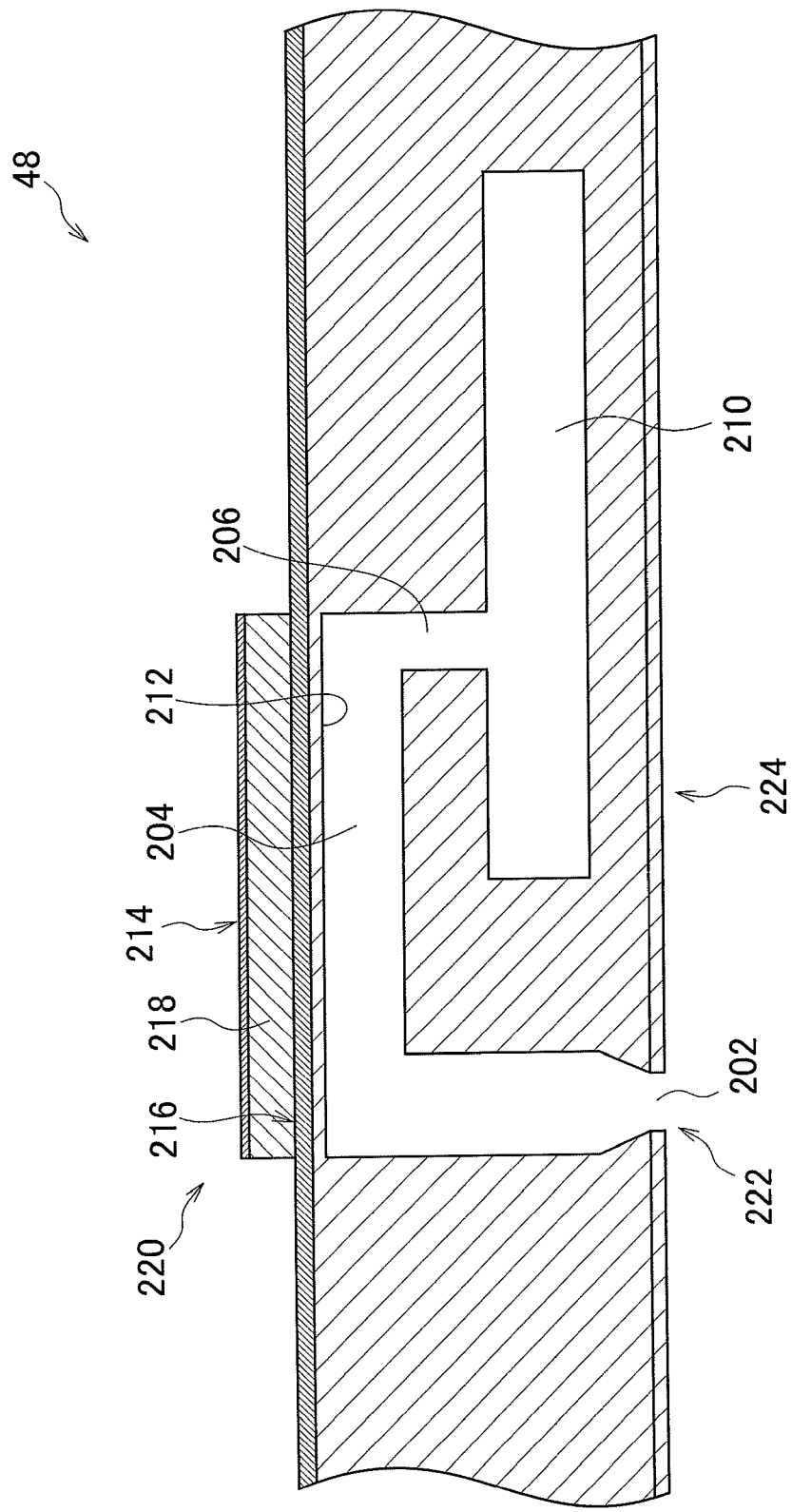
FIG. 22 is a cross-sectional diagram showing the inner structure of the recording head.

FIG. 22 is a cross-sectional diagram showing the inner structure of the head 48 (one of the ink chamber units 208) shown in FIG. 21.

The pressure chambers 204 connected to the nozzles 202 are also connected to a common flow channel 210 through the supply ports 206. The common flow channel 210 is connected to an ink tank (not shown), which is a base tank that supplies the ink, and the ink supplied from the ink tank is supplied through the common flow channel 210 to the pressure chambers 204.

A piezoelectric element 220 including an individual electrode 214 and a common electrode 216 and having a structure in which a piezoelectric body 218 is placed between the individual electrode 214 and the common electrode 216 is bonded to a diaphragm 212, which constitutes an upper surface of each of the pressure chambers 204. Furthermore, the head 48 shown in FIG. 22 has a structure in which a nozzle plate 224 in which openings 222 of the nozzles 202 are formed is bonded to a body in which the flow channel structure having the pressure chambers 204, the supply ports 206, the common flow channel 210, and the like, are formed.

The piezoelectric element 220 and the diaphragm 212 deform when a prescribed drive voltage is applied between the individual electrode 214 and the common electrode 216, and the volume of the pressure chamber 204 changes accordingly. A pressure change occurs in the ink inside the pressure chamber 204 due to the volume change in the pressure chamber 204, and the ink of a volume corresponding to the volume change in the pressure chamber 204 is ejected from the nozzle 202. After ejecting the ink, when the piezoelectric element 220 and the diaphragm 212 return to their original state, new ink is filled into the pressure chamber 204 from the common flow channel 210 through the supply port 206.

In the present embodiment, the piezoelectric element 220 is used as the ink ejection force generating device which causes the ink to be ejected from the nozzle 202 in the head 48; however, it is also possible to employ a thermal method in which a heater is arranged inside the pressure chamber 204 and the ink is ejected by using the pressure of the film boiling action caused by the heating action of this heater.

<Control System>

Figure 23:
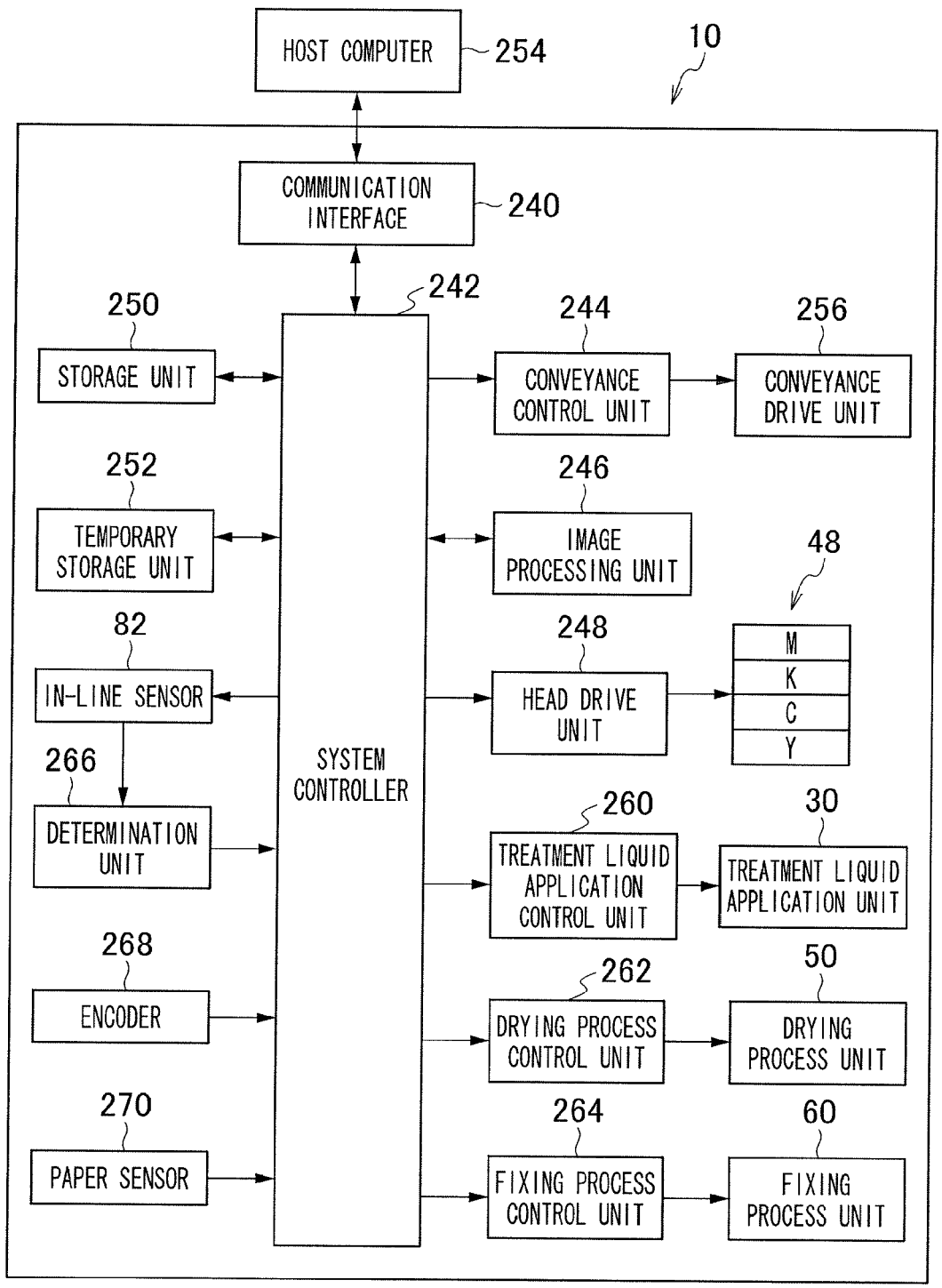
FIG. 23 is a block diagram showing the general composition of a control system of the inkjet recording apparatus.

FIG. 23 is a block diagram showing the general composition of the control system of the inkjet recording apparatus 10. The inkjet recording apparatus 10 includes a communication interlace 240, a system controller 242, a conveyance control unit 244, an image processing unit 246, a head drive unit 248, a storage unit (memory) 250, and a temporary storage unit 252.

The communication interface 240 is an interface unit for receiving image data which is transmitted by a host computer 254. The communication interface 240 can employ a serial interface, such as a universal serial bus (USB), or a parallel interface, such as a Centronics device. It is also possible to install a buffer memory (not shown) for achieving high-speed communications in the communication interface 240.

The system controller 242 is constituted of a central processing unit (CPU) and peripheral circuits of same, and the like, and functions as a control device which controls the whole of the inkjet recording apparatus 10 in accordance with prescribed programs, as well as functioning as a calculating device which performs various calculations and also functioning as a memory controller for the storage unit 250 and the temporary storage unit 252. In other words, the system controller 242 controls the various sections, such as the communication interface 240, the conveyance control unit 244, and the like, as well as controlling communications with the host computer 254 and reading and writing to and from the storage unit 250 and the temporary storage unit 252, and the like, and generating control signals to control the respective units described above.

The image data sent from the host computer 254 is inputted to the inkjet recording apparatus 10 through the communication interface 240, and prescribed image processing is carried out by the image processing unit 246.

The image processing unit 246 is a control unit which has signal (image) processing functions for carrying out various treatments, corrections and other processing in order to generate a signal for controlling printing from the image data, and which supplies the generated print data to the head drive unit 248. The image processing unit 246 includes the rearrangement unit 116, the image buffer memory 118, the transfer control unit 122, and the like, shown in FIGS. 1 and 11.

Prescribed signal processing is carried out on the image data in the image processing unit 246, and the ejected droplet volume (droplet ejection volume) and the ejection timing of the head 48 are controlled through the head drive unit 248 in accordance with the processed image data. The drive unit 248 includes a drive waveform generation unit, which generates drive signal waveforms for driving the actuators (the piezoelectric elements 220 shown in FIG. 22) corresponding to the nozzles 202 of the head 48. The signal outputted from the drive waveform generation unit can be digital waveform data or an analog voltage signal. In the signal waveform, a waveform for one election period whereby each nozzle of the head 48 performs one ejection operation (corresponding to "one recording operation") is repeated and outputted at a prescribed cycle.

By this means, a desired dot size and a desired dot arrangement are achieved. The head drive unit 248 shown in FIG. 23 can also include a feedback control system for maintaining uniform drive conditions in the head 48.

The conveyance control unit 244 controls the conveyance timing and the conveyance speed of the recording medium 14 (see FIG. 20) in accordance with the print control signal generated by the image processing unit 246. The conveyance drive unit 256 in FIG. 23 includes motors which drive the pressure drums 34, 44, 54 and 64 shown in FIG. 20, motors which drive the transfer drums 32, 42, 52 and 62 shown in FIG. 20, a motor of the conveyance mechanism of the recording medium 14 in the paper supply unit 20 shown in FIG. 20, a motor which drives the tensioning roller 72A (72B) of the output unit 70 shown in FIG. 20, and the like, and the conveyance control unit 244 functions as the driver for the motors described above.

The storage unit 250 stores the programs executed by the CPU of the system controller 242, and various data and control parameters, and the like, which are necessary for controlling the respective sections of the inkjet recording apparatus 10, and performs reading and writing of data through the system controller 242. The storage unit 250 is not limited to a memory constituted of semiconductor elements, and can also employ a magnetic medium, such as a hard disk. Furthermore, the storage unit 250 can include an external interface and use a detachable storage medium.

The temporary storage unit (temporary storage memory) 252 has the functions of a temporary storage device for temporarily storing image data inputted through the communication interface 240, and the functions of a development area for various programs stored in the storage unit 250 and a calculation work area for the CPU (for example, a work area for the image processing unit 246). A volatile memory (RAM) which can be read from and written to sequentially is used as the temporary storage unit 252.

Moreover, the inkjet recording apparatus 10 includes a treatment liquid application control unit 260, a drying process control unit 262 and a fixing process control unit 264, which respectively control the operation of the treatment liquid application unit 30, the drying process unit 50, and the fixing process unit 60 including the heater 66 and the fixing roller 68 (see FIG. 20) in accordance with instructions from the system controller 242.

The treatment liquid application control unit 260 controls the timing of the application of the treatment liquid as well as controlling the amount of treatment liquid applied. The treatment liquid application device 36 arranged in the treatment liquid application unit 30 includes an anilox roller movement mechanism, which moves an anilox roller that doses the amount of treatment liquid supplied to the application roller, so as to be able to abut (contact) and separate the anilox roller to and from the application roller. The treatment liquid deposition control unit 260 shown in FIG. 23 controls the abutment timing and separation timing of the anilox roller and the application roller.

The drying process control unit 262 controls the timing of the drying process, as well as controlling the process temperature, air flow volume, and the like, in the drying process unit 50. The fixing process control unit 264 controls the temperature of the heater 66, as well as controlling the pressing force of the fixing roller 68, in the fixing process unit 60.

A determination unit 266 is a processing block which includes a signal processing unit for carrying out prescribed signal processing, such as noise removal, amplification, waveform shaping, and the like, of the read signal outputted from the in-line sensor 82 shown in FIG. 20. The system controller 242 judges the presence or absence of ejection abnormalities in the head 48 on the basis of the determination signal obtained by the determination unit 266.

An encoder 268 includes encoders installed on the motors which are the drive sources for rotating the pressure drums 34, 44, 54 and 64, and output pulse signals corresponding to the rotation of the motors. By counting the pulse signals outputted from the encoder 268, it is possible to ascertain the amount of rotation of the pressure drums 34, 44, 54 and 64. Furthermore, it is possible to identify rotational non-uniformities in the pressure drums 34, 44, 54 and 64 on the basis of frequency variation in the pulse signals outputted from the encoder 268.

More specifically, the pulse sequence outputted from the encoder 268 is subjected to prescribed signal processing, such as waveform shaping and noise elimination, and is then sent to the system controller 242. For example, the system controller 242 sends an instruction signal for controlling the abutment timing and separation timing of the anilox roller, to the treatment liquid application control unit 260, on the basis of the pulse sequence acquired from the encoder 268.

A paper sensor 270 includes a plurality of paper sensors arranged in the conveyance path of the recording medium 14, and it is possible to ascertain the position of the recording medium 14 on the conveyance path in accordance with the detection results obtained by the paper sensors. For example, if the paper sensor 270 arranged in the vicinity of the gripper 80A of the pressure drum 34 (44, 54, 64) detects the recording medium 14, then the gripper 80A is operated to grip the leading end portion of the recording medium 14, and the suction control and temperature control of the pressure drum 34 are switched to the recording medium holding state.

In the present embodiment, the inkjet recording apparatus 10 that employs the pressure drum conveyance method is described, but the conveyance method of the recording medium 14 is not limited to the pressure drum conveyance method, and it is also possible to select a belt conveyance method which conveys a recording medium while holding the recording medium on a conveyance belt by suction, or another conveyance method, as appropriate.

As described above, according to the embodiments of the present invention, it is possible to efficiently read out the data from the image page memory. More specifically, since no bits are discarded from each word being read out, and since the data can be read out from the consecutive addresses, then the data read-out and the data transfer are efficient (high-sped), and the memory can be composed of the inexpensive DRAMs.

Moreover, the high-speed access is only necessary for the line memory of approximately several lines to be used in the rearrangement processing, and other than that, the buffer memories composed of the inexpensive DRAMs can be employed. It is therefore possible to achieve the high-speed data transfer readily, even in a matrix type of head.

Furthermore, since the data can be efficiently read out from the image page memory in print line units, then instead of the embodiment described above, it is also possible to employ a composition that includes an image page memory in the host computer and transfers data to the inkjet recording apparatus by reading out the data from this image page memory. In this case, it is possible to omit the image page memory in the inkjet recording apparatus.

Although the inkjet recording apparatus employing the full line-type of recording heads is explained in the above-described embodiments, the range of application of the present invention is not limited to this, and the present invention can also be applied to a case where image formation is carried out by performing a plurality of scanning actions using a short head having a nozzle row of a length shorter than the width of the recording medium. In particular, the present invention is beneficial if applied to a so-called single-pass type of image formation in which image recording is completed in a range of relative movement (scanning range) covered by the nozzle rows (recording element rows) of the recording head by performing just one relative movement of the recording head and the recording medium.

Furthermore, although the inkjet recording apparatus is explained in the above-described embodiments as one example of the image forming apparatus, the range of application of the present invention is not limited to this. The present invention can also be applied to an image forming apparatus based on methods of various types other than the inkjet method, such as a thermal transfer recording apparatus having a line head (a recording apparatus having thermal elements as recording elements), an LED electrophotographic printer and a sliver salt photographic primer having an LED line exposure head (recording apparatuses having light-emitting diodes (LED) as recording elements), or the like.

The technical scope of the present invention is not limited to the range stated in the embodiments described above. The compositions, and the like, in the respective embodiments can be combined suitably between the respective embodiments within a range that does not depart from the essence of the present invention.

It should be understood that there is no Intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:
   a recording head including a first head module and a second head module, each of the first and second head modules having a plurality of recording elements arranged to perform a recording operation with respect to a recording medium, the first head module being arranged in a first orientation on the recording head, the second head module being arranged in a second orientation on the recording head, the second orientation being rotated from the first orientation;
   a scanning device configured to move the recording head and the recording medium relatively to each other to scan the recording medium with the recording head;
   a signal processing device configured to select, from print data for one page, print data to be used in one recording operation respectively for the recording elements, and to arrange the selected print data in a prescribed recording element sequence for each of the first and second head modules regardless of the first and second orientations of the first and second head modules;
   a data transfer device configured to transfer the arranged print data for each of the first and second head modules; and
   a recording operation control device configured to control the recording operation of the recording elements in accordance with the transferred print data, wherein
   the recording elements are arranged in a two-dimensional matrix arrangement on the recording head;

the scanning device is configured to move the recording head and the recording medium relatively to each other to scan the recording medium with the recording head in a sub-scanning direction;

the signal processing device includes:

a first line memory configured to store, of the print data for the one page, the print data for one line along a main scanning direction perpendicular to the sub-scanning direction;

a rearrangement device configured to change an alignment sequence of the print data for the one line stored in the first line memory to rearrange the print data in such a manner that the print data for pixels corresponding to the recording elements which are adjacently aligned on a straight line along the main scanning direction in the recording head are arranged in a same word or in words adjacent to each other;

an image buffer memory configured to store the rearranged print data, the image buffer memory having a storage capacity for storing at least the rearranged print data for an image region corresponding to a surface area occupied by the two-dimensional matrix arrangement of the recording elements in the recording head; and a second line memory configured to read out the print data to be used in the one recording operation respectively for the recording elements from the image buffer memory, and to store the read print data; and the data transfer device is configured to transfer the print data stored in the second line memory for each of the first and second head modules;

wherein the second line memory is configured to read out, of the print data for the one page, the print data in a data region corresponding to the first head module from the image buffer memory in a first read-out direction, and the print data in a data region corresponding to the second head module from the image buffer memory in a second read-out direction reverse to the first read-out direction.

2. The image forming apparatus as defined in claim 1, wherein the first and second head modules are arranged in a staggered arrangement on the recording head.

3. The image forming apparatus as defined in claim 1, wherein the second orientation is rotated from the first orientation by 180°.

4. The image forming apparatus as defined in claim 1, wherein:

the recording head includes a first head unit and a second head unit;

each of the first and second head units is constituted of an odd number of head modules;

the first head unit is arranged in the first orientation on the recording head; and the second head unit is arranged in the second orientation on the recording head.

5. The image forming apparatus as defined in claim 1, wherein:

the recording head includes a plurality of head units; and each of the head units is constituted of the first and second head modules alternately arranged.

6. The image forming apparatus as defined in claim 1, further comprising a post-processing calculation device configured to carry out correction processing on the rearranged print data stored in the image buffer memory.

7. The image forming apparatus as defined in claim 6, wherein the correction processing includes mask processing to prohibit at least one of the recording elements from performing the recording operation.

8. The image forming apparatus as defined in claim 7, wherein the at least one of the recording elements includes a defective one of the recording elements.

9. The image forming apparatus as defined in claim 7, wherein the at least one of the recording elements includes one of overlapping two of the recoding elements which are overlap with each other between the first and second head modules.

10. An image forming method, comprising:

a scanning step of moving a recording head and a recording medium relatively to each other to scan the recording medium with the recording head, the recording head including a first head module and a second head module, each of the first and second head modules having a plurality of recording elements arranged to perform a recording operation with respect to the recording medium, the first head module being arranged in a first orientation on the recording head, the second head module being arranged in a second orientation on the recording head, the second orientation being rotated from the first orientation;

a signal processing step of selecting, from print data for one page, print data to be used in one recording operation respectively for the recording elements, and arranging the selected print data in a prescribed recording element sequence for each of the first and second head modules regardless of the first and second orientations of the first and second head modules;

a data transfer step of transferring the arranged print data for each of the first and second head modules; and a recording operation control step of controlling the recording operation of the recording elements in accordance with the transferred print data, wherein the recording elements are arranged in a two-dimensional matrix arrangement on the recording head;

the scanning step is configured to move the recording head and the recording medium relatively to each other to scan the recording medium with the recording head in a sub-scanning direction;

the signal processing step includes:

a first storing step of storing, of the print data for the one page, the print data for one line along a main scanning direction perpendicular to the sub-scanning direction, in a first line memory;

a rearrangement step of changing an alignment sequence of the print data for the one line stored in the first line memory to rearrange the print data in such a manner that the print data for pixels corresponding to the recording elements which are adjacently aligned on a straight line along the main scanning direction in the recording head are arranged in a same word or in words adjacent to each other;

an image buffering step of storing the rearranged print data in an image buffer memory having a storage capacity for storing at least the rearranged print data for an image region corresponding to a surface area occupied by the two-dimensional matrix arrangement of the recording elements in the recording head; and a second storing step of reading out the print data to be used in the one recording operation respectively for the recording elements from the image buffer memory, and storing the read print data in a second line memory; and the data transfer step is configured to transfer the print data stored in the second line memory for each of the first and second head modules;

wherein the second storing step is configured to read out, of the print data for the one page, the print data in a data region corresponding to the first head module from the image buffer memory in a first read-out direction, and the print data in a data region corresponding to the second head module from the image buffer memory in a second read-out direction reverse to the first read-out direction.

11. The image forming method as defined in claim 10, further comprising a post-processing calculation step of carrying out correction processing on the rearranged print data stored in the image buffer memory.

12. The image forming method as defined in claim 11, wherein the correction processing includes mask processing to prohibit at least one of the recording elements from performing the recording operation.

13. The image forming method as defined in claim 12, wherein the at least one of the recording elements includes a defective one of the recording elements.

14. The image forming method as defined in claim 12, wherein the at least one of the recording elements includes one of overlapping two of the recoding elements which are overlap with each other between the first and second head modules.

* * * * *